US012587028B2

(12) United States Patent
Wu et al.

(10) Patent No.: US 12,587,028 B2
(45) Date of Patent: Mar. 24, 2026

(54) BATTERY PACK, BATTERY PACK SYSTEM AND POWER TOOL

(71) Applicant: Positec Power Tools (Suzhou) Co., LTD., Suzhou (CN)

(72) Inventors: Hongbing Wu, Suzhou (CN); Shiping Jiao, Suzhou (CN); Shaofeng Lv, Suzhou (CN); Yaoqiu Qian, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 0 days.

(21) Appl. No.: 18/888,055

(22) Filed: Sep. 17, 2024

(65) Prior Publication Data

US 2025/0055303 A1      Feb. 13, 2025

Related U.S. Application Data

(63) Continuation-in-part of application No. PCT/CN2022/139423, filed on Dec. 15, 2022.

(30) Foreign Application Priority Data

| | | |
|---|---|---|
| Mar. 17, 2022 | (CN) | 202210263064.5 |
| Apr. 28, 2022 | (CN) | 202210457481.3 |
| Aug. 31, 2022 | (CN) | 202211058090.0 |

(51) Int. Cl.
    *H01M 10/44*        (2006.01)
    *H01M 10/42*        (2006.01)
    (Continued)

(52) U.S. Cl.
    CPC ..... *H02J 7/007194* (2020.01); *H01M 10/425* (2013.01); *H01M 10/46* (2013.01);
    (Continued)

(58) Field of Classification Search
    CPC ...... H01M 10/0567; H01M 4/02; H01M 4/66; H01M 10/44; H01M 10/635; H02J 7/00309; H02J 7/0047
    (Continued)

(56) References Cited

U.S. PATENT DOCUMENTS

| | | | | |
|---|---|---|---|---|
| 12,017,546 B2* | 6/2024 | Rodionov | ............... | B60L 53/20 |
| 2014/0015451 A1 | 1/2014 | Funabashi | | |

(Continued)

FOREIGN PATENT DOCUMENTS

| | | |
|---|---|---|
| CN | 102683759 A | 9/2012 |
| CN | 105359328 A | 2/2016 |

(Continued)

OTHER PUBLICATIONS

International Search Report in application No. PCT/CN2022/099185, dated Jul. 22, 2022.
(Continued)

*Primary Examiner* — Rexford N Barnie
*Assistant Examiner* — Swarna N Chowdhuri
(74) *Attorney, Agent, or Firm* — Lee & Hayes, P.C.

(57) ABSTRACT

A battery pack includes a housing and at least one battery cell located within the housing, a charging and discharging port disposed on the housing, the charging and discharging port is provided with a connection terminal, the connection terminal is configured to be connected to the battery cell; the external device is configured to be connected to the battery cell through the charging and discharging port and configured to charge or obtain electrical energy from the battery cell; the battery pack is discharged at a continuous discharge rate of greater than or equal to 4 C at normal temperature, the absolute temperature of the battery pack is less than the charging protection temperature when the discharge process is completed.

18 Claims, 38 Drawing Sheets

3C charge–3C discharge cycle (with air cooling)

Time

——Surface Temperature  -----Voltage

(51) Int. Cl.

| | |
|---|---|
| *H01M 10/46* | (2006.01) |
| *H01M 10/48* | (2006.01) |
| *H01M 10/613* | (2014.01) |
| *H01M 10/6235* | (2014.01) |
| *H01M 10/635* | (2014.01) |
| *H01M 10/6563* | (2014.01) |
| *H01M 50/209* | (2021.01) |
| *H01M 50/247* | (2021.01) |
| *H02J 7/00* | (2006.01) |

(52) U.S. Cl.

CPC ....... *H01M 10/486* (2013.01); *H01M 10/613* (2015.04); *H01M 10/6235* (2015.04); *H01M 10/635* (2015.04); *H01M 10/6563* (2015.04); *H01M 50/209* (2021.01); *H01M 50/247* (2021.01); *H02J 7/00309* (2020.01); *H02J 7/0047* (2013.01); *H02J 7/0068* (2013.01); *H01M 2220/30* (2013.01)

(58) Field of Classification Search

USPC .......................................................... 307/24

See application file for complete search history.

(56) References Cited

U.S. PATENT DOCUMENTS

| | | | |
|---|---|---|---|
| 2020/0127340 A1 | 4/2020 | Krondorfer | |
| 2021/0021144 A1* | 1/2021 | Geng | ................. H01M 10/441 |
| 2021/0152110 A1 | 5/2021 | Dallas et al. | |
| 2025/0269856 A1* | 8/2025 | Gesang | ................. B60W 20/40 |
| 2025/0286363 A1* | 9/2025 | Feng | ..................... G01K 3/005 |

FOREIGN PATENT DOCUMENTS

| | | |
|---|---|---|
| CN | 105870386 A | 8/2016 |
| CN | 107093918 A | 8/2017 |
| CN | 107584458 A | 1/2018 |
| CN | 108454451 A | 8/2018 |
| CN | 111133662 A | 5/2020 |

OTHER PUBLICATIONS

International Search Report in application No. PCT/CN2022/139423, dated Mar. 8, 2023.

* cited by examiner 3c charge—4C discharge cycle (without air cooling)

62.25V 42.4V

Voltage/temperature 70  60  50  40  30  20  10  0 t1  t2  t3  t4  t5  t6

Time (s)

—— Surface Temperature    ------ Voltage

1810

1820

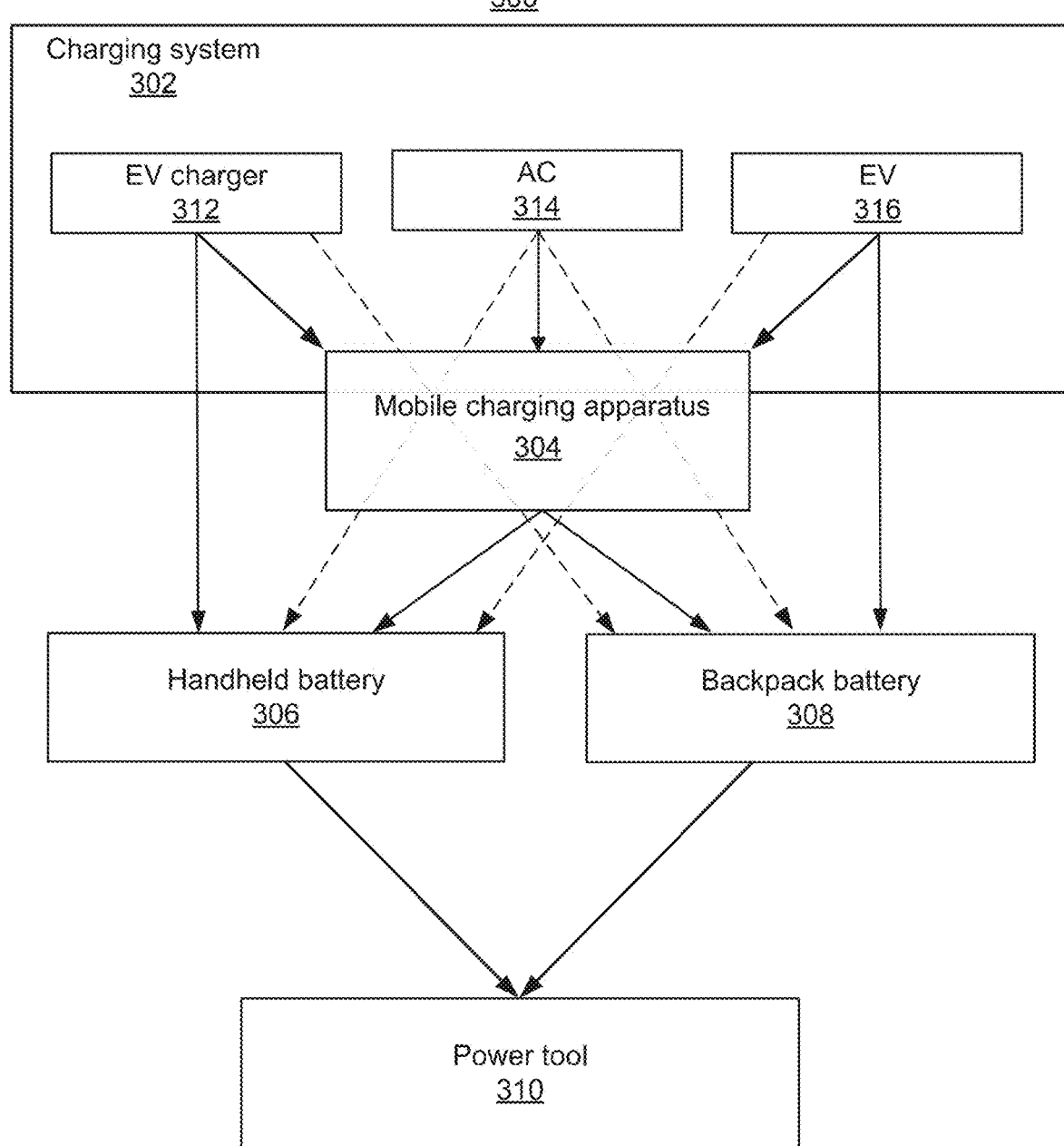
*FIG.*20

BATTERY PACK, BATTERY PACK SYSTEM AND POWER TOOL

CROSS-REFERENCE TO RELATED APPLICATION

This application is a Continuation-in-part Application of PCT Application No PCT/CN2022/139423, filed on Dec. 15, 2022, which claims the benefit of and priority to Chinese Patent Application No. CN202210263064.5, filed on Mar. 17, 2022, Chinese Patent Application No. CN202210457481.3, filed on Apr. 28, 2022, and Chinese Patent Application No. CN202211058090.0, filed on Aug. 31, 2022, all of which are hereby incorporated by reference in their entireties for all purposes as if fully set forth herein.

TECHNICAL FIELD

This present disclosure relates to the field of power supply system, and more specifically, relates to a battery pack, a battery pack system, a power tool, and a power tool system.

BACKGROUND

A power tool is a tool that is actuated by an additional power source and mechanism other than the solely manual labor used with hand tools. In some cases, such as in outdoor landscaping, power tools are used continuously for a long period of time. Power tools often use fuel (such as gasoline) and internal combustion engines (fuel power tools for short below) and these can work for a sustained period of time. For this reason, fuel is conventionally what is used as a power source for commercial garden tools.

Commercial garden tools are professional power tools designed for garden workers or garden companies, usually referring to maintenance devices for garden landscapes. Commercial garden tools usually work on lawns, hedges, flowers, trees, or gardens. Example commercial garden tools may include grass trimmers, lawn mowers, pruners, chainsaws, blowers, leaf chippers, and snowplows.

The commercial garden tools usually have a relatively high power. For example, a power of a garden blower is usually 2300 W, and a power of a lawn mower is usually 2600 W. Therefore, as a power source, the fuel can meet the power requirements of the commercial garden tools, and can support the commercial garden tools for long-term work.

However, fuel power tools are noisy and release exhaust gases that pollute the environment. Instead of fuel and internal combustion engines, power tools use electricity and electric motors or actuators. Power tools are environmentally friendly and clean, and the power tools generate less noise than fuel power tools. For these reasons, the power tools are becoming increasingly popular, even in the garden tool context for non-commercial present disclosures. However, the main problems of the power tools are that a battery pack has a small output power and a slow charging speed, resulting in a relatively long energy waiting time for the power tools and affecting the working efficiency of the power tools.

SUMMARY

Some embodiments of this present disclosure provide a battery pack, a battery pack system, a power tool, a power tool system and a method.

Described herein is a battery pack for powering a power tool, the battery pack includes a housing configured to be connectable to the power tool and at least one battery cell located within the housing, wherein a charge rate of each of the at least one battery cell is greater than 5 C, wherein each of the at least one battery cell has a capacity of at least 3.6 Ah, and wherein an internal resistance of each of the at least one battery cell is less than or equal to 3 milliohms.

Also described herein is a battery pack system including a plurality of battery packs, each battery pack includes a housing configured to be connectable to the power tool, and at least one battery cell located within the housing, wherein a charge rate of each of the at least one battery cells is greater than 5 C, wherein each of the at least one battery cell has a capacity of at least 3.6 Ah, and wherein an internal resistance of each of the at least one battery cells is less than or equal to 3 milliohms.

Also described herein is a power tool that includes a tool actuator, and a battery pack configured to provide power to the tool actuator, the battery pack includes a housing configured to be connectable to the power tool, and at least one battery cell located within the housing, wherein a charge rate of each of the at least one battery cell is greater than 5 C, wherein each of the at least one battery cell has a capacity of at least 3.6 Ah, and wherein an internal resistance of each of the at least one battery cells is less than or equal to 3 milliohms.

Also described herein is a battery pack for powering a power tool, the battery pack includes a housing configured to be connectable to the power tool, and at least one battery cell located within the housing, wherein a charge rate of each of the at least one battery cell is greater than 5 C, and wherein an energy density of each of the at least one battery cell is greater than 120 Wh/kg, and wherein a voltage output from each of the at least one battery cell changes approximately linearly during discharge of the battery cell.

Also described herein is a power supply system that includes a first battery pack, a second battery pack, an electric power garden tool configured to be powered by the first battery pack and the second battery pack, a mobile charging apparatus configured to alternatively charge battery packs such that energy is continuously supplied to the electric power garden tool, wherein the mobile charging apparatus comprises at least one charging port configured to accept the first battery pack and the second battery pack, and wherein the mobile charging apparatus is configured to provide energy sufficient for a plurality of jobs, and wherein at least one charging port of the mobile charging apparatus has a maximum output power of greater than or equal to 3 kW with a charge rate of 5 C to charge the first and second battery packs.

Also described herein is a power supply system that includes a battery pack, an electric power garden tool configured to be powered by the battery pack, and a mobile charging apparatus comprising at least one charging port configured to charge the battery pack, wherein at least one charging ports has a maximum output power of greater than 3000 W with a charge rate of 5 C to charge the battery packs.

Also described herein is a power tool system including a power tool, and a battery pack that includes a housing configured to be connectable to the power tool and a battery cell located within the housing, wherein the battery cell charges more quickly than the battery cell discharges.

Also described herein is a power tool includes a battery pack that includes a housing configured to be connectable to the power tool and at least one battery cell located within the housing, wherein the battery cell charges more quickly than the battery cell discharges.

Also described herein is a power tool system that includes a plurality of battery packs and a plurality of power tools, wherein each battery pack of the plurality of battery packs includes a housing configured to be connectable to a power tool of the plurality of power tools and a battery cell located within the housing, wherein a difference between a rate at which the battery cell is able to charge and a rate at which the battery cell is able to discharge is less than 2 C, and wherein the battery cell has a maximum available discharge current of at least 40 A.

Also described herein is a method of operating a battery pack system, comprising charging a battery pack, wherein the battery pack charges at a charge rate of up to 5 C and discharges at a rate of under 5 C.

Also described herein is a power tool including a battery pack including a housing configured to be connectable to the power tool, and a battery cell located within the housing, wherein the battery cell charges more quickly than the battery cell discharges. In some embodiments, the battery pack includes a battery cell located within the housing, wherein a difference between a rate at which the battery cell is able to charge and a rate at which the battery cell is able to discharge is less than 2 C, the discharge rate is greater than 6 C and the charge rate is greater than 6 C, and the battery cell has a maximum available discharge current of at least 40 A.

Also described herein is a method of operating a battery pack system. In an embodiment, for each worker of a plurality of workers at a job site, while the worker is using the first battery pack, a second battery pack can be changed at the job site. When the plurality of workers moves to a second job site, the worker can use the second battery pack to power garden electric power tools used by the respective worker at the second job site and charge the first battery pack at the second job site.

In an embodiment, the method includes arriving at a first job site, using a first battery pack to power a power tool used at the first job site, wherein the first battery pack is fully charged, charging, while at the first job site, a second battery pack, finishing work at the first job site and traveling to a second job site, while at the second job site, placing the second battery pack in the power tool and using the power tool at the second job site; and, while at the second job site, charging the first battery pack.

BRIEF DESCRIPTION OF THE DRAWINGS

The foregoing objectives, technical solutions, and beneficial effects of the present disclosure can be clearly obtained through the following detailed description of specific embodiments, which can implement the present disclosure in combination with the description of accompanying drawings.

FIG. 20 is a block diagram of a power tool power supply system according to another embodiment of this present disclosure.

Same numerals and symbols in the accompanying drawings and the specification are used for representing same or equivalent elements.

DETAILED DESCRIPTION

The following describes preferred embodiments of the present disclosure in detail with reference to the accompanying drawings, so that the advantages and features of the present disclosure can be more easily understood by a person skilled in the art, thereby defining the protection scope of the present disclosure more clearly and explicitly. The following implementations may be appropriately combined with each other. The same numerals and symbols in different embodiments in the accompanying drawings and the specification are used for representing the same or equivalent elements.

As described above, different types of power tools may be powered by fuel or electricity. Fuel can provide a high power and can work continuously for a long time. Therefore, fuel power tools are often used for commercial gardening.

However, as described above, fuel-powered tools cause environmental pollution and are noisy.

Electricity is environmentally friendly and clean energy, and electricity may be generated from renewable sources. Therefore, power tools that use electricity as a power source are becoming increasingly popular. Generally, power tools are powered by a direct current power supply or an alternating current power supply. The direct current power supply may be a portable power supply such as a battery pack or an energy storage cabinet, and the alternating current power supply may be a utility power and may be obtained by using an alternating current socket.

The commercial garden tools are usually equipped for garden companies. Because of the need to be wired to a socket, an alternating current power supply is difficult to obtain when the garden companies go out to work sites. Therefore, in the field of commercial garden tools, a direct current power supply may be preferable. In this way, a battery pack may be used to supply power to the power tool, which makes it easy for a work team to carry the battery pack during outings.

Garden companies typically have two or three people forming a work team and work outside for one or more days. When going out to work sites, the garden team carries various fuel tools such as a fuel lawn mower, a fuel blower, a fuel pruner, and a fuel grass trimmer required for work, by using a vehicle. The fuel tools can be refilled quickly from gasoline jerry cans. Thus, after completing work in one garden, the garden team carries various fuel tools by using the vehicle to transfer the tools to the next garden to continue work.

Figure 2A:
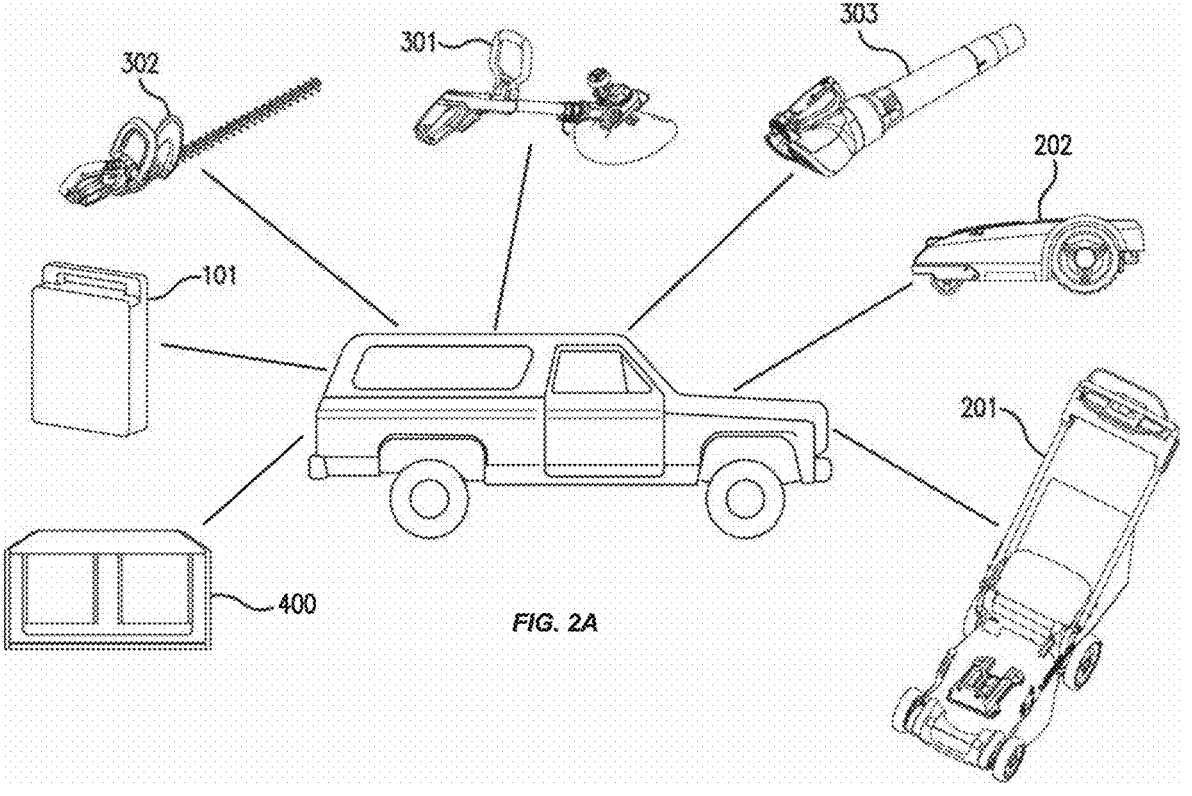
FIG. 2A is a schematic diagram illustrating a scenario in which a commercial garden work team goes out working with a power tool system carried by a vehicle.
Figure 2B:
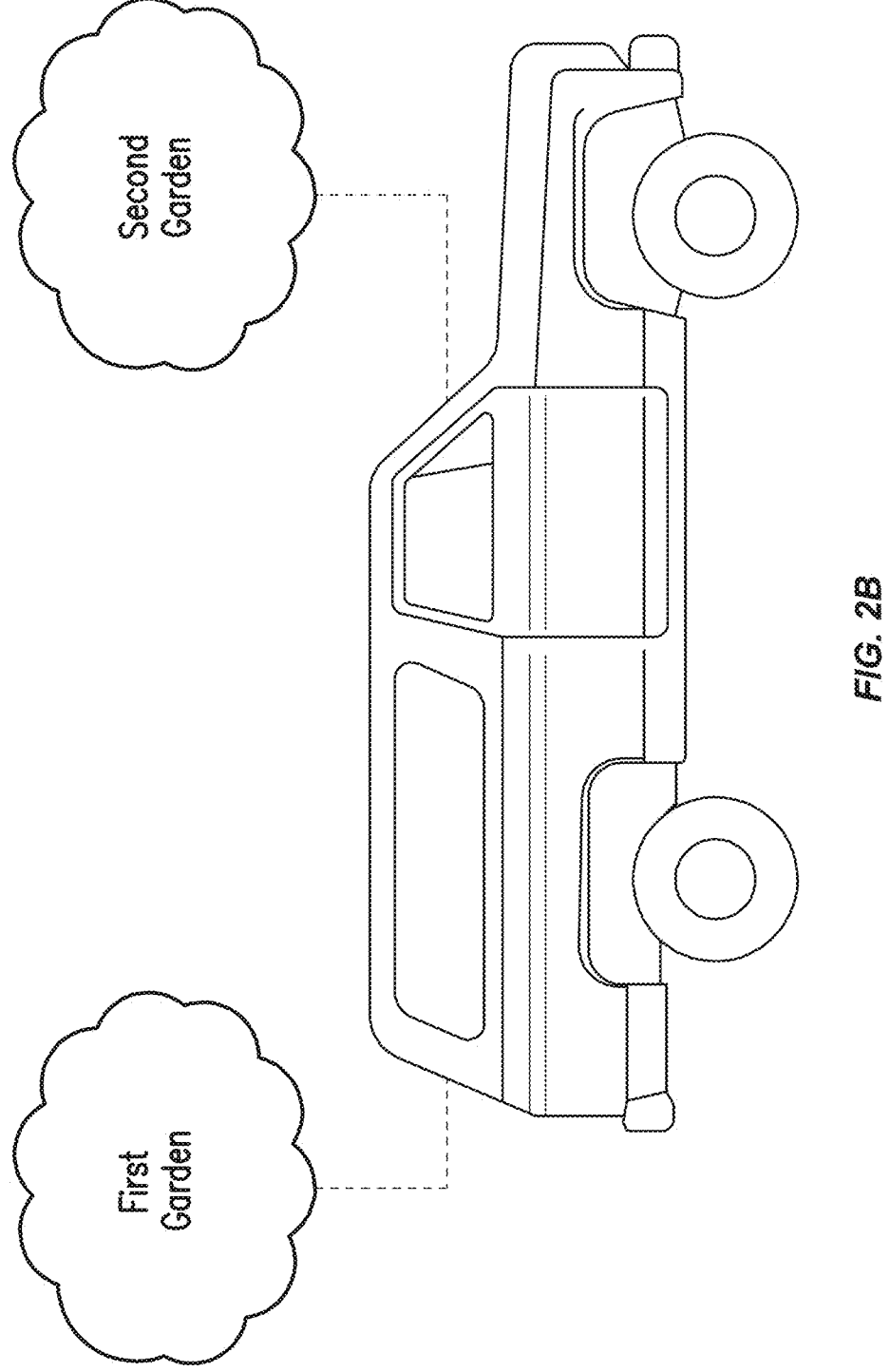
FIG. 2B is a schematic diagram illustrating a commercial garden work team moving between gardens.

According to embodiments disclosed herein, a new type of battery cell—referred to herein as a Type 2 battery cell—is used in power tools. This Type 2 battery cell can be charged and discharged quickly enough so that a similar work scenario is possible. Specifically, as shown in FIG. 2A and FIG. 2B, a work team carries various garden power tools, for example, wheeled power tools such as a hand push lawn mower 201 and an intelligent lawn mower 202 and handheld power tools such as a grass trimmer 301, a pruner 302, and a blower 303 required for work by using a vehicle, and the work team also needs to carry a direct current power supply such as a battery pack and a charging apparatus. The charging apparatus may charge the battery pack. During work, the work team first comes to a first garden and works by using various carried garden power tools. For garden trimming work, mowing usually takes the longest time. Although sizes of lawns of different homes are different, an average time consumed by the mowing ranges from 20 minutes to 40 minutes. Therefore, a worker immediately starts mowing by using a lawn mower each time they arrive at a garden. During mowing, another worker sequentially completes other types of work by using the handheld power tools. For example, another worker first performs grass trimming, pruning, and then grass blowing. The two workers almost complete all the work simultaneously, and then the work team transfers to a second garden. This process is repeated until a day's work is completed. In some other embodiments, a top handle saw, or a chain saw also can be as a part of the power tools.

In some cases, the battery pack provided herein contains at least one battery cell, and may contain a plurality of battery cells. The battery cell can have any suitable shape to fit within the housing, preferably a cuboid shape (for example sheet-like rectangular shape). The battery cell can have an energy not less than 16 Wh/cell. The battery pack can include from 1 cell to 100 cells depending on size and/or weight requirements of the battery pack. For example, the battery pack can include 5 cells, 10 cells, 15 cells, 20 cells, 25 cells, 50 cells, 75 cells, or 100 cells. In some preferred embodiments, the battery pack includes 15 cells. In some aspects, an internal resistance of all of the plurality of battery cells in the battery pack is less than 30 milliohms and the plurality of battery cells has a capacity of at least 4 Ah. In an embodiment, the battery pack includes a plurality of battery cells, and an internal resistance of all of the plurality of battery cells in the battery pack is less than 30 milliohms and the plurality of battery cells has a capacity of at least 11 Ah.

In some cases, the battery cell can charge more quickly than it can discharge. For example, the battery cell can charge at a rate of 10 C and discharge at a rate of 4 C.

As an example, as shown in FIG. 2A, the charging apparatus may be a mobile charging apparatus 400. An energy storage capacity of the mobile charging apparatus 400 is far greater than an energy storage capacity of the battery pack. The garden team may fully charge the mobile charging apparatus 400 at night and carry the mobile charging apparatus 400 when going out to work during the day, so that the mobile charging apparatus 400 has electricity at any time during work hours, and can replenish power to the power tool in time.

To enable a power tool to have the power of a fuel tool, the battery pack needs to meet the power requirements of the commercial garden tools. For example, compared with a fuel garden grass trimmer, an output power of an electric grass trimmer needs to reach 1200 W or more. Compared with a fuel blower, an output power of an electric blower needs to reach 1500 W to 3000 W. Compared with a fuel lawn mower, a power of an electric lawn mower needs to reach 2000 W to 3000 W.

According to a battery pack provided, during discharging, a continuous discharge current of a single cell in the battery pack is not less than 20 A. Generally, a voltage platform formed by single cells in the battery pack is 60V, that is, a nominal voltage of the battery pack is 60V. Therefore, when the discharge current of the single cell is not less than 20 A, the output power of the battery pack is not less than 1200 W, which may meet the power requirements of the commercial electric garden tools.

For example, the continuous discharge current of the single cell in the battery pack is not less than 40 A. When the nominal voltage of the battery pack is 60V, the output power of the battery pack is not less than 2400 W, which may meet power requirements of high-power power tools such as an electric lawn mower and an electric blower.

For example, the continuous discharge current of the single cell in the battery pack is not less than 60 A, 70 A, 80 A, or 100 A.

In another embodiment, the nominal voltage of the battery pack is not limited to 60V. For example, the nominal voltage of the battery pack may also be 20V, 36V, 48V, 96V, or the like. Since the continuous discharge current of the single cell in the battery pack is relatively large, even when the nominal voltage of the battery pack is relatively low, the battery pack may still meet the requirements of the high-power power tools. For example, when the nominal voltage of the battery pack is 20V, since the continuous discharge current of the single cell is not less than 60 A, the output power of the battery pack is not less than 1200 W. Therefore, the battery pack provided may meet the high-power requirements of the power tools due to the relatively large discharge current of the single cell thereof. Currently, the nominal voltage of the battery pack is usually 60V. Therefore, a battery pack with a voltage platform of 60V is used as an example for description.

During discharging, the battery pack may not necessarily be continuously discharged at a large current. During actual working, the discharge current of the battery pack may be set according to a requirement of the power tool. For example, when fully charged, the battery pack may be discharged at a large current, and when being discharged to a low voltage, the battery pack may be discharged at a small current, or may be discharged at a constant current value. Since an average output power of most garden power tools is around 1800 W, an average discharge current of the battery pack is not less than 30 A. Therefore, an average output power of the battery pack is not less than 1800 W, which may meet requirements of most garden tools.

According to the battery pack provided, a capacity of the battery pack is designed by comprehensively considering a weight, a battery life, a power, and a user habit of the battery pack. First, the weight of the battery pack cannot be excessively heavy, so that the battery pack does not affect the use comfort when being mounted on a power tool or carried on the back of a user. Second, the battery life of the battery pack can implement a low replacement frequency after the battery pack is mounted on a high-power garden power tool. Third, the battery pack can be convenient to use when being mounted on the power tool, which is best to conform to use habits of workers when conventional fuel tools are used. A garden team fills up all carried fuel tools before going out to work when the conventional fuel tools are used, so that the tools can be directly used each time without refueling the tools before use.

Figure 3A:
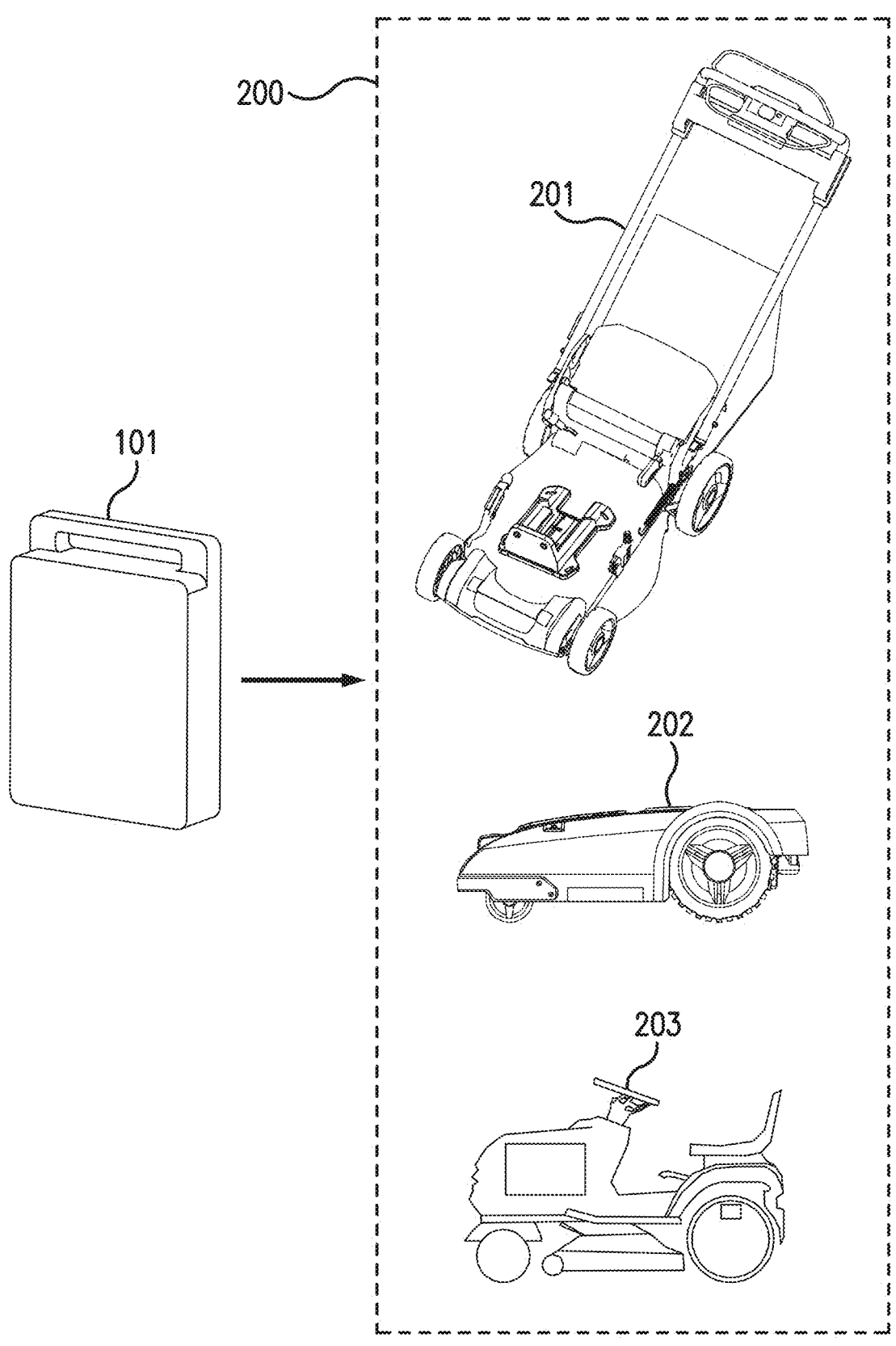
FIG. 3A is a schematic diagram of a scenario in which a battery pack supplies power to a wheeled power tool according to an embodiment of this present disclosure.
Figure 3B:
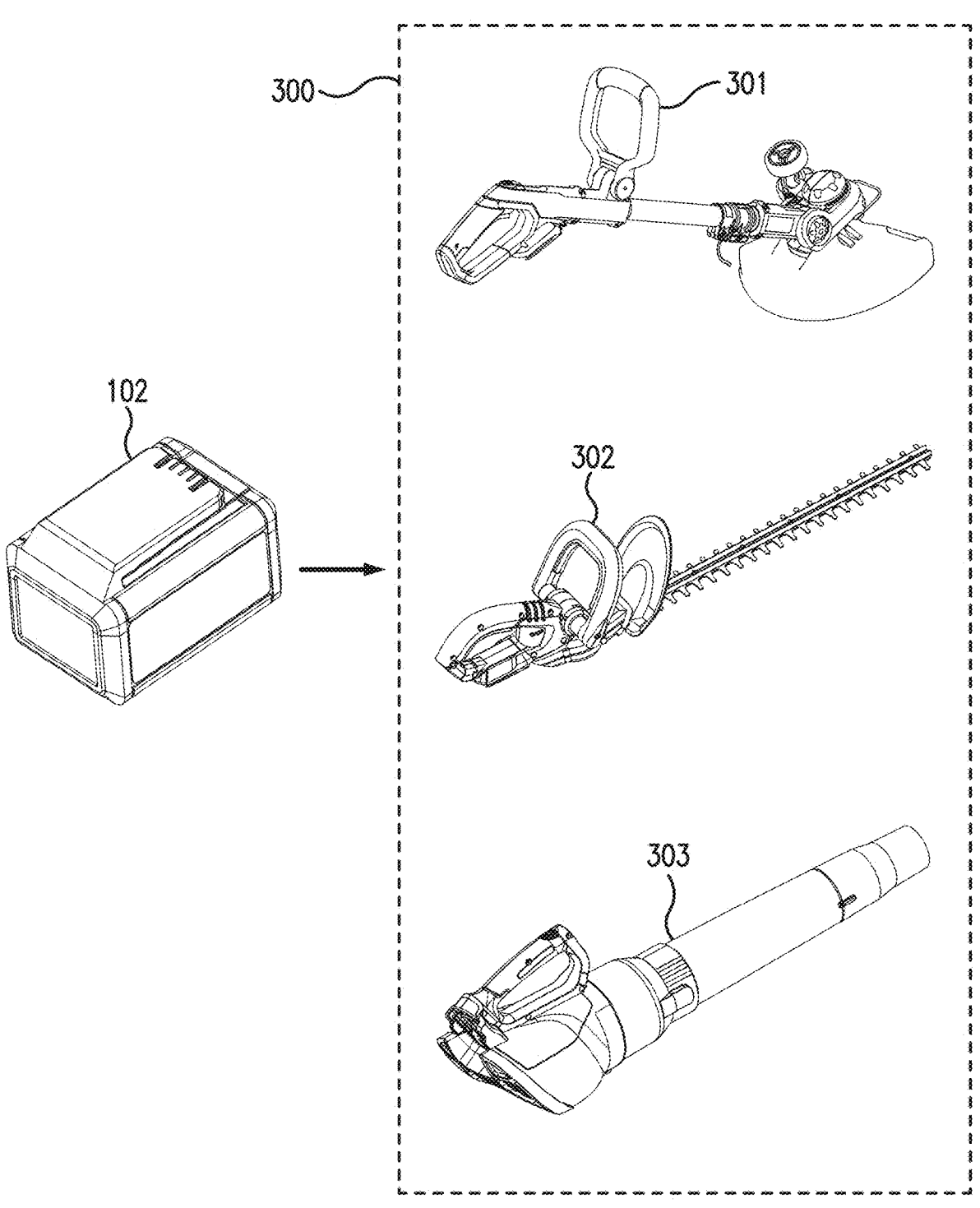
FIG. 3B is a schematic diagram of a scenario in which a battery pack supplies power to a handheld power tool according to an embodiment of this present disclosure.

As shown in FIG. 3A-3B, based on the diversity and the use convenience of the garden tools, this disclosure provides two types of battery packs, that is, a first type battery pack W101 (a first example embodiment) and a second type battery pack 102 (a second example embodiment). A capacity of the first type battery pack 101 may be greater than a capacity of the second type battery pack 102. The first type battery pack 101 is configured to supply power to power tools having a large size and a high power, for example, wheeled or backpack power tools 200, including a hand push lawn mower 201, an intelligent lawn mower 202, and a riding lawn mower 203. During use, the first type battery pack 101 may be directly mounted on the wheeled or backpack power tool 200, and a user does not need to directly bear the weight of the battery pack.

The second type battery pack 102 is configured to supply power to handheld power tools 300 such as a grass trimmer 301, a pruner 302, and a blower 303. The second type battery pack 102 may be directly mounted on the handheld power tool 300, and a worker does not need to supply power to the handheld power tool 300 through a cable when using the handheld power tool 300, thereby achieving more convenient use. When going out to work, a garden team may pre-mount the second type battery pack 102 on each carried handheld power tool 300, so that when one handheld power tool is switched to another handheld power tool, the other handheld power tool can be directly used without mounting the battery pack. This may have an advantage in that it more directly conforms to habits of the worker trained to use conventional fuel tools. For example, the handheld power tools 300 of a garden power tool system includes a grass trimmer 301, a pruner 302, and a blower 303. A garden team may pre-mount a second type battery pack 102 on each of the grass trimmer 301, the pruner 302, and the blower 303 before working in a garden each time. After grass trimming is finished, a worker may directly perform pruning by using the pruner 302 without mounting the battery pack on the pruner 302. After pruning is finished, the blower 303 is directly used for blowing without mounting the battery pack on the blower 303.

Figure 4A:
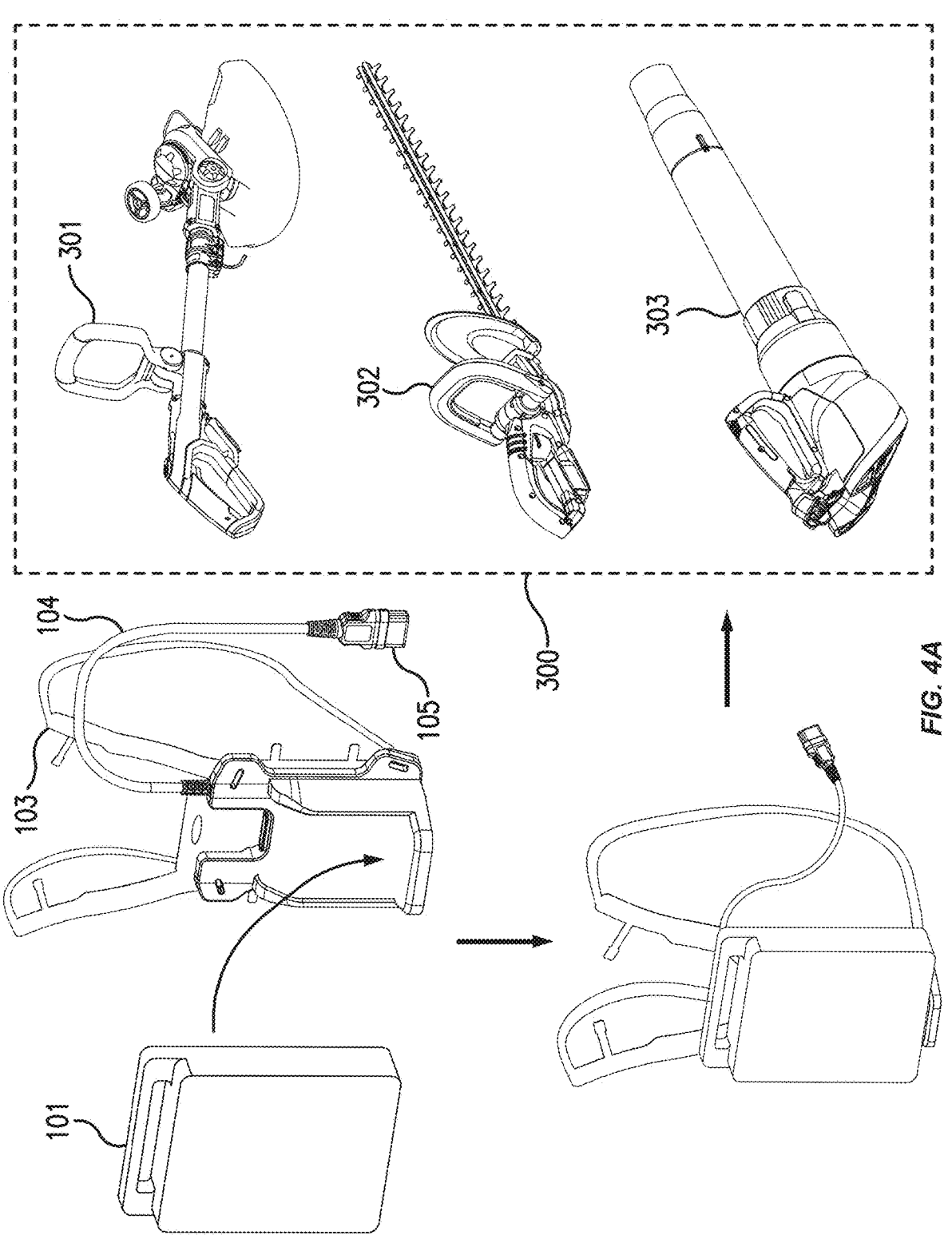
FIG. 4A is a schematic diagram of a scenario in which a battery pack on a backpack supplies power to a handheld power tool according to an embodiment of this present disclosure.
Figure 4B:
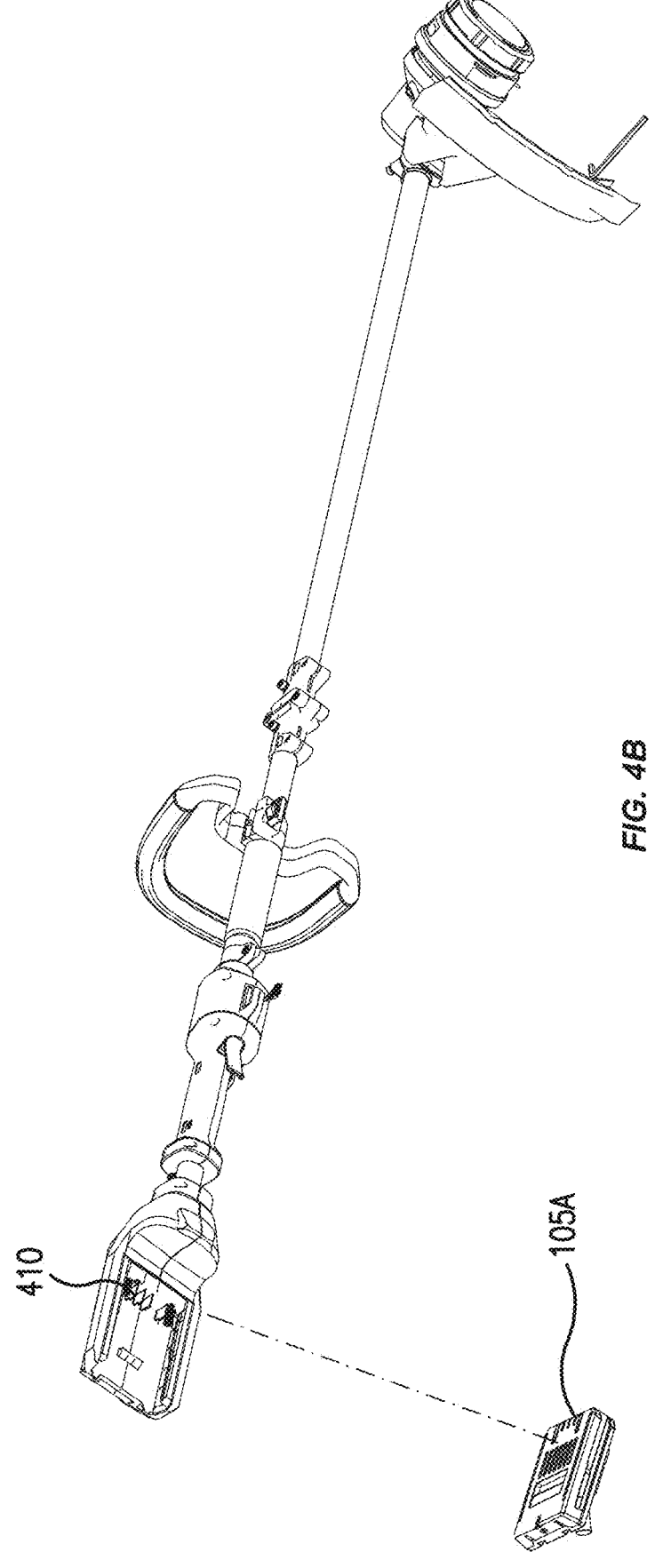
FIG. 4B is a schematic diagram of a scenario in which a battery pack on a backpack supplies power to a handheld power tool according to an embodiment of this present disclosure.

When a working region has a relatively large area, the first type battery pack 101 may also be used to supply power to the handheld power tool 300, to extend a duration at which the handheld power tool 300 can work and reduce a frequency at which the battery pack needs to be replaced. As shown in FIG. 4A, in this embodiment, the battery pack system further includes a backpack apparatus 103. The first type battery pack 101 is detachably mounted on the backpack apparatus 103. The backpack apparatus 103 further includes a power cable 104. One end of the power cable 104 is provided with a power port 105 (e.g., a port connecting the battery pack to the power tool). A tool port matching the power port 105 is provided on the handheld power tool 300, and the first type battery pack 101 may be connected to the handheld power tool by the power cable 104 and the power port 105, to supply power to the handheld power tool 300. As shown in FIG. 4B, the power port 105A can be configured to match a tool port 410 on a commercially available power tool. For example, the first type battery pack 101 is first connected to the grass trimmer 301, and the worker performs grass trimming by using the grass trimmer 301. After grass trimming is completed, the connection between the grass trimmer 301 and the first type battery pack 101 is released, and then the pruner 302 is connected to the first type battery pack 101 and the pruner 302 starts working. After pruning is completed, the connection between the pruner 302 and the first type battery pack 101 is released, and the blower 303 is connected to the first type battery pack 101 and the blower starts working.

Figure 5A:
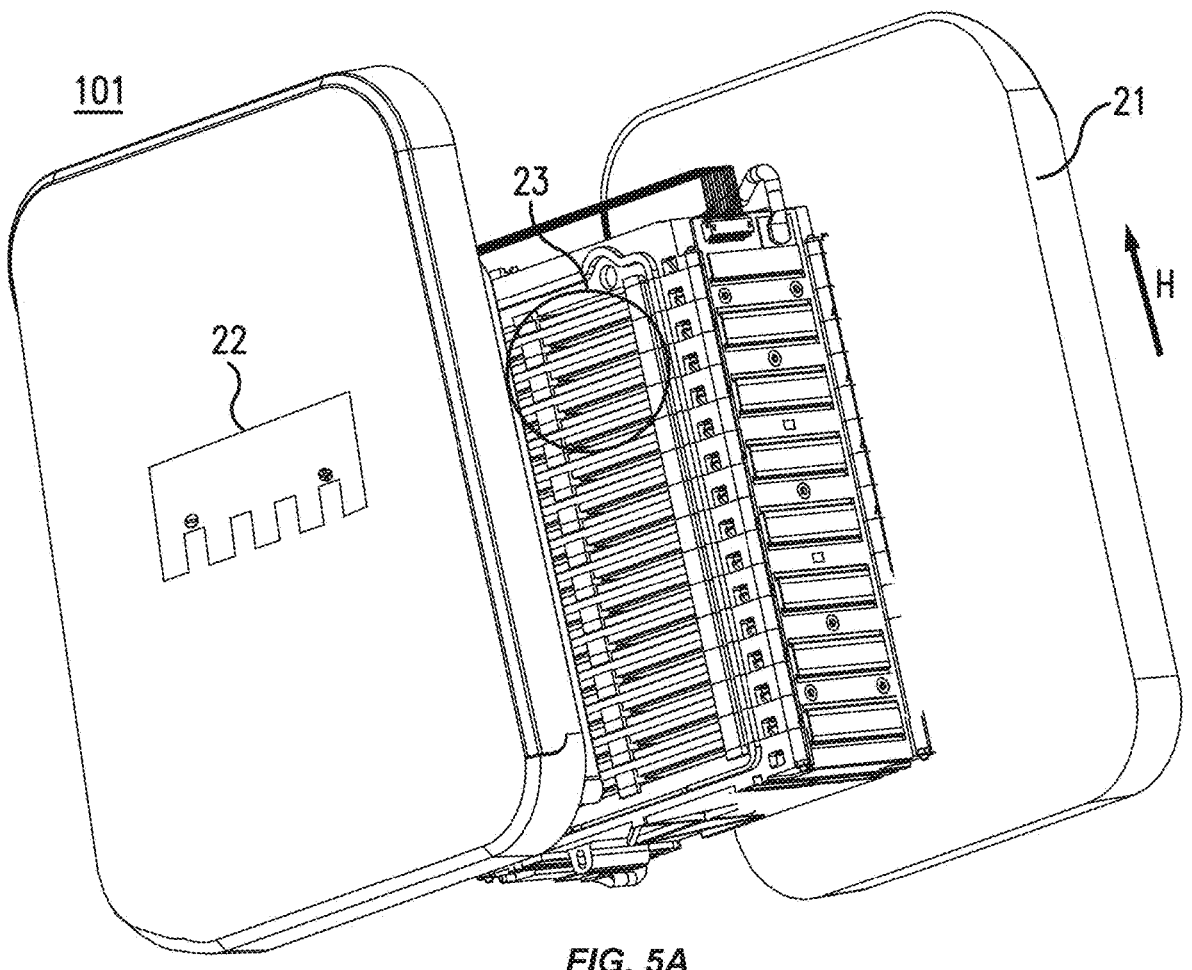
FIG. 5A is a schematic structural diagram of a battery pack when split, according to an embodiment of this present disclosure.
Figure 5B:
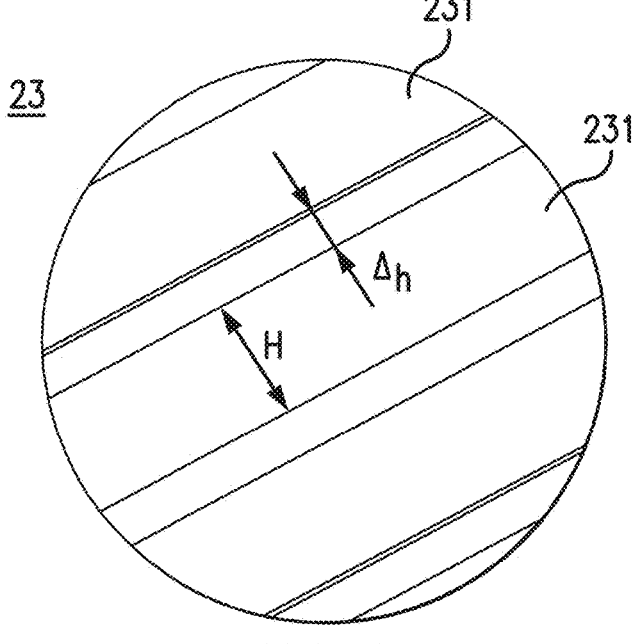
FIG. 5B is a partial schematic structural diagram of an electric energy storage unit in a battery pack according to an embodiment of this present disclosure.

FIG. 5A is a schematic structural diagram of the first type battery pack 101. The first type battery pack 101 includes a housing 21, a charging and discharging port 22, and an electric energy storage unit 23. The charging and discharging port 22 is provided on the housing 21. A connection terminal is arranged in the charging and discharging port 22 and is configured to connect the electric energy storage unit 23. An external device may be connected to the electric energy storage unit 23 by the charging and discharging port 22 and is configured to charge the electric energy storage unit 23 or obtain electric energy from the electric energy storage unit 23. The electric energy storage unit 23 is arranged in the housing 21. The electric energy storage unit 23 includes a plurality of single cells 231, and each single cell 231 is a sheet-like cell. The plurality of single cells 231 overlap in a thickness direction H of the single cell, and the plurality of single cells 231 are connected in series. As shown in FIG. 5B, an air gap exists between adjacent single cells 231 in a stacking direction, and a distance Ah between two adjacent single cells 231 is greater than or equal to $\frac{1}{12}$ of a thickness H of the single cell 231. Therefore, the air gap is provided between the single cells 231, and the air gap is in communication with the outside, so that an air flow may pass through the air gap to assist the cell in heat dissipation. In some embodiments, the thickness H of the single cell 231 is in a range from 11 mm to 14 mm. For example, the thickness H of the single cell 231 is 12.5 mm±0.5 mm. The distance Ah between two adjacent single cells 231 is 1.5 mm±0.5 mm.

A quantity of single cells in the first type battery pack is not greater than 15. A capacity of the battery pack is not less than 11 Ah, and an amount of energy thereof is not less than 600 Wh. The first type battery pack has a weight of not greater than 8 kg (e.g., about 7.8 kg) and may be mounted on a hand push lawn mower, an intelligent lawn mower, or a riding lawn mower and configured to supply power to the lawn mower, or may be mounted on the backpack apparatus. A user puts the battery pack on the back for use, to supply power to the handheld power tool.

Figure 5C:
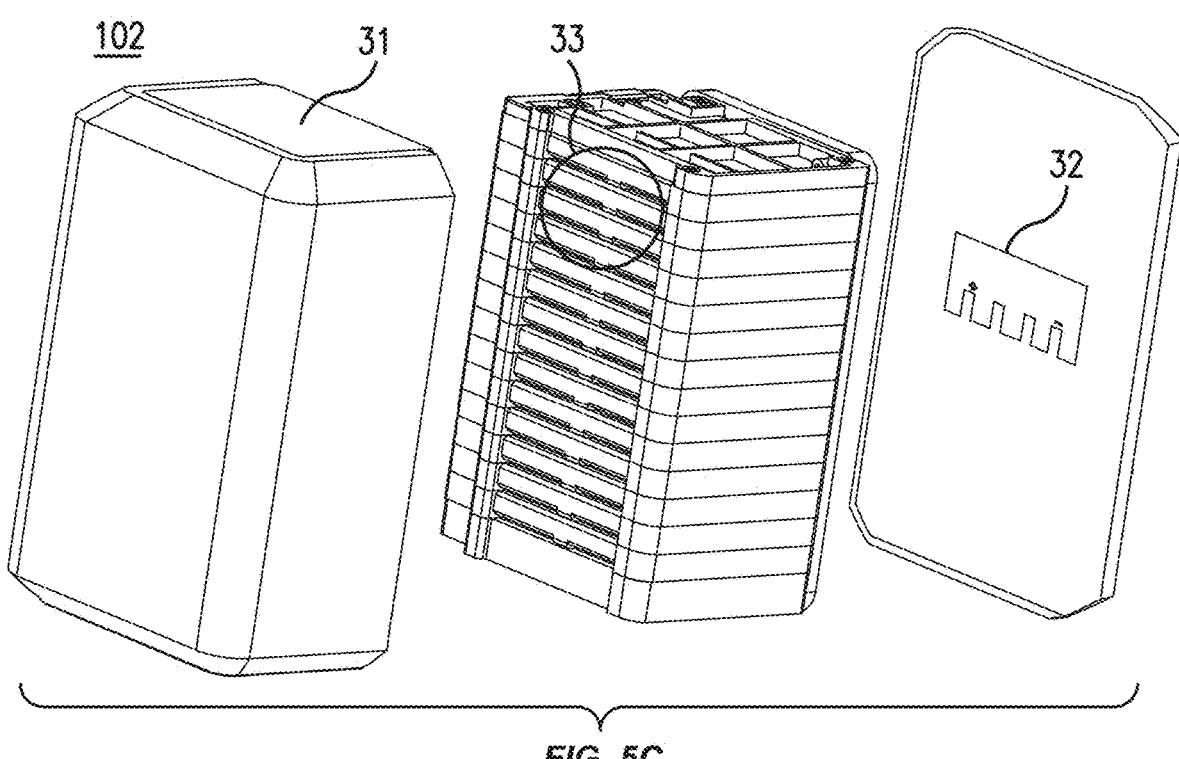
FIG. 5C is a schematic structural diagram of an alternative battery pack when being split, according to an embodiment of this present disclosure.
Figure 5D:
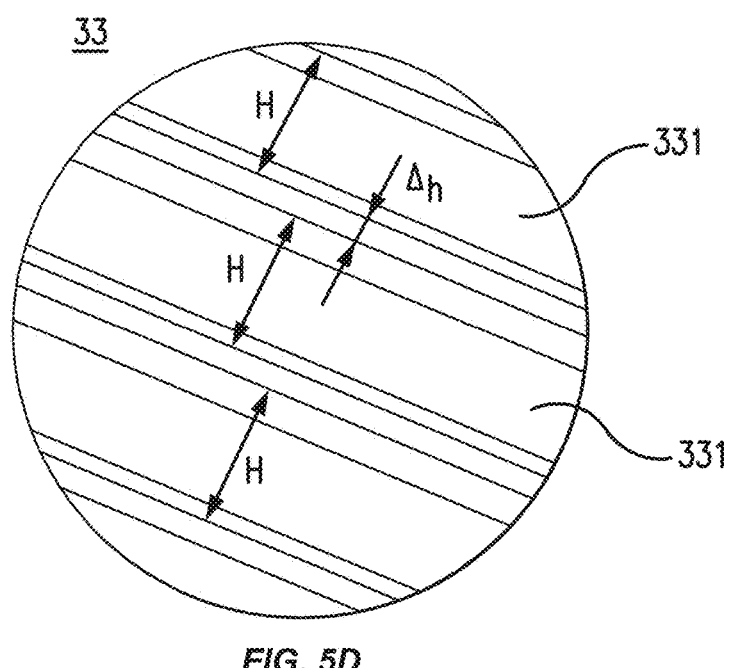
FIG. 5D is a partial schematic structural diagram of an electric energy storage unit in the alternative battery pack, according to an embodiment of this present disclosure.

As shown in FIG. 5C, a structure of the second type battery pack 102 is similar to the structure of the first type battery pack 101 and also includes a housing 31, a charging and discharging port 32, and an electric energy storage unit 33. The charging and discharging port 32 is provided on the housing 31. The electric energy storage unit 33 is arranged in the housing 31. The electric energy storage unit 33 includes a plurality of single cells 331. Each single cell 331 is a sheet-like cell. The plurality of single cells 331 are stacked in a thickness direction H thereof. A size of the single cell 331 in the second type battery pack 102 is less than a size of the single cell 231 in the first type battery pack 101. Correspondingly, a capacity of the single cell 331 in the second type battery pack 102 is less than a capacity of the single cell 231 in the first type battery pack 101. Similarly, as shown in FIG. 5D, an air gap also exists between adjacent single cells 331 in the second type battery pack 102 in a stacking direction, and a distance Ah between two adjacent single cells 331 is greater than or equal to $\frac{1}{12}$ of a thickness H of the single cell 331. Therefore, the air gap is provided between the single cells 331, and the air gap is in communication with the outside, so that an air flow may pass through the air gap, to assist the cell in heat dissipation. In some embodiments, the thickness H of the single cell 331 is in a range from 8 mm to 10 mm. For example, the thickness H of the single cell 331 is 8.7 mm±0.5 mm. The distance Ah between two adjacent single cells 331 is 1.5 mm±0.5 mm.

A quantity of single cells 331 in the second type battery pack 102 is not greater than 15. A capacity of the battery pack is not less than 4 Ah, and an amount of energy thereof is not less than 216 Wh. The second type battery pack 102 has a weight of not greater than 3.5 kg (e.g., about 3 kg) and may be directly mounted on a handheld power tool 300 such as a grass trimmer 301, a pruner 302, or a blower 303 and configured to provide power to the handheld power tool 300.

Figure 5E:
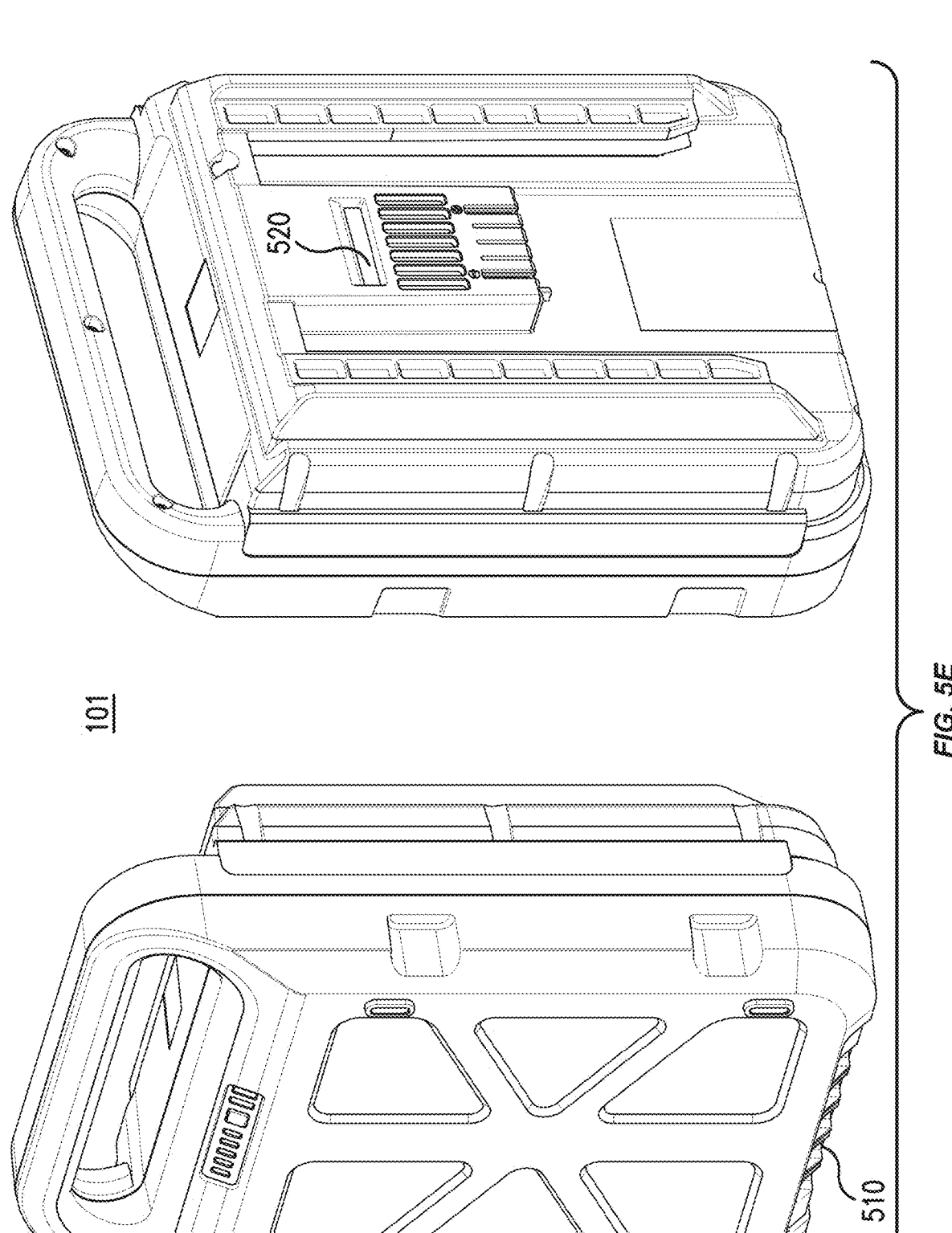
FIG. 5E is a partial schematic structural diagram of an electric energy storage unit in a battery pack according to an embodiment of this present disclosure.
Figure 5F:
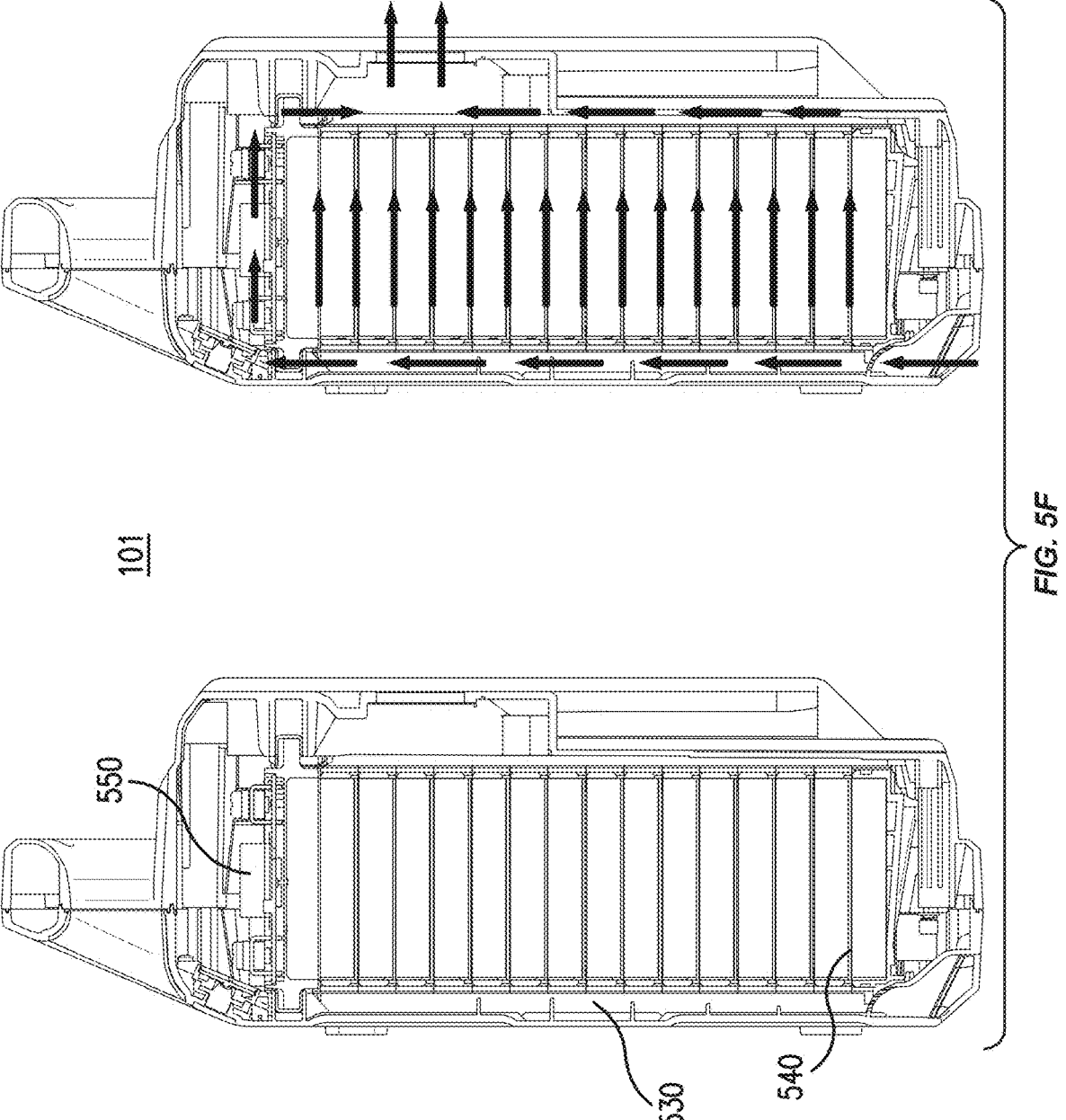
FIG. 5F is a cross-sectional diagram of an electric energy storage unit in the battery pack according to an embodiment of this present disclosure.

As shown in FIG. 5E, a battery pack includes an air intake 510 and an air outlet 520 enabling air cooling during charging. When the battery pack is connected to the charger, the fan in the charger exhausts air for the battery pack through the air outlet 520 of the battery pack. Similarly, as shown in FIG. 5F, gaps 540 between the cells allow for intercellular cooling. An air flue 530 serves as a manifold urging airflow between the cells. Finally, a heat sink 550 contacting the control circuitry draws heat from the control circuitry into the path of the airflow, providing cooling for the control circuitry as well.

Therefore, by using the design of the capacity of the battery pack, working of a high-power power tool can be supported. In addition, the second type battery pack with a relatively small capacity is designed for the handheld power tool, so that a worker can configure a battery pack for each power tool, and does not need to switch the energy source when replacing the handheld power tool, thereby conforming to the use habit of the conventional fuel tool.

Further, a continuous discharge rate of the single cell in the first type battery pack 101 is not less than 4 C (rate=current/capacity). Since the capacity of the first type battery pack 101 is not less than 11 Ah, a continuous discharge current of the first type battery pack 101 is not less than 40 A (e.g., 44 A).

A continuous discharge rate of the single cell in the second type battery pack 102 is not less than 10 C. Since the capacity of the second type battery pack 102 is not less than 4 Ah, a continuous discharge current of the second type battery pack 102 is not less than 40 A.

It should be noted that the continuous discharge rate refers to that the battery pack may be continuously discharged at the discharge rate all the time from a fully charged state to an empty state. The continuous discharge rate may identify a discharge capability of the battery pack.

According to the battery pack provided, a discharge capability of the single cell is not limited thereto and a higher discharge rate may be supported. Specifically, the continuous discharge rate of the single cell in the battery pack is not less than 10 C and may reach 10 C to 100 C. When the discharge rate of the battery pack is within this range, a battery is not damaged.

For example, the continuous discharge rate of the single cell in the battery pack may reach 10 C to 20 C. For example, the continuous discharge rate of the battery pack may be 10 C, 15 C, or 20 C. When the continuous discharge rate of the single cell in the battery pack ranges from 10 C to 20 C, the battery pack may support working of a large quantity of high-power power tools, and within the rate range, the battery pack has a relatively low temperature rise after discharging ends and may start charging without waiting after discharging ends.

For example, the continuous discharge rate of the single cell in the battery pack may reach 20 C to 30 C. For example, the continuous discharge rate of the battery pack may be 20 C, 25 C, or 30 C. When the continuous discharge rate of the single cell in the battery pack ranges from 20 C to 30 C, the battery pack may support working of a higher-power power tool.

For example, the continuous discharge rate of the single cell in the battery pack may reach 30 C to 50 C. For example, the continuous discharge rate of the battery pack may be 30 C, 40 C, or 50 C. When the continuous discharge rate of the single cell in the battery pack ranges from 30 C to 50 C, the battery pack may further be used in other high-power electrical appliances in addition to the field of power tools.

For example, the continuous discharge rate of the single cell in the battery pack may reach 50 C to 100 C. For example, the continuous discharge rate of the battery pack may be 50 C, 60 C, 70 C, 80 C, 90 C, or 100 C. When the continuous discharge rate of the single cell in the battery pack ranges from 50 C to 100 C, a surface temperature (e.g., a temperature of the exterior of the housing) of the battery pack exceeds a normal working temperature range of the battery pack after discharging is performed, and it is necessary to wait for the battery pack to cool down before being charged.

It may be understood that the continuous discharge rate of the single cell in the battery pack may reach 10 C to 100 C, which does not mean that the single cell in the battery pack necessarily works at a discharge rate of 10 C or more. That is, the single cell in the battery pack may also be discharged at a rate of less than 10 C. Specifically, the discharge rate of the battery pack may be set according to a power of a power tool.

In some aspects, when the battery pack is charged at a rate of 3 C under an ambient temperature (e.g., about 20° C.), the battery pack can experience a temperature rise of up to, or not exceeding 15° C. (e.g., from about 17° C. to about 32° C.). Similarly, when the battery pack is charged at a rate of 5 C under an ambient temperature, the battery pack temperature can rise up to 17° C., for example from about 22° C. to about 39° C. Additionally, when the battery pack is charged at a rate of 10 C under an ambient temperature (e.g., about 25° C.), the battery pack can exhibit a temperature rise of up to 21° C., in some cases from about 22° C. to about 43° C.

Additionally, the increase in the temperature of the battery pack can be less than 20° C. during a first cycle of at least six charge-discharge cycles when the charge rate is 4 C and the discharge rate is 4 C. The battery pack can be configured to continuously discharge and charge for at least six charge-discharge cycles without an idle time. When cycling without an idle time, the increase in the temperature of the battery pack during the charge-discharge cycle can be from about 15° C. to about 25° C. when the charge rate is from about 6 C to about 8 C.

Figure 1:
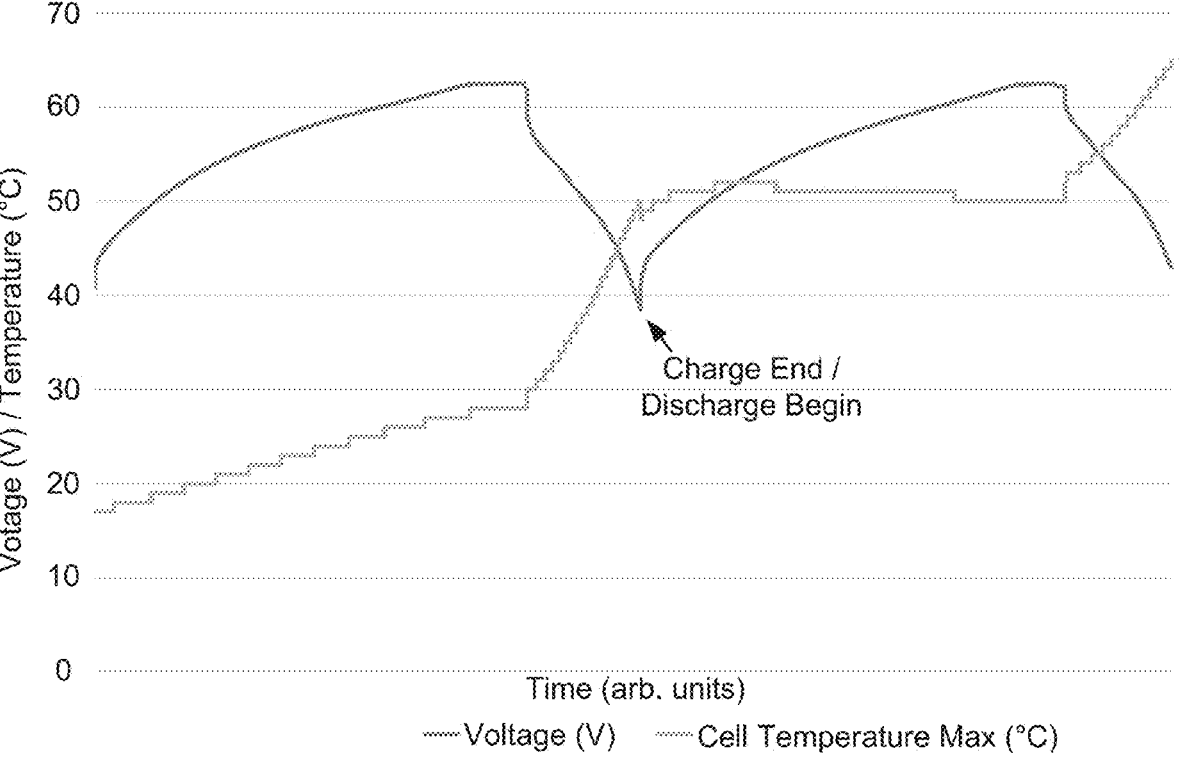
FIG. 1 is a chart illustrating how a temperature and a voltage of a battery pack change with charging and discharging time when the battery pack performs a single charge and discharge cycle at a charge rate of 3 C and a discharge rate of 10 C according to an embodiment of this present disclosure.

In certain embodiments, as shown in FIG. 1, the battery pack includes a charge rate of 3 C and a discharge rate of 10 C. When the battery pack is charged at a rate of 3 C, the battery pack can exhibit a temperature rise of up to 15° C. Conversely, when the battery pack is discharged at a rate of 10 C, the battery pack can exhibit a temperature rise of up to 35° C. Preferably, after charging the battery pack at a charge rate of 3 C, the absolute temperature of the battery pack is less than a predetermined discharging protection temperature. Likewise, after discharging the battery pack at a discharge rate of 10 C, the absolute temperature of the battery pack is less than a charging protection temperature. When meeting these parameters, the battery pack can be discharged immediately after charging, and after discharging, the battery pack can be charged immediately after discharging. The above charge and discharge cycle can be performed at least 2 times. For example, when the cycle is performed two times (e.g., charging at 3 C, discharging at 1° C., charging at 3 C, and discharging at 10 C), the absolute battery pack temperature remains less than the discharging protection temperature of about 60° C. Eventually, the absolute temperature of the battery pack may be higher than the predetermined protection temperatures and the battery pack must be cooled prior to any further charge or discharge. As used herein, a discharging protection temperature is a temperature too high for safe battery pack discharge, and a charging protection temperature is a temperature too high for safe battery pack charge. Accordingly, logic circuitry in the charging apparatus and/or the power tool will trigger a protection protocol disallowing battery pack charge or discharge, respectively.

To be used as a commercial garden tool, a power tool needs to complete enough work per unit time and needs to continuously work during a working time of one day. Correspondingly, this requires a continuous energy supply for the commercial garden power tools. Therefore, the improvement of the working efficiency of the power tool—that is, for example, the amount of time the tool can be used continuously or over the course of the day—also needs to be considered when the conventional fuel tool is replaced by the power tool. In addition to improving the working efficiency by using a high-power power tool, according to another aspect, an energy replenishing time of the power tool also needs to be reduced. Therefore, the power tool does not need to wait for energy, that is, energy is continuously supplied to the power tool, so that the power tool continuously works.

Based on this, at least two ways to replenish energy of the power tool are disclosed. In a first energy replenishing method, a work team carries all energy required for working outside for one day. In a second energy replenishing method, the work team carries a part of energy, and replenishes power in midway. Each way to replenish energy is described in turn.

For the first energy replenishing method, the following specific energy replenishing solution may be provided.

As a first example, a battery pack with enough energy to support a day's work may be carried. A capacity of the battery pack can support a day's work of a plurality of power tools. In a typical use scenario, the battery pack may first supply power to a lawn mower. The lawn mower may be an intelligent lawn mower, a hand push lawn mower, or the like. After mowing is completed, the battery pack continues to supply power to a grass trimmer, so that the grass trimmer performs grass trimming. After grass trimming is completed, the battery pack supplies power to a pruner, so that the pruner performs pruning. After pruning is completed, the battery pack supplies power to a blower, so that the blower completes blowing.

As a second example, each power tool required for garden work may be equipped with a battery pack that has enough energy to support a day's work. For example, since a garden power tool system includes a lawn mower, a grass trimmer, a pruner, and a blower, four battery packs may be carried. Energy of the four battery packs may support the lawn mower, the grass trimmer, the pruner, and the blower to work for one day without replacing the battery packs.

As a third example, the garden power tool system may be equipped with a plurality of battery packs that have enough energy to support a day's work. Some battery packs are working battery packs, and some other battery packs are backup battery packs. For example, when the garden power tool system includes a lawn mower, a grass trimmer, a pruner, and a blower, each power tool may be equipped with one working battery pack, and each power tool is equipped with enough backup battery packs. After amounts of power are used, the working battery packs are replaced by the backup battery packs until the power tools complete all of the work. A total capacity of the working battery packs and the backup battery packs is enough to support the corresponding power tool to continuously work outside for one day.

For the second energy replenishing method, the power tool system may be equipped with a plurality of battery packs according to different use scenarios. The plurality of battery packs are charged in turn for use by the power tool system. The plurality of battery packs is divided into two groups. One group is working battery packs, and the other group is backup battery packs. When the working battery packs are mounted on the power tools for discharging, the backup battery packs are charged. Before the working battery packs are empty, the backup battery packs are fully charged. The backup battery packs are then mounted on the tools to supply power to the tools, and the working battery packs are charged. Power is continuously supplied through such an alternated cycle. For example, if the power tool system includes a lawn mower, a grass trimmer, a pruner, and a blower, a work team includes two people (a worker A and a worker B), the worker A completes mowing by using the lawn mower, and the worker B completes other work by using the grass trimmer, the pruner, and the blower, two groups of battery packs may be equipped for work performed by worker A, one group serves as working battery packs, and the other group serves as backup battery packs, and two groups of battery packs are equipped for work performed by worker B, one group serves as working battery packs, and the other group serves as backup battery packs. When an amount of energy of the working battery pack runs out, the backup battery pack is used to supply power and charge the working battery pack, so that the two battery packs continuously supply power in turn. In this example, four battery packs may be equipped for the worker A and the worker B. Two battery packs are working battery packs, and two battery packs are backup battery packs. In another example, when a charging speed of the battery pack is relatively slow, six or more battery packs may also be equipped for the worker A and the worker B. Some battery packs are configured to support work performed by worker A, and some other battery packs are configured to support work performed by worker B.

The power tool system can continuously work in the two energy replenishing manners. However, the commercial garden tools are usually equipped by the garden company. Due to the commercial attribute, it is necessary to consider the use costs. In addition, the operation convenience is also a factor of consideration. If the battery pack is excessively large and heavy, the operation is inconvenient, and the working efficiency is also affected.

According to the requirement of the first energy replenishing manner for the configuration of the battery pack, the capacity of the battery pack needs to be large enough or sufficient battery packs are required, to support the power tool to continuously work outside for one day. Typically, a capacity of a common single cell on the market is generally relatively small (which is generally less than 5 Ah). If the capacity of the battery pack needs to be increased, a quantity of single cells in the battery pack is easily increased, which undoubtedly increases a size and a weight of the battery pack. In the energy replenishing manners shown in the first example and the second example, the weight and the size of the battery pack are excessively large, which leads to inconvenience in operation whether the battery pack is mounted on the power tool or carried on the back of the user. In the third example, carrying a large quantity of battery packs leads to relatively high use costs of the power tool, and carrying is inconvenient when there are an excessive quantity of battery packs.

In the second energy replenishing manner, a limited quantity of battery packs is equipped for the power tool system according to the use scenarios of the commercial garden power tools and a quantity of workers on a garden team. The plurality of battery packs may perform charging and discharging in turn to supply power to the power tool system, so that the use costs of the power tool system are relatively low, and it is convenient to carry a relatively small quantity of battery packs.

Therefore, the second energy replenishing manner is preferably selected to supply power to the power tool system in consideration of the use costs and the use convenience. This requires a sufficiently high charging speed of the battery pack. Before a battery pack on the power tool is discharged or when the battery pack has been discharged, a backup charging battery pack may be fully charged.

When the battery pack system includes N backup battery pack(s), a total charging speed of the N backup battery pack(s) needs to be greater than or equal to a discharging speed of one working battery pack, that is, N*V charging≥V discharging, N being an integer greater than or equal to 1, V charging being a charging speed of the battery pack, and V discharging being a discharging speed of the battery pack. The charging speed and the discharging speed of the battery pack depend on charge and discharge rates of the battery pack. Therefore, the formula may be converted to N*C charging≥C discharging, C charging being a charge rate of the battery pack, and C discharging being a discharge rate of the battery pack. When there is one backup battery pack (that is, N=1), that is, when the power tool is equipped with one working battery pack and one backup battery pack, it is required that a charging speed of the backup battery pack needs to be greater than or equal to a discharging speed of the working battery pack. When there are a plurality of backup battery packs (that is, N>1), it is required that a total charging speed of the plurality of backup battery packs is greater than a discharging speed of one working battery pack. For example, when N is 2, that is, a charging speed of two backup battery packs needs to be greater than or equal to a discharging speed of one working battery pack, and the power tool can continuously work with the equipped three battery packs. When a first battery pack is mounted on the power tool, and after the first battery pack has been discharged, a second battery pack is mounted on the tool and charges the first battery pack. After the second battery pack has been discharged, a third battery pack is mounted on the power tool and charges the second battery pack. In this case, both the first battery pack and the second battery pack are charged. Before the third battery pack has been discharged, the first battery pack has been fully charged. Therefore, after the third battery pack has been discharged, the first battery pack may be mounted on the power tool, so that the power tool can continuously work. To reduce the use costs of the battery pack and make it easy for the garden team to carry when going out, preferably, a smaller value of N is better, that is, fewer carried backup battery packs are better. This requires that the charge rate of the battery pack is equivalent to the discharge rate. Preferably, the charge rate is greater than or equal to the discharge rate. It may be understood that the working battery pack and the backup battery pack mentioned in this example are battery packs of a same specification. When a battery pack is mounted on only the power tool and configured to support working of the power tool, the battery pack is the working battery pack, and the remaining battery pack is the backup battery pack.

To improve the working efficiency of the power tool and implement the continuous working of the power tool, a waiting time after finishing charging and discharging of the battery pack needs to be further reduced in addition to reducing a charging time of the battery pack. The reason is that typically, in a case of a fixed capacity of the battery pack, a larger charge/discharge current of the battery pack indicates that heating of the battery pack is more serious. If a temperature of the battery pack is excessively high and exceeds a normal working temperature range of the battery pack, during charging and discharging, after charging is finished, or after discharging is finished, the battery pack starts a temperature protection mechanism, to stop charging/ discharging, and may continue to perform charging/discharging after waiting for the temperature to reduce to a safety temperature. Therefore, to allow the power tool system to have a continuous energy supply, after charging is finished, the battery pack may be immediately mounted on the power tool for discharging and may be immediately charged after the discharging is finished without waiting for cooling down. This requires that a maximum temperature of the battery pack cannot exceed a temperature protection threshold of the battery pack during charging and discharging, and a maximum temperature after a continuous charging and discharging cycle process ends cannot exceed the temperature protection threshold, so that the battery pack may continue a next round of charging and discharging without waiting after one round of charging and discharging is finished.

Battery packs on the market generally cannot meet charge rate requirements and temperature rise requirements of the commercial garden power tools on the battery packs. A common ternary lithium battery system 18650-type battery pack is used as an example. A continuous charge rate of the battery pack is less than 3 C and usually ranges from 0.5 C to 1 C, and the charging speed is relatively slow. If a charge current is increased, and a charge rate is increased, a surface temperature of the battery pack is increased rapidly. If the battery pack immediately starts discharging after charging is finished, the battery pack is discharged at a relatively high temperature. Consequently, after one charge and discharge cycle is finished, a temperature of the battery pack has reached the temperature protection threshold, and a next round of charging and discharging cannot be performed. As a result, after one battery pack is fully charged and used once, the battery pack needs to be stood for cooling, and a next round of charging and discharging can be started after a temperature is reduced to room temperature. Therefore, if a power tool needs to continuously work, a plurality of groups of backup battery packs are required.

In addition, currently, a charger for the battery pack usually charges the battery pack by using a utility power. That is, one end of the charger is connected to the utility power by a socket, and another end of the charger is connected to the battery pack to convert the utility power into a direct current to charge the battery pack. However, due to a limitation of the safety regulation of the socket, an output power of the socket is limited, and a large current cannot be provided to the battery pack for charging. For example, a standard voltage of a utility power of the United States is 110V, and a fusing current of most sockets is 15 A. Therefore, a power that can be withstood by most sockets does not exceed 1800 W. Therefore, a charging power of the battery pack is limited by two aspects currently. In one aspect, the utility power cannot provide a relatively large output power to charge the battery pack, and in another aspect, the battery pack itself cannot be charged at a large power.

According to a battery pack provided described herein, a charge rate and a temperature rise after finishing charging and discharging the battery pack can meet the requirements of the commercial garden power tools, thereby improving the working efficiency of the commercial garden power tools.

Specifically, a continuous charge rate of a single cell in the battery pack is not less than 3 C, which may support fast charging. In this embodiment, the continuous charge rate of the single cell in the battery pack may reach 3 C to 20 C, that is, the charge rate of the single cell in the battery pack may be 3 C, 4 C, 5 C, 6 C, 7 C, 8 C, 9 C, 1° C., 11 C, 12 C, 15 C, or 20 C. It may be understood that a charging capability of the single cell in the battery pack being greater than or equal to 3 C does not mean that the single cell can be continuously charged at only a rate of greater than or equal to 3 C. In some scenarios, the single cell in the battery pack may also be continuously charged at a charge rate of less than 3 C, for example, 1 C or 2 C.

As an example, when the first type battery pack 101 is charged from an empty state to a fully charged state, a continuous charge rate of the single cell is not less than 6 C.

When the second type battery pack 102 is charged from an empty state to a fully charged state, a continuous charge rate of the single cell is not less than 12 C. As described herein, the single cells in the battery pack are connected in series. Therefore, the charge rate of the battery pack is equal to the charge rate of the single cell. That is, a continuous charge rate of the first type battery pack 101 is not less than 6 C, a continuous discharge rate thereof is not less than 4 C, a continuous charge rate of the second type battery pack 102 is not less than 12 C, and a continuous discharge rate thereof is not less than 10 C. It may be understood that the continuous charge rate of the battery pack is used for identifying a capability of the battery pack and does not mean that the battery pack is necessarily charged and discharged with the capability. That is, the battery pack may also be charged and discharged at a charge/discharge rate of less than the capability. This may be specifically determined based on an actual situation.

In addition, this present disclosure further provides a movable power replenishing apparatus. An output power thereof is greater than that of a utility power, and a large current can be provided to charge the battery pack. As shown in FIG. 2A, the mobile charging apparatus 400 may be an energy storage cabinet which stores electric energy by itself. The mobile charging apparatus 400 may be placed on a vehicle and moved with the power tool system to various gardens with a user, to replenish power to an exhausted battery pack at any time, so as to avoid having to find a replenishment power supply when working on the move. For example, for each worker of a plurality of workers at a job site, while the worker is using a first battery pack, a second battery pack can be charged at the job site. When the plurality of workers moves to a second job site, the worker can use the second battery pack to power garden electric power tools used by the respective worker at the second job site and charge the first battery pack at the second job site. For example, the method includes arriving at a first job site; using a first battery pack to power a power tool used at the first job site, wherein the first battery pack is fully charged; charging, while at the first job site, a second battery pack; finishing work at the first job site and traveling to a second job site; while at the second job site, placing the second battery pack in the power tool and using the power tool at the second job site; and, while at the second job site, charging the first battery pack.

The mobile charging apparatus 400 is an energy storage charging apparatus. The user may fully charge an energy storage component in the mobile charging apparatus 400 at night, and replenish power to the battery pack by using the mobile charging apparatus 400 when going out to work during the day. The mobile charging apparatus 400 is charged in a direct-current charging manner, and an output power of mobile charging apparatus 400 is not less than 2400 W. Preferably, the output power of the mobile charging apparatus 400 is not less than 3600 W at a charge rate of 5 C, to support large current charging. Therefore, the battery pack provided can withstand large-rate charging, and the mobile charging apparatus 400 provided can provide a large current to charge the battery pack.

In certain cases, the system described herein can include multiple battery packs that can be alternatively charged to continuously supply power to a variety of power tools. For example, a first battery pack and a second battery pack can be configured to power an electric power garden tool. The mobile charging apparatus can be configured to accept one or both of the battery packs at any given time. In the present example, the mobile charging apparatus can alternatively charge the battery packs such that electrical energy is continuously supplied to the electric power garden tool. Accordingly, while the first battery pack is in use, the second battery pack can be charging. When the first battery pack is depleted of power, the second battery pack can be removed from the mobile charging apparatus and attached to the tool. The first battery pack can then be connected to the mobile charging apparatus and charge while the second battery pack is in use. In certain embodiments, the mobile charging apparatus is configured to provide electrical energy sufficient for a plurality of jobs. For example, the mobile charging apparatus has a minimum output power of greater than 3600 W and can charge the battery packs a charge rate of 5 C. In some cases, the mobile charging apparatus can supply power for up to 12 hours on a single charge.

In some embodiments, the mobile charging apparatus can operate in a first charging mode and/or in a second charging mode. The first charging mode includes a charge output of about 3.6 kW and a charging rate of up to 1° C. for a 4 Ah battery pack or greater than 4 C for an 11 Ah battery pack. When in the second charging mode, the mobile charging apparatus output can be 7.2 kW and the charging rate is up to 1° C. for an 11 Ah battery pack. In some examples, the output power of the mobile charging apparatus is greater than or equal to 3.6 kW and the power rating of any one of the plurality of power tools is less than or equal to 3 kW.

As such, the mobile charging apparatus has at least two charging modules, a single charging module outputs 3.6 kW, and multiple single modules in parallel output more than 7.2 kW. Accordingly, when in the first charging mode the charging modules work independently, and when in the second charging mode multiple single modules work in parallel.

Further, when a battery pack is connected to the mobile charging apparatus, the mobile charging apparatus includes a logic to determine the capacity of the connected battery pack. The mobile charging apparatus can then determine what power to supply to the batter pack, e.g., either 3.6 kW (e.g., the first charging mode) or 7.2 kW (e.g., the second charging mode).

In other embodiments, there can be a user-operated switch on the mobile charging apparatus to manually switch from the first charging mode to the second charging mode. For example, there can be a user-operated switch which, when activated, will cause the mobile charging apparatus to check the charging power requirement from the battery pack. If the current charging power is suitable for the connected battery pack, the charging mode will be the first charging mode supplying 3.6 kW. Otherwise, the charging mode will be switched from the first charging mode to the second charging mode to provide greater power (e.g., 7.2 kW).

The energy density of the battery cell in the mobile charging apparatus is greater than that of the battery pack, and the capacity of the mobile charging apparatus is greater than that of the battery pack. Thus, an energy ratio between the mobile charging apparatus and the battery pack is greater than 3. Accordingly, a weight ratio between the battery cells in the mobile charging apparatus and the battery cells in the battery pack is less than the capacity ratio. For example, a weight of the second battery pack can be less than 3.5 kg and the capacity can be from about 3.6 Ah to about 4 Ah, the weight of the first battery pack can be less than 8 kg and the capacity can be from about 8 Ah to about 11 Ah, and the weight of the mobile charging apparatus can be less than 130 kg and the capacity can be at least 100 Ah. The capacity of the second battery pack can be less than the capacity of the first battery pack, the first battery pack and the second battery pack can have the same capacity, or the second battery pack can have a lower capacity than the first battery pack. Any suitable capacity configuration is acceptable. In some cases, the maximum life cycle of the battery cell of the mobile charging apparatus can be less than a maximum life cycle of the battery cell of the battery pack. As such, a ratio of the life cycle of the battery cell of the battery pack to the life cycle of the battery cell of the mobile charging apparatus is greater than 3. This means a maximum life cycle of the mobile charging apparatus is less than a maximum life cycle of the battery pack, a ratio of the life cycle of the battery pack to the life cycle of the mobile charging apparatus is greater than 3.

In preferred embodiments, the mobile charging apparatus is configured to, based on a capacity of the battery pack, determine a needed charging power for the battery pack, and based on the charging power determined to be needed, switch between the first and second charging modes. For example, the mobile charging apparatus can operate in the first charging mode when a 4 Ah battery is connected. On the other hand, when an 11 Ah battery pack is connected, the mobile charging apparatus can operate in the second charging mode, supplying 7.2 kW.

In some examples, the battery pack can have a continuous discharge power in a range from about 0.4 kW to about 1.5 kW for at least 8 minutes and the internal resistance of the battery cell can be less than or equal to 1 milliohm.

Further, the battery pack provided not only has large charge and discharge rates but also has a low temperature rise during large-rate charging and large-rate discharging of the battery pack. Additionally, the battery pack can charge more quickly than it can discharge.

Specifically, the charging apparatus of the battery pack is provided with a cooling fan, configured to be started when the battery pack is charged, to drive an air flow to cool the battery pack and be closed when charging is finished. In this embodiment, when the cooling fan is started, an output power of the cooling fan is greater than or equal to 5 W and less than or equal to 7 W, a rated rotational speed is not less than 2000 RPM, and an air volume of the cooling fan is greater than or equal to 24 cubic feet per minute (FCM) and less than or equal to 30 FCM, thereby achieving a relatively good cooling effect. As shown in FIG. 5B and FIG. 5D, since the single cell in the battery pack is a sheet-like cell, and a gap exists between adjacent cells in a thickness direction of the single cell, a heat dissipation air passage may be formed between two adjacent cells. When being started, the cooling fan may drive an air flow to flow in the heat dissipation air passage, to dissipate heat for the surface of the single cell. In addition, since the single cell is a sheet-like cell with a large heat dissipation area, a heat dissipation effect can be improved. In an example, such a battery cell as is used in any of the battery packs disclosed may be known as a Type 2 battery is available from Suzhou Elementec New Energy Material Co., Ltd. of No. 9, Haixin South Road, Nanfeng Town, Zhangjiagang City, Jiangsu Province, China.

When the charging apparatus does not start the cooling fan, and when the battery pack provided is charged at a continuous charge rate of greater than or equal to 3 C and less than or equal to 6 C at room temperature (around 25° C., which has a deviation of around ±3° C.), a temperature rise of the surface of the battery pack is greater than or equal to 6° C. and less than or equal to 15° C. When the battery pack is charged at a continuous charge rate of greater than or equal to 6 C and less than or equal to 8 C at room temperature, the temperature rise of the surface of the battery pack is greater than or equal to 15° C. and less than or equal to 25° C. When the battery pack is charged at a continuous charge rate of greater than or equal to 8 C and less than or equal to 12 C at room temperature, the temperature rise of the surface of the battery pack is greater than or equal to 25° C. and less than or equal to 35° C.

When the charging apparatus starts the cooling fan, and when the battery pack provided is charged at the continuous charge rate of greater than or equal to 3 C and less than or equal to 6 C at room temperature, the temperature rise of the surface of the battery pack is greater than or equal to 3° C. and less than or equal to 12° C. When the battery pack is charged at the continuous charge rate of greater than or equal to 6 C and less than or equal to 8 C at room temperature, the temperature rise of the surface of the battery pack is greater than or equal to 12° C. and less than or equal to 21° C. When the battery pack is charged at the continuous charge rate of greater than or equal to 8 C and less than or equal to 12 C at room temperature, the temperature rise of the surface of the battery pack is greater than or equal to 21° C. and less than or equal to 33° C.

However, when the charging apparatus starts the cooling fan, and a conventional 21700 lithium iron phosphate system battery pack is charged at a charge rate of 2 C at room temperature, a temperature rise of the battery pack has reached 14° C., and temperature rise performance of the conventional 18650 lithium battery pack is poorer than temperature rise performance of the 21700 lithium iron phosphate system battery pack. When the two types of battery packs are charged at a continuous charge rate of greater than 3 C, the temperature rises have reached charging protection temperature values of the battery packs. Therefore, the two types of battery packs are usually charged at a charge rate of less than or equal to 2 C. When the charging apparatus does not start the cooling fan, the battery pack provided has a temperature rise of only 6° C. during charging at a continuous charge rate of 3 C, which is less than the temperature rise of the conventional 18650 lithium battery pack and the temperature rise of the 21700 lithium iron phosphate system battery pack during charging at the continuous charge rate of 2 C when the charging apparatus starts the cooling fan. When the charging apparatus starts the cooling fan, the battery pack provided has a temperature rise of only 3° C. during charging at the continuous charge rate of 3 C, which is far less than the temperature rise of the 21700 lithium iron phosphate system battery pack and the temperature rise of the 18650 lithium battery pack during charging at the continuous charge rate of 2 C. In addition, even if the battery pack provided is charged at a continuous charge rate of 12 C, the temperature rise of the battery pack still does not reach the temperature protection value when the charging apparatus does not start the cooling fan. It can be learned that the battery pack provided not only has a large charge rate but also has a low temperature rise when being charged at a large rate, which is beneficial to supporting continuous cyclical work of the battery pack.

The battery pack provided not only has a low temperature rise during charging but also has a relatively low temperature rise during discharging. Specifically, when the battery pack is discharged at a continuous discharge rate of greater than or equal to 3 C and less than or equal to 4 C at room temperature, a temperature rise of the surface of the battery pack is greater than or equal to 10° C. and less than or equal to 15° C. When the battery pack is discharged at a continuous discharge rate of greater than or equal to 4 C and less than or equal to 1° C. at room temperature, the temperature rise of the surface of the battery pack is greater than or equal to 15° C. and less than or equal to 35° C.

As an example, when the charging apparatus starts the cooling fan, if the first type battery pack is charged at a continuous charge rate of 3 C at room temperature, a temperature rise of the battery pack is 6° C., and if the first type battery pack is charged at a continuous charge rate of 6 C at room temperature, the temperature rise of the battery pack is 15° C. If the second type battery pack is charged at a continuous charge rate of 12 C at room temperature, a temperature rise of the battery pack is 35° C.

When the charging apparatus starts the cooling fan, if the first type battery pack is charged at a continuous charge rate of 3 C at room temperature, the temperature rise of the battery pack is 3° C., if the first type battery pack is charged at a continuous charge rate of 4 C at room temperature, the temperature rise of the battery pack is 10° C., and if the first type battery pack is charged at a continuous charge rate of 6 C at room temperature, the temperature rise of the battery pack is 12° C. If the second type battery pack is charged at a continuous charge rate of 8 C at room temperature, the temperature rise of the battery pack is 21° C., and if the second type battery pack is charged at a continuous charge rate of 12 C at room temperature, the temperature rise of the battery pack is 33° C.

When the first type battery pack is discharged at a continuous discharge rate of 3 C at room temperature, the temperature rise of the battery pack is 10° C. When the first type battery pack is discharged at a continuous discharge rate of 4 C at room temperature, the temperature rise of the battery pack is 15° C. If the second type battery pack is discharged at a continuous discharge rate of 10 C at room temperature, the temperature rise of the battery pack is 35° C.

Therefore, the battery pack has a low temperature rise during high-rate charging and discharging. After discharging is finished, the battery pack may immediately start charging without waiting due to the low temperature rise or after charging is finished, the battery pack may immediately start discharging without waiting due to the low temperature rise.

Figure 6:
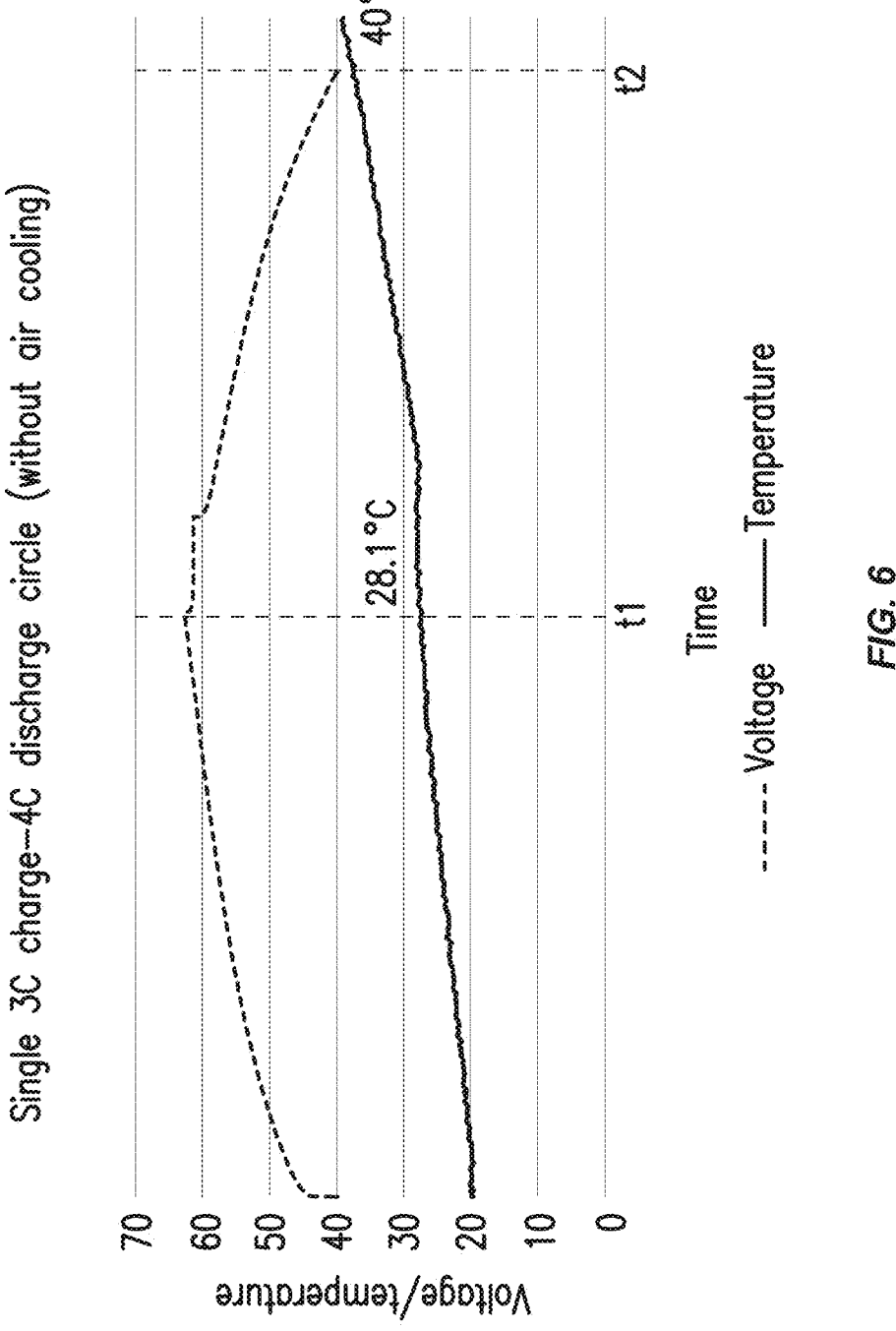
FIG. 6 is a chart illustrating how a temperature and a voltage of a battery pack change with charging and discharging time when the battery pack performs a single charge and discharge cycle at a charge rate of 3 C and a discharge rate of 4 C when a charging apparatus does not start a cooling fan according to an embodiment of this present disclosure.

In addition, a surface temperature of the battery pack provided still does not reach a temperature protection threshold of the battery pack after a single charge and discharge cycle ends, so that the battery pack can continuously perform a next charge and discharge cycle. Specifically, when the charging apparatus does not start the cooling fan, and the battery pack performs a single charge and discharge cycle at a charge rate of 3 C and a discharge rate of 4 C at room temperature, curves of a surface temperature and a voltage of the battery pack changing with time are shown in FIG. 6. A dashed line is a curve of the voltage of the battery pack changing with charging and discharging time, and a solid line is a curve of the surface temperature of the battery pack changing with the charging and discharging time. A process of fully charging the battery pack from an amount of power of 0 to an amount of power of 100% and then discharging from 100% to 0 is a single charge and discharge cycle process of the battery pack. The voltage curve that the voltage of the battery pack rises at a time period of 0 to t1. In this case, the battery pack is in a charged state. The voltage of the battery pack drops at a time period of t1 to t2. In this case, the battery pack is in a discharged state. As shown in FIG. 6, at a moment 0, the battery pack does not start charging, and the surface temperature is the same as room temperature, which is 25° C. When charging is finished (at a moment t1), the surface temperature of the battery pack rises to 28.1° C. Since a charging protection temperature of the battery pack is 60° C., the surface temperature of the battery pack does not reach the charging protection temperature after the charging is finished, and the battery pack may be directly discharged without waiting. At a moment t2, the surface temperature of the battery pack rises to 40° C. when discharging is finished. Since a discharging protection temperature of the battery pack is 70° C., the surface temperature of the battery pack does not reach the discharging protection temperature value of the battery pack when a single charge and discharge cycle ends, and the battery pack does not perform discharging protection. Since the surface temperature does not reach the charging protection temperature value of the battery pack, the battery pack may be continuously charged. Based on the foregoing, even if the charging apparatus does not start the cooling fan when the battery pack provided in this embodiment is charged, the battery pack may also immediately start a next charge and discharge cycle without waiting when a single charge and discharge cycle ends.

Figure 7:
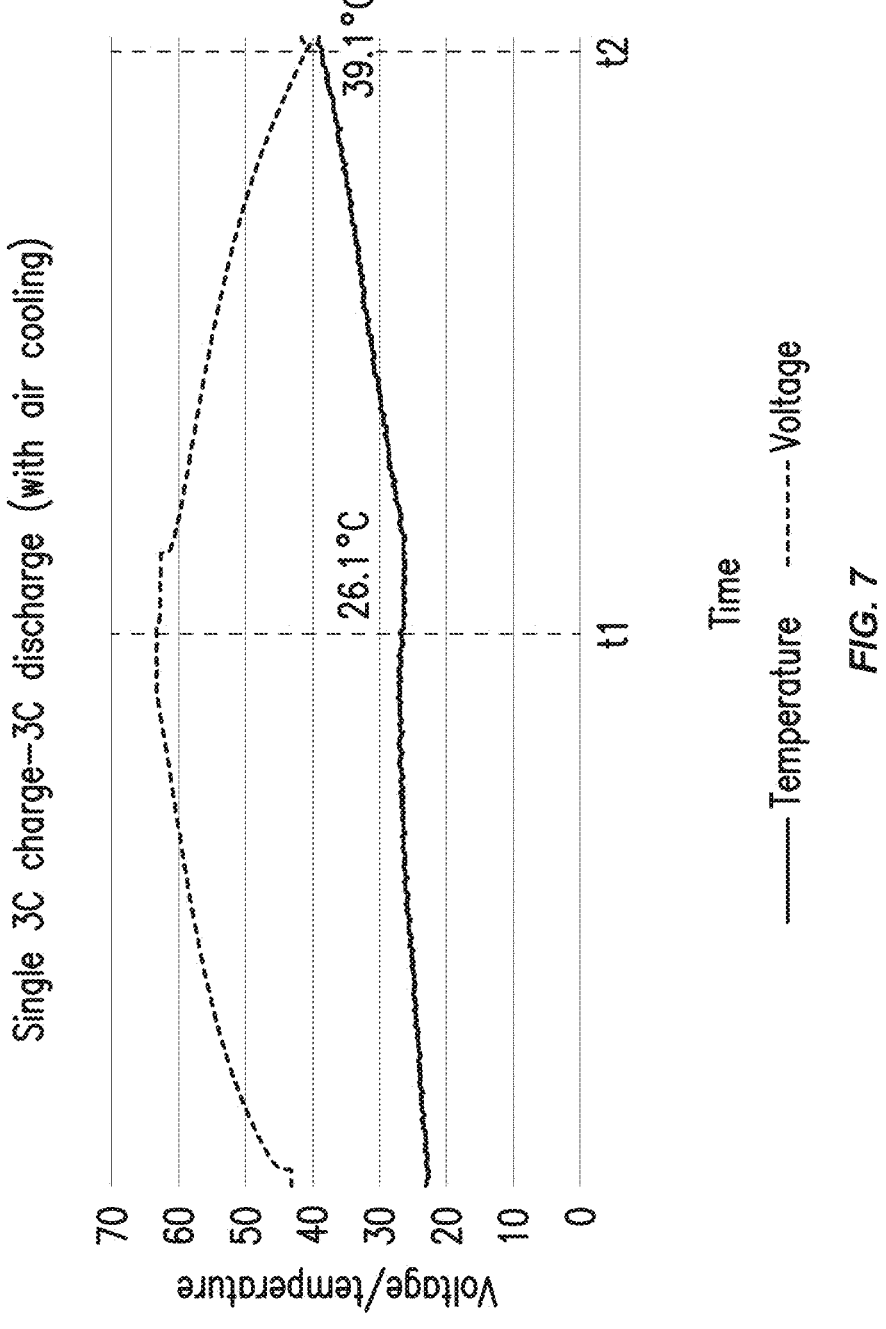
FIG. 7 is a chart illustrating how a temperature and a voltage of a battery pack change with charging and discharging time when the battery pack performs a single charge and discharge cycle at a charge rate of 3 C and a discharge rate of 3 C when a charging apparatus starts a cooling fan according to an embodiment of this present disclosure.

When the charging apparatus starts the cooling fan, and the battery pack performs a single charge and discharge cycle at a charge rate of 3 C and a discharge rate of 3 C at room temperature, curves of a temperature and a voltage of the battery pack changing with time are shown in FIG. 7. The voltage of the battery pack rises at a time period of 0 to t1. In this case, the battery pack is in a charged state. The voltage of the battery pack drops at a time period of t1 to t2. In this case, the battery pack is in a discharged state. When charging is finished at a moment t1, the surface temperature of the battery pack is 26.1° C. Since the charging protection temperature of the battery pack is 60° C., the battery pack has a relatively low surface temperature after single charging is finished and may be directly discharged without waiting. When discharging of the battery pack is finished at a moment t2, the surface temperature of the battery pack is 39.1° C. Since the discharging protection temperature of the battery pack is 70° C., the surface temperature of the battery pack does not reach the discharging protection temperature value of the battery pack, and the battery pack does not perform discharging protection. Since the surface temperature of the battery pack also does not reach the charging protection temperature value of the battery pack, the battery pack may be continuously charged. When the single charge and discharge cycle of the battery pack at the charge rate of 3 C and the discharge rate of 3 C ends with air cooling, the surface temperature of the battery pack is less than 40° C. Due to the relatively low temperature, the battery pack can be continuously charged and discharged.

Figure 8:
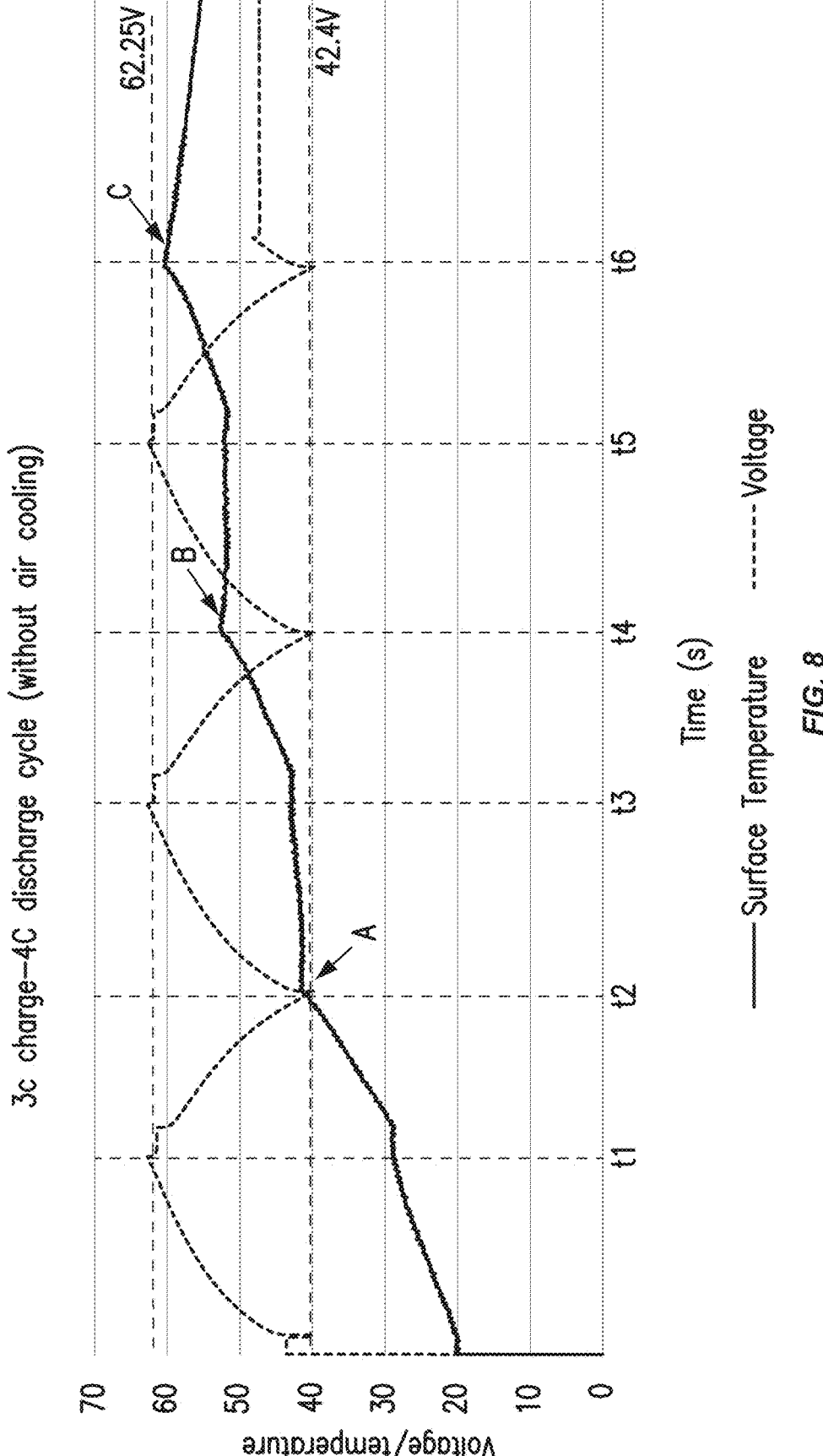
FIG. 8 is a chart illustrating how a temperature and a voltage of a battery pack change with charging and discharging time when the battery pack performs a continuous charge and discharge cycle at a charge rate of 3 C and a discharge rate of 4 C when a charging apparatus not starts a cooling fan according to an embodiment of this present disclosure.

Further, when the charging apparatus does not start the cooling fan, and the battery pack performs a plurality of charge and discharge cycles at a charge rate of 3 C and a discharge rate of 4 C at room temperature, curves of a surface temperature and a voltage of the battery pack changing with time are shown in FIG. 8. A dashed line is a curve of the voltage of the battery pack changing with charging and discharging time, and a solid line is a curve of the surface temperature of the battery pack changing with the charging and discharging time. A process in which the battery pack immediately starts a next charge and discharge cycle without interruption after a single charge and discharge cycle ends is a process in which the battery pack performs a plurality of charge and discharge cycles.

The battery pack has a nominal voltage of 60V and an actual voltage of 62.25V. Each battery pack is formed by connecting 15 single cells in series, and an actual voltage of each single cell is 4.15V. Referring to FIG. 8, a process in which the voltage of the battery pack rises from 42.4V to 62.25V is a charging process, and a process of dropping from 62.25V to 42.4V is a discharging process. A time period 0 to t1 is a first charging process, and a time period t1 to t2 is a first discharging process. That is, a time period 0 to t2 is a first charge and discharge cycle process. At a moment t2, a surface temperature A of the battery pack is 40° C. after the first charge and discharge cycle ends. Therefore, a temperature rise of the first charge and discharge cycle is 15° C. Since the charging protection temperature of the battery pack is 60° C., the surface temperature of the battery pack does not reach the charging protection temperature after the first charge and discharge cycle ends, and the battery pack may directly perform a next charge and discharge cycle without waiting. A time period t2 to t3 is a second charging process, and a time period t3 to t4 is a second discharging process. That is, a time period t2 to t4 is a second charge and discharge cycle process. At a moment t4, a surface temperature B of the battery pack is 52° C. after the second charge and discharge cycle ends. Since the charging protection temperature of the battery pack is 60° C., the surface temperature of the battery pack still does not reach the charging protection temperature after the second charge and discharge cycle ends, and the battery pack may directly perform a next charge and discharge cycle. A time period t4 to t5 is a third charging process, and a time period t5 to t6 is a third discharging process. That is, a time period t4 to t6 is a third charge and discharge cycle process. At a moment t6, a surface temperature C of the battery pack is 60° C. after the third charge and discharge cycle ends. Since the charge rate and the discharge rate of the battery pack are the same in each charge and discharge cycle, and a charging time and a discharging time are also the same in each cycle, time of each charge and discharge cycle of the battery pack is equal, that is, t2=t4−t2=t6−t4.

Based on the foregoing, when the charging apparatus does not start the cooling fan, the battery pack may maintain three times of continuous charge and discharge cycles when being charged and discharged at the charge rate of 3 C and the discharge rate of 4 C, and the temperature of the battery pack reaches the charging temperature protection value after three cycles.

However, when performing a charge and discharge cycle at the charge rate of 3 C and the discharge rate of 4 C, the conventional lithium battery system 18650 battery pack starts charging protection after one cycle. As a result, the battery pack cannot continuously perform a next round of the charge and discharge cycle. The battery pack of this present disclosure can maintain three times of continuous charge and discharge cycles when the charging apparatus does not start the cooling fan because the temperature rise performance of the battery pack is good and a temperature rise speed is slow. In addition, the charging protection temperature value of the battery pack is greater than that of the conventional battery pack. The charging protection temperature value of the battery pack of this present disclosure is 60° C. Due to the good temperature rise performance, the surface temperature is far away from the charging protection temperature value after charging and discharging are finished. Therefore, charging may continue after a charge and discharge cycle process. However, a charging protection temperature of the conventional 18650 system battery pack is 60° C. (with a discharging protection temperature of 80° C.). Due to a relatively high temperature rise of the 18650 lithium battery pack, the conventional 18650 lithium battery pack needs to wait for the battery pack to cool down after being charged and discharged once at the charge rate of 3 C and the discharge rate of 4 C.

During actual use, the cooling fan is started when the charging apparatus performs charging. Therefore, the battery pack is cooled during charging, and the battery pack may support more continuous charge and discharge cycles. In this embodiment, when performing a charge and discharge cycle at a charge rate of not less than 3 C and a discharge rate of not less than 3 C at room temperature, the battery pack may maintain at least six times of continuous charge and discharge cycles.

Figure 9:
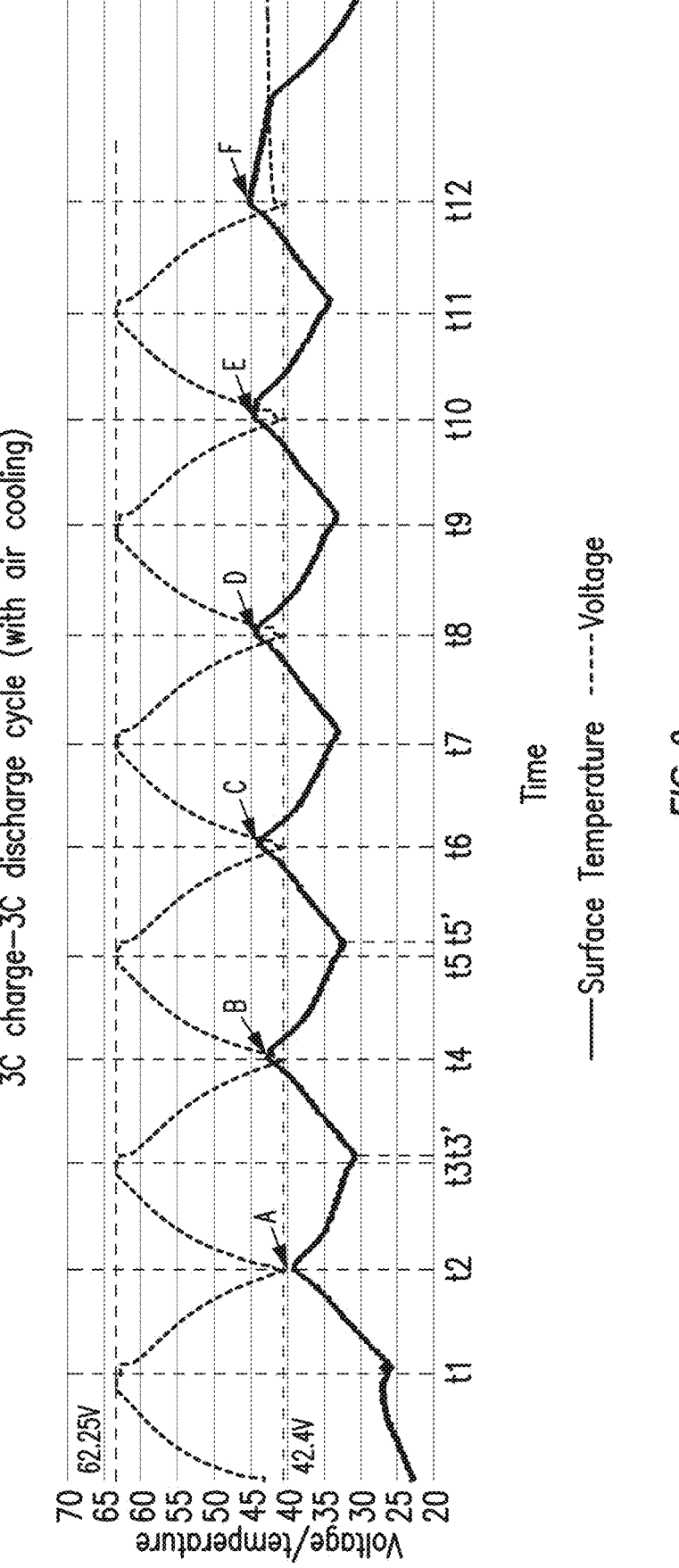
FIG. 9 is a chart illustrating how a temperature and a voltage of a battery pack change with charging and discharging time when the battery pack performs a continuous charge and discharge cycle at a charge rate of 3 C and a discharge rate of 3 C when a charging apparatus starts a cooling fan according to an embodiment of this present disclosure.

As an example, FIG. 9 is a chart in which a surface temperature of a battery pack and a voltage of the battery pack change with charging and discharging time when the battery pack performs a continuous charge and discharge cycle at a charge rate of 3 C and a discharge rate of 3 C at room temperature when a charging apparatus starts a cooling fan. As shown in FIG. 9, a process in which a voltage rises from 42.4V to 62.7V is a charging process of the battery pack, and a process in which the voltage drops from 62.7V to 42.4V is a discharging process of the battery pack. A time period 0 to t1 is a first charging process, and a time period t1 to t2 is a first discharging process. That is, a time period 0 to t2 is a first charge and discharge cycle process. At a moment t2, a surface temperature A of the battery pack is 39.1° C. when the first charge and discharge cycle ends. Since a surface temperature of the battery pack at a moment 0 is the same as room temperature, which is 25° C., a temperature rise of the battery pack is 39.1° C.-25° C.=14.1° C. in the first charge and discharge cycle process.

A time period t2 to t3 is a second charging process, and a time period t3 to t4 is a second discharging process. That is, a time period t2 to t4 is a second charge and discharge cycle process. At a moment t4, a surface temperature B of the battery pack is 42.2° C. when the second charge and discharge cycle ends. Therefore, a temperature rise of the battery pack is 42.2° C.-39.1° C.=3.1° C. in the second charge and discharge cycle process.

A time period t4 to t5 is a third charging process, and a time period t5 to t6 is a third discharging process. That is, a time period t4 to t6 is a third charge and discharge cycle process. At a moment t6, a surface temperature C of the battery pack is 43.4° C. when the third charge and discharge cycle ends. Therefore, a temperature rise of the battery pack is 43.4° C.-42.2° C.=1.2° C. in the third charge and discharge cycle process.

A time period t6 to t7 is a fourth charging process, and a time period t7 to t8 is a fourth discharging process. That is, a time period t6 to t8 is a fourth charge and discharge cycle process. At a moment t8, a surface temperature D of the battery pack is 44.1° C. when the fourth charge and discharge cycle ends. Therefore, a temperature rise of the battery pack is 44.1° C.-43.4° C.=0.7° C. in the fourth charge and discharge cycle process.

A time period t8 to t9 is a fifth charging process, and a time period t9 to t10 is a fifth discharging process. That is, a time period t8 to t10 is a fifth charge and discharge cycle process. At a moment t10, a surface temperature E of the battery pack is 44.4° C. when the fifth charge and discharge cycle ends. Therefore, a temperature rise of the battery pack is 44.4° C.-44.1° C.=0.3° C. in the fifth charge and discharge cycle.

A time period t10 to t11 is a sixth charging process, and a time period t11 to t12 is a sixth discharging process. That is, a time period t10 to t12 is a sixth charge and discharge cycle process. At a moment t12, a surface temperature F of the battery pack is 45.1° C. when the sixth charge and discharge cycle ends. Therefore, a temperature rise of the battery pack is 45.1° C.-44.4° C.=0.7° C. in the sixth charge and discharge cycle process. After the six times of charge and discharge cycles end, the surface temperature of the battery pack is 45° C., which still does not reach the charging temperature protection value and the discharging temperature protection value of the battery pack.

FIG. 9 illustrates that in the first charging process, the temperature of the battery pack rises, and in the second charging process to the sixth charging process, the temperature of the battery pack drops. This is because the temperature of the battery pack rises due to a chemical reaction inside the cell during charging, and generated heat is Q1. Since the temperature of the battery pack is greater than an ambient temperature, the battery pack dissipates heat to the environment, and dissipated heat is Q2. Since a cooling apparatus is started during charging, the heat dissipated by the battery pack is Q3. During first charging, a basic temperature of the battery pack is relatively low, both the heat Q2 dissipated by the battery pack to the environment and the heat Q3 dissipated by the battery pack due to starting of the cooling fan are relatively small, and the heat dissipated by the battery pack to the outside is less than the heat generated by the battery pack, that is, Q2+Q3<Q1, so that a total temperature of the battery pack is on a rising trend in the first charging process. During first discharging, since there is no cooling apparatus, the battery pack can only dissipate heat by exchanging heat with the environment with a slow heat dissipation speed, and the temperature of the battery pack rises, resulting in a relatively high basic temperature of the battery pack during second charging and a fast heat dissipation speed. Therefore, both the heat Q2 dissipated by the battery pack to the environment and the heat Q3 dissipated by the battery pack due to starting of the cooling fan are relatively large, and the heat dissipated by the battery pack to the outside is greater than the heat generated by the battery pack, that is, Q2+Q3>Q1. Therefore, in several times of subsequent cycles, the temperature of the battery pack is on a dropping trend.

In addition, in the charging process in each cycle, a moment when the voltage of the battery pack rises to the highest point and a moment when the temperature of the battery pack drops to the lowest point do not overlap, and the moment when the temperature of the battery pack drops to the lowest point is later than the moment when the voltage of the battery pack rises to the highest point. For example, as shown in FIG. 9, in the second charging process, a moment when the voltage of the battery pack rises to the highest point is t3, a moment when the temperature of the battery pack drops to the lowest point is t3', and t3' is later than t3. In the third charging process, a moment when the voltage of the battery pack rises to the highest point is t5, a moment when the temperature of the battery pack drops to the lowest point is t5', and t5' is later than t5. Other charging processes are similar. This is because the temperature of the battery pack does not change suddenly after charging is finished and discharging is started. At an initial moment of discharging, the temperature of the battery pack continues to drop. As the heat generated by the battery pack during discharging increases, the temperature of the battery pack gradually increases. Therefore, an end moment of charging of the battery pack is subject to the moment when the voltage of the battery pack rises to the highest point.

FIG. 9 also illustrates that when the charging apparatus starts the cooling fan, and when performing a continuous charge and discharge cycle at a charge rate of 3 C and a discharge rate of 3 C, the battery pack may perform at least six times of continuous charge and discharge cycles. Since each time the battery pack performs a charge and discharge rate at a same rate, a duration of each charge and discharge cycle of the battery pack is the same.

Figure 10:
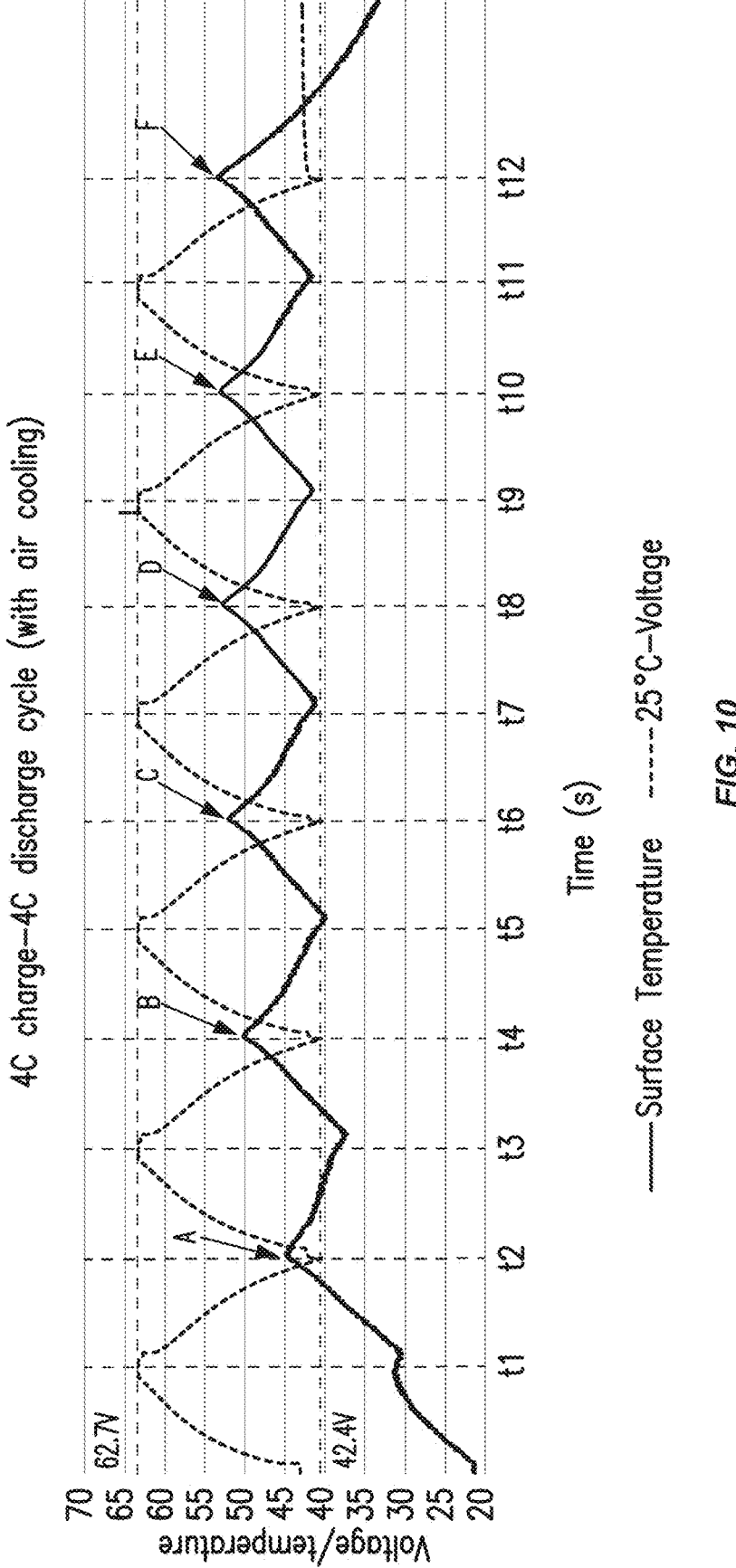
FIG. 10 is a chart illustrating how a temperature and a voltage of a battery pack change with charging and discharging time when the battery pack performs a continuous charge and discharge cycle at a charge rate of 4 C and a discharge rate of 4 C when a charging apparatus starts a cooling fan according to an embodiment of this present disclosure.

As another example, FIG. 10 is a chart in which a surface temperature of a battery pack and a voltage of the battery pack change with charging and discharging time when the battery pack performs a continuous charge and discharge cycle at a charge rate of 4 C and a discharge rate of 4 C at room temperature (25° C.) when a charging apparatus starts a cooling fan. FIG. 10 illustrates that when performing a charge and discharge cycle at charge and discharge rates of 4 C, the battery pack may perform at least six times of continuous charge and discharge cycles. A time period 0 to t1 is a first charging process, and a time period t1 to t2 is a first discharging process. That is, a time period 0 to t2 is a first charge and discharge cycle process. At a moment t2, a surface temperature A of the battery pack is 44.2° C. when the first charge and discharge cycle ends. Since a surface temperature of the battery pack at a moment 0 is the same as room temperature, which is 25° C., a temperature rise of the battery pack is 44.2° C.-25° C.=19.2° C. in the first charge and discharge cycle process.

A time period t2 to t3 is a second charging process, and a time period t3 to t4 is a second discharging process. That is, a time period t2 to t4 is a second charge and discharge cycle process. At a moment t4, a surface temperature B of the battery pack is 49.9° C. when the second charge and discharge cycle ends. Therefore, a temperature rise of the battery pack is 49.9° C.-44.2° C.=5.7° C. in the second charge and discharge cycle process.

A time period t4 to t5 is a third charging process, and a time period t5 to t6 is a third discharging process. That is, a time period t4 to t6 is a third charge and discharge cycle process. At a moment t6, a surface temperature C of the battery pack is 52° C. when the third charge and discharge cycle ends. Therefore, a temperature rise of the battery pack is 52° C.-49.9° C.=2.1° C. in the third charge and discharge cycle process.

A time period t6 to t7 is a fourth charging process, and a time period t7 to t8 is a fourth discharging process. That is, a time period t6 to t8 is a fourth charge and discharge cycle process. At a moment t8, a surface temperature D of the battery pack is 52.7° C. when the fourth charge and discharge cycle ends. Therefore, a temperature rise of the battery pack is 52.7° C.-52° C.=0.7° C. in the fourth charge and discharge cycle process.

A time period t8 to t9 is a fifth charging process, and a time period t9 to t10 is a fifth discharging process. That is, a time period t8 to t10 is a fifth charge and discharge cycle process. At a moment t10, a surface temperature E of the battery pack is 53.1° C. when the fifth charge and discharge cycle ends. Therefore, a temperature rise of the battery pack is 53.1° C.-52.7° C.=0.4° C. in the fifth charge and discharge cycle.

A time period t10 to t11 is a sixth charging process, and a time period t11 to t12 is a sixth discharging process. That is, a time period t10 to t12 is a sixth charge and discharge cycle process. At a moment t12, a surface temperature F of the battery pack is 53.6° C. when the sixth charge and discharge cycle ends. Therefore, a temperature rise of the battery pack is 53.6° C.-53.1° C.=0.5° C. in the sixth charge and discharge cycle process. After the six times of charge and discharge cycles end, the surface temperature of the battery pack is 53.6° C., which still does not reach the charging temperature protection value and the discharging temperature protection value of the battery pack. Therefore, the battery pack may maintain at least six times of continuous charge and discharge cycles when performing the charge and discharge cycle at the charge rate of 4 C and the discharge rate of 4 C at room temperature.

Figure 11:
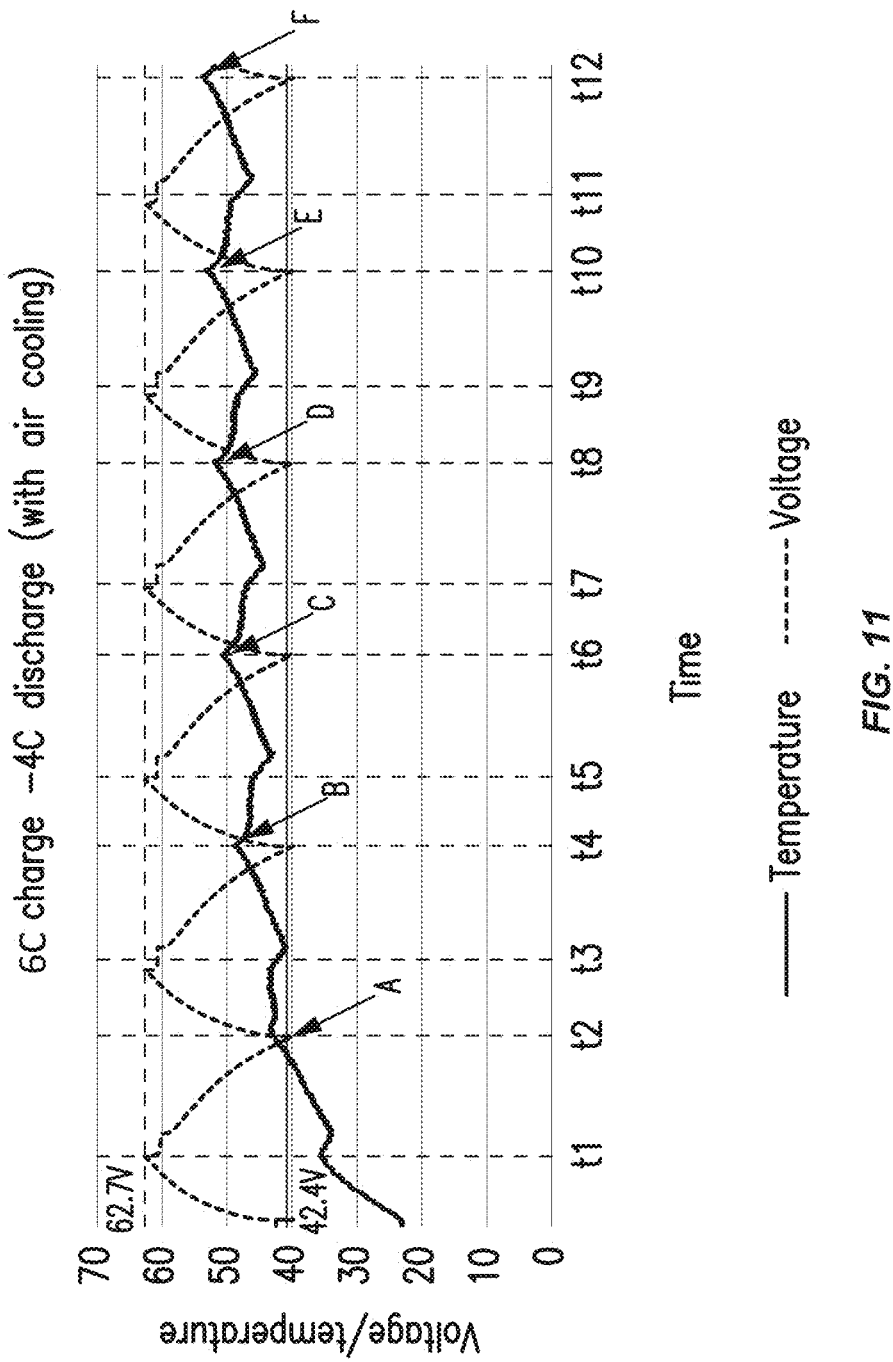
FIG. 11 is a chart illustrating how a temperature and a voltage of a battery pack change with charging and discharging time when the battery pack performs a continuous charge and discharge cycle at a charge rate of 6 C and a discharge rate of 4 C when a charging apparatus starts a cooling fan according to an embodiment of this present disclosure.

As another example, FIG. 11 is a chart in which a surface temperature of a battery pack and a voltage of the battery pack change with charging and discharging time when the battery pack performs a continuous charge and discharge cycle at a charge rate of 6 C and a discharge rate of 4 C at room temperature (25° C.) when a charging apparatus starts a cooling fan. FIG. 11 shows that when performing a charge and discharge cycle at a charge rate of 6 C and a discharge rate of 4 C, the battery pack may perform at least six times of continuous charge and discharge cycles. A time period 0 to t1 is a first charging process, and a time period t1 to t2 is a first discharging process. That is, a time period 0 to t2 is a first charge and discharge cycle process. At a moment t2, a surface temperature A of the battery pack is 45° C. when the first charge and discharge cycle ends. Since a surface temperature of the battery pack at a moment 0 is the same as room temperature, which is 25° C., a temperature rise of the battery pack is 45° C.-25° C.=20° C. in the first charge and discharge cycle process.

A time period t2 to t3 is a second charging process, and a time period t3 to t4 is a second discharging process. That is, a time period t2 to t4 is a second charge and discharge cycle process. At a moment t4, a surface temperature B of the battery pack is 50° C. when the second charge and discharge cycle ends. Therefore, a temperature rise of the battery pack is 49.9° C.-50° C.=-45° C.=5° C. in the second charge and discharge cycle process.

A time period t4 to t5 is a third charging process, and a time period t5 to t6 is a third discharging process. That is, a time period t4 to t6 is a third charge and discharge cycle process. At a moment t6, a surface temperature C of the battery pack is 52° C. when the third charge and discharge cycle ends. Therefore, a temperature rise of the battery pack is 52° C.-50° C.=2° C. in the third charge and discharge cycle process.

A time period t6 to t7 is a fourth charging process, and a time period t7 to t8 is a fourth discharging process. That is, a time period t6 to t8 is a fourth charge and discharge cycle process. At a moment t8, a surface temperature D of the battery pack is 53° C. when the fourth charge and discharge cycle ends. Therefore, a temperature rise of the battery pack is 53° C.-52° C.=1° C. in the fourth charge and discharge cycle process.

A time period t8 to t9 is a fifth charging process, and a time period t9 to t10 is a fifth discharging process. That is, a time period t8 to t10 is a fifth charge and discharge cycle process. At a moment t10, a surface temperature E of the battery pack is 54° C. when the fifth charge and discharge cycle ends. Therefore, a temperature rise of the battery pack is 54° C.-53° C.=1° C. in the fifth charge and discharge cycle.

A time period t10 to t11 is a sixth charging process, and a time period t11 to t12 is a sixth discharging process. That is, a time period t10 to t12 is a sixth charge and discharge cycle process. At a moment t12, a surface temperature F of the battery pack is 55° C. when the sixth charge and discharge cycle ends. Therefore, a temperature rise of the battery pack is 55° C.-54° C.=1° C. in the sixth charge and discharge cycle process. After the six times of charge and discharge cycles end, the surface temperature of the battery pack is 55° C., which still does not reach the charging temperature protection value and the discharging temperature protection value of the battery pack. Therefore, the battery pack may maintain at least six times of continuous charge and discharge cycles when performing the charge and discharge cycle at the charge rate of 6 C and the discharge rate of 4 C at room temperature.

In addition, according to each cell of the battery pack provided, a state of charge-open circuit voltage (SOC-OCV) curve thereof has a quasi-linear characteristic, that is, the SOC-OCV curve of each cell of the battery pack is approximate to a linear curve. The OCV is an open circuit voltage of the battery cell, and the SOC is a state of charge of each cell of the battery pack, that is, a percentage of a current capacity of each cell of the battery pack to a rated capacity of each cell of the battery pack.

The SOC-OCV curve of each cell of the battery pack meets the following relationship: when a resolution of the SOC in the SOC-OCV curve is 5%, in each 5% SOC interval, a slope k of the SOC-OCV curve is not less than 0.8, the slope refers to a rate of change of voltage output from each cell with a state of charge of each cell, where k=ΔOCV/ΔSOC, ΔSOC is a state of charge difference between two adjacent points, and ΔOCV is a corresponding open circuit voltage difference between the two adjacent points. In every two adjacent 5% SOC intervals, an absolute value of a slope variation Δk of the SOC-OCV curve is not greater than 0.2, where Δk=kn+1−kn, kn+1 and kn are respectively slopes of the SOC-OCV curve in two adjacent 5% SOC intervals. Considering the testing error, Δk is not greater than 0.2±0.05.

An SOC-OCV curve of a conventional 18650-type battery cells has an obvious voltage platform. Specifically, in the middle of the SOC-OCV curve, an open circuit voltage OCV hardly changes with an SOC. Therefore, at the end of the SOC-OCV curve, a slope variation of the curve is relatively small, and in a front section and a back section of the SOC-OCV curve, the OCV has a relatively large change range, and the slope variation of the curve is also relatively large.

Figure 12:
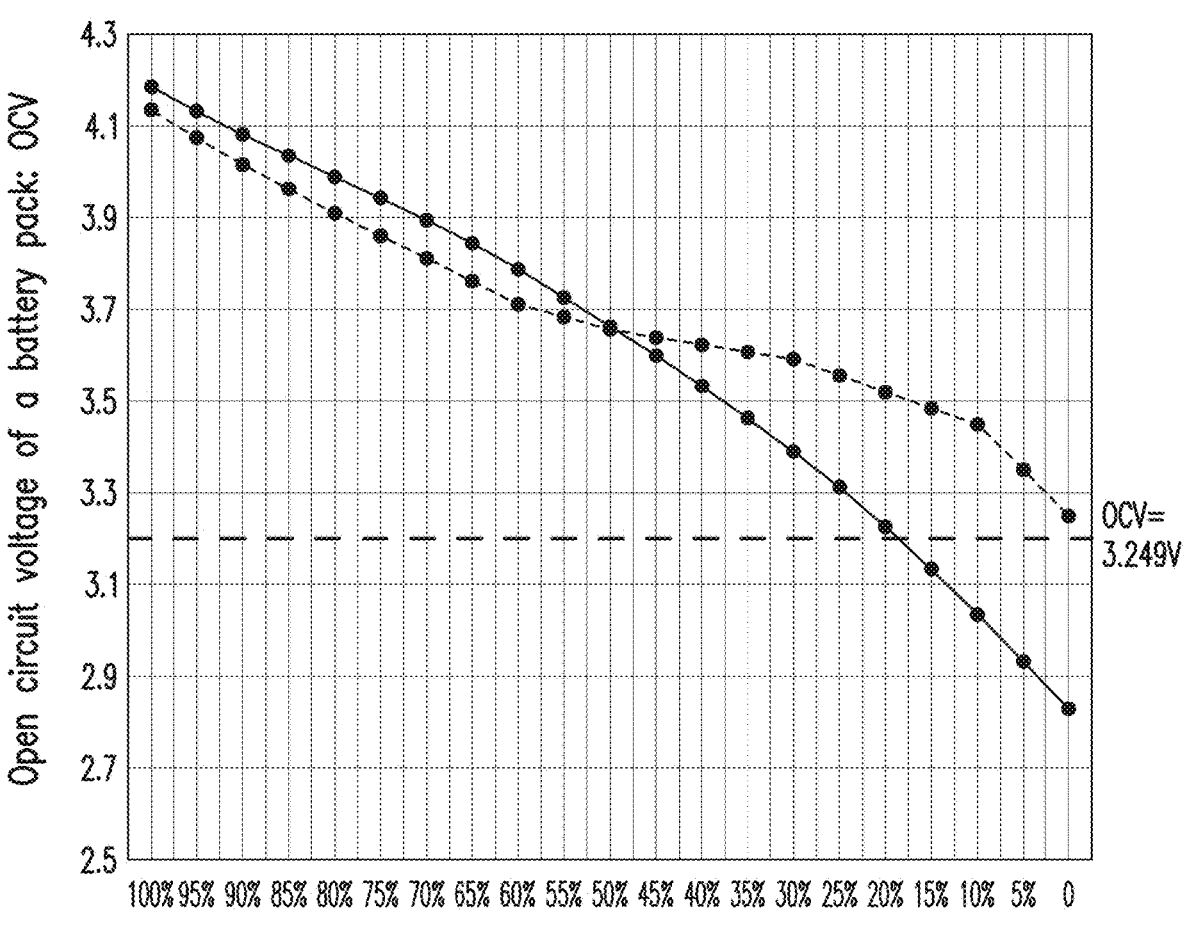
FIG. 12 is a chart illustrating how the OCV curve of a comparison 18650 battery pack is compared to a battery pack according to an embodiment of this present disclosure.

FIG. 12 shows change ranges of SOC-OCV data of an 18650-type battery cells and each cell of the battery pack in this embodiment. TYPE 2 is the battery pack described in this embodiment.

| SOC | TYPE 2 OCV(V) | 18650 OCV(V) |
|---|---|---|
| 100% | 4.1852 | 4.135 |
| 95% | 4.1325 | 4.075 |
| 90% | 4.082 | 4.015 |
| 85% | 4.035 | 3.962 |
| 80% | 3.988 | 3.909 |
| 75% | 3.942 | 3.86 |
| 70% | 3.894 | 3.811 |
| 65% | 3.844 | 3.761 |
| 60% | 3.787 | 3.711 |
| 55% | 3.726 | 3.683 |
| 50% | 3.663 | 3.656 |
| 45% | 3.599 | 3.639 |
| 40% | 3.533 | 3.623 |
| 35% | 3.464 | 3.608 |
| 30% | 3.39 | 3.592 |
| 25% | 3.312 | 3.556 |
| 20% | 3.226 | 3.52 |
| 15% | 3.134 | 3.485 |
| 10% | 3.035 | 3.45 |
| 5% | 2.933 | 3.35 |
| 0 | 2.83 | 3.249 |

A method for obtaining SOC-OCV data is that a value is obtained from values of an SOC of each cell of the battery pack provided and the conventional 18650-type battery cells at every 5% interval between 0 and 100% as a measured value. A discharge test is used as an example, and open circuit voltages are measured once each time SOCs of each cell of the battery pack drop by 5%. It should be noted that after the SOCs of each cell of the battery pack drops by 5% each time, each cell of the battery pack is idled for a period of time until each cell of the battery pack is completely uncharged, and then the open circuit voltages OCVs of the two battery packs are respectively measured. It should further be noted that only the cell discharge data approaches the linear characteristic, charging is not linear.

The SOC-OCV curves of each cell of the battery pack described herein and the 18650-type battery cell may be obtained through fitting according to the data shown in the above table. As shown in FIG. 12, when the open circuit voltage is 3.25V (3.249V), the SOC of the 18650-type battery cell has reached 0 (that is, an amount of energy of the battery pack runs out). However, when the open circuit voltage is 3.25V, the SOC of each cell of the battery pack provided is still not less than 20%. Therefore, each cell of the battery pack provided has a larger capacity retention rate below a low-voltage section (3.25V). When the open circuit voltage is about 3.66V, the SOCs of both each cell of the battery pack provided and the 18650-type battery cell are close to 50%. At a voltage section of above 3.66V, the voltage platform of each cell of the battery pack described herein is higher. At a voltage section of below 3.66V, the voltage platform of the 18650-type battery cell is higher.

Figure 13:
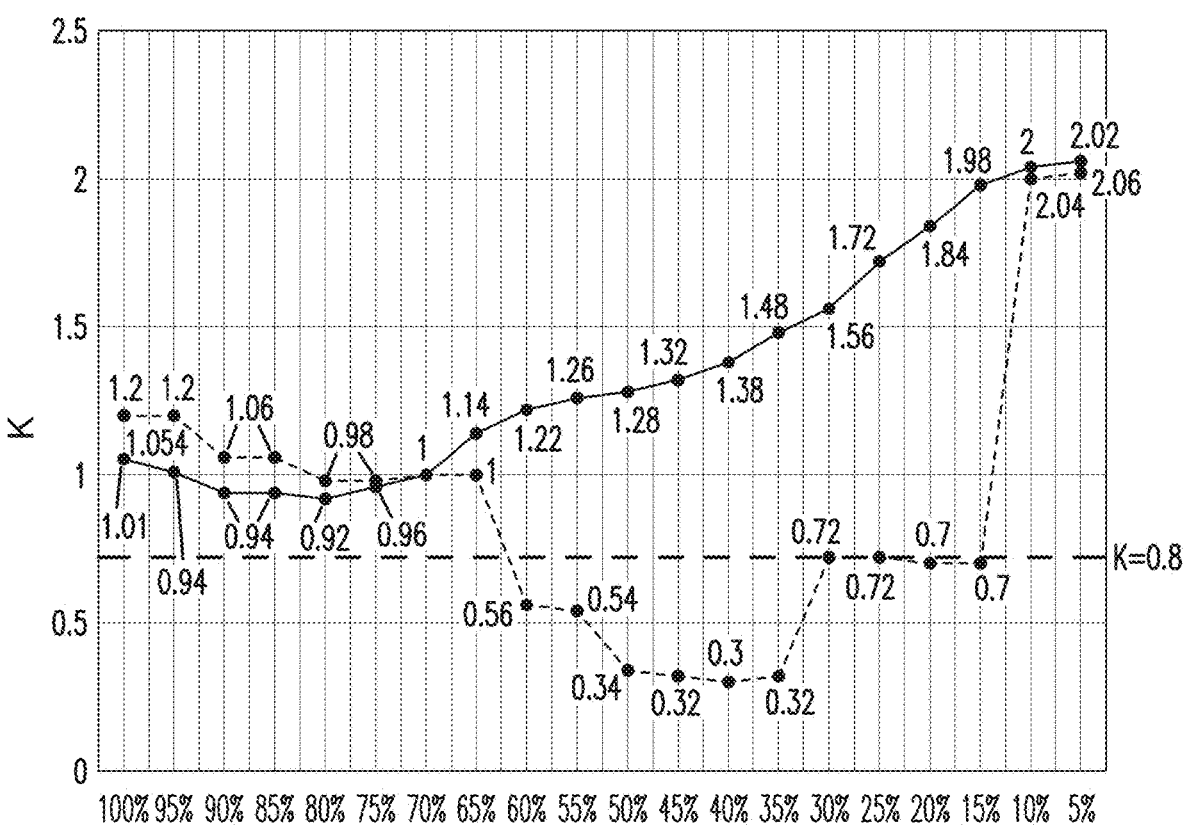
FIG. 13 is a chart illustrating how the OCV curve of a comparison 18650 battery pack is compared to a battery pack according to an embodiment of this present disclosure.

FIG. 13 is a chart illustrating the relationship between the voltage and the remaining capacity obtained by fitting SOC-OCV curves of the two different battery cells. Each slope sampling point is a slope of the SOC-OCV curve in 5% SOC intervals. As shown in FIG. 13, a slope range of each cell of the battery pack provided is greater than or equal to 0.8. When the SOC of each cell of the battery pack is 0 to 30% of the rated capacity of each cell of the battery pack, the slope range of the SOC-OCV curve of each cell of the battery pack is between 2.06 and 1.56. When the SOC of each cell of the battery pack is 30% to 65% of the rated capacity of each cell of the battery pack, the slope range of the SOC-OCV curve of each cell of the battery pack is between 1.56 and 1.14. When the SOC of each cell of the battery pack is 65% to 100% of the rated capacity of each cell of the battery pack, the slope range of the SOC-OCV curve of each cell of the battery pack is between 1.14 and 0.92. However, in the conventional 18650-type battery cell, the SOC of the battery cell is 0 to 30% of a rated capacity of the battery cell and the slope range of the SOC-OCV curve of the battery cell is between 2.02 and 0.72. When the SOC of the battery cell is 30% to 65% of the rated capacity of the battery cell, the slope range of the SOC-OCV curve of the battery cell is between 0.72 and 1. When the SOC of the battery cell is 65% to 100% of the rated capacity of the battery cell, the slope range of the SOC-OCV curve of the battery cell is between 1 and 1.2. Particularly, when the SOC of the battery cell is 30% to 65% of the rated capacity of the battery cell, the slope of the SOC-OCV curve of each cell of the battery pack provided continuously drops from 1.56 to 1.14, and the slope of the SOC-OCV curve of the conventional 18650-type battery cell first keeps at 0.72, drops from 0.72 to 0.33, and then is improved from 0.33 to 1. Therefore, the SOC-OCV curve of each cell of the battery pack provided is closer to a linear curve than the conventional 18650-type battery cell in terms of the slope.

Figure 14:
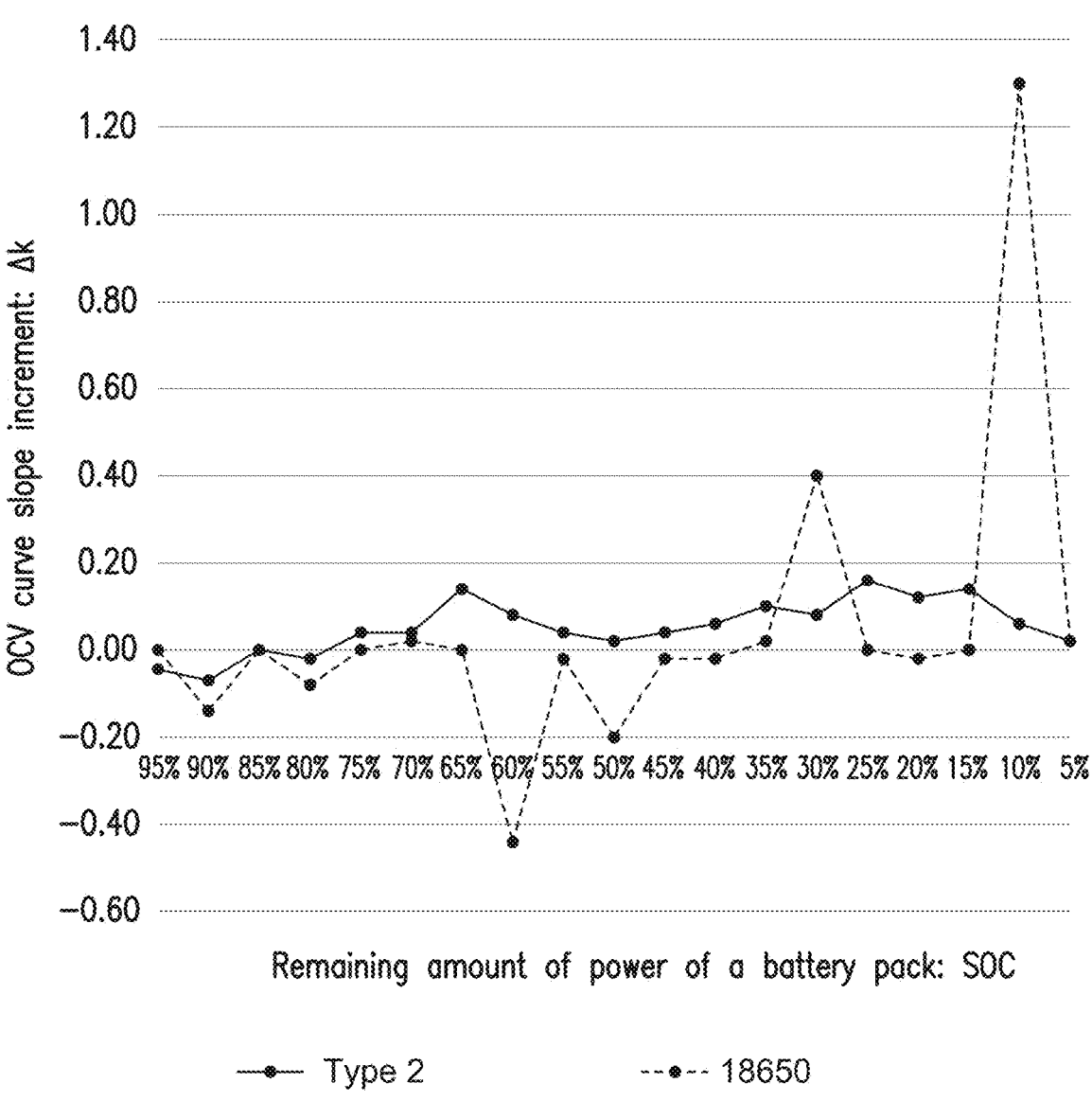
FIG. 14 is a chart illustrating how the OCV curve of a comparison 18650 battery pack is compared to a battery pack according to an embodiment of this present disclosure.

FIG. 14 illustrates slope variation curves obtained by fitting the slope curves shown in FIG. 13. The slope variation is a variation of a slope between two adjacent 5% SOC intervals. As shown in FIG. 14, a variation of the slope of the SOC-OCV curve of each cell of the battery pack provided is less than 0.2 between every two adjacent 5% SOC intervals. However, in the conventional 18650-type battery cell, slope variations of the SOC-OCV curve are relatively large in different SOC intervals. Specifically, the slope variation reaches 1.3 when the SOC interval is between 5% and 10% and the SOC interval is between 10% and 15%, and the slope variation is −0.4 when the SOC interval is between 55% and 60% and the SOC interval is between 60% and 65%. The slopes of the SOC-OCV curve vary greatly in various intervals. It can be learned that the slope variation of the SOC-OCV curve of each cell of the battery pack described herein is less than the slope variation of the conventional 18650-type battery cell, and the SOC-OCV curve of each cell of the battery pack described herein is close to the linear curve. When predicting a remaining amount of power, each cell of the battery pack provided may perform a prediction according to the SOC-OCV curve thereof with relatively high accuracy. However, the SOC-OCV curve of the conventional 18650-type battery cell has no reference to the prediction of an amount of power.

The aforementioned SOC-OCV data are the test data of the battery cell discharged at 10 C. From the aforementioned data, it can be seen that the difference of slope AK between two adjacent points of Type2 cell is less than 0.2 when the difference of SOC at two adjacent points is 5%, under the test condition that the battery cell is discharged at 1° C. It is important to note that, as the discharge rate decreases, the SOC-OCV curve changes more gently, making the slope K at each sampling point smaller, so that the difference in slope AK at two adjacent sampling points will be smaller. In other words, as the discharge rate decreases, the difference in the slope AK of the Type2 cell at the two adjacent sampling points decreases, making the linear characteristic of the Type2 cell more obvious. The linear characteristic of each Type2 cell is obvious, which makes the battery pack composed of Type2 cells also have obvious linear characteristics.

In at least one embodiment, the battery cells in the battery pack have a linear characteristic as previously described. In addition, the charge rate of the battery cell is greater than 5 C, and the energy density of the battery cell is greater than 120 Wh/kg. In other embodiments, the charge rate of the battery cell may also be a value as enumerated in other embodiments. For example, the energy density of the cell is greater than 125 Wh/kg, or 130 Wh/kg, or 135 Wh/kg.

Figure 15:
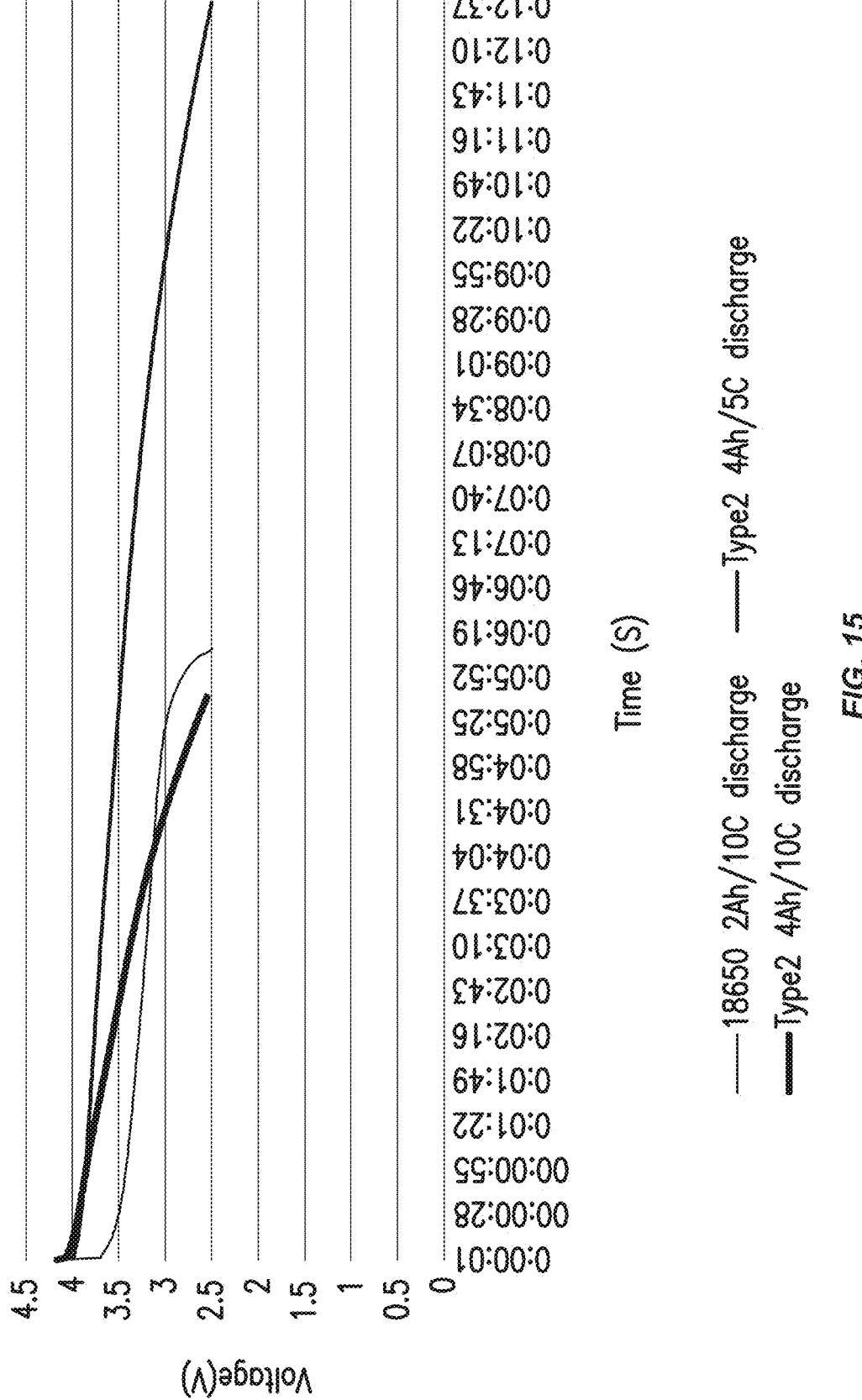
FIG. 15 is a chart showing voltage drop over time according to an embodiment of this present disclosure.

FIG. 15 shows a comparison between an 18650 cell and a cell described herein. Discharge is performed at rates of 5 C and 10 C as indicated in FIG. 15. During discharge, the voltage change of an 18650 cell is large at the beginning and end of discharge, while the voltage change is small in the middle of discharge, which makes the voltage change in the whole discharge process more inclined to an S-shaped curve. In contrast, the voltage of the battery pack described herein (e.g., Type 2 4 Ah at a 5 C discharge rate and Type 2 4 Ah at a 10 C discharge rate) is substantially linear in the whole discharge process. The slope of the discharge of the cell described herein ranges from about 0.05 to about 0.2 V/s (e.g., from about 0.07 to about 0.19 V/s, from about 0.09 to about 0.15, or about 0.12 V/s). In other words, the rate of voltage change over time is relatively constant, as compared to an example 18650 cell. According to another aspect, the voltage variation varies with the change of the discharge rate. The larger the discharge rate, the larger the variations in voltage.

Currently, a power of most garden power tools ranges from 1800 W to 2400 W, but the nominal voltage of the battery pack provided is 60V. Therefore, when a discharge current of the first type battery pack (11 Ah) reaches 30 A to 40 A, the power requirements of the garden power tools may be met, that is, when the first type battery pack is continuously discharged at a discharge rate of 3 C or a discharge rate of 4 C, the power requirements of the garden power tools may be met.

A first type battery pack may maintain at least six times of continuous charge and discharge cycles when continuously working at a charge rate of 3 C and a discharge rate of 3 C. Each charging duration of the battery pack is 20 minutes, each discharging duration is 20 minutes, and a single charging and discharging duration is 40 minutes. A first type battery pack may maintain continuous charging and discharging for at least 240 minutes when working at charge and discharge rates of 3 C. Two first type battery packs may be used alternately to implement 240 minutes (4 hours) of continuous power supply. One battery pack is a working battery pack, and the other battery pack is a backup battery pack. When the working battery pack is discharged, the backup battery pack is charged. When the working battery pack finishes discharging, the backup battery pack is fully charged, and the backup battery pack may be mounted on a power tool for use while the working battery pack charges.

During actual use, the power tool is not always in a working state, for example, the power tool is stopped when a worker transfers from one garden to another garden or has a rest. The battery pack may be cooled when the power tool is stopped, so that when the battery pack starts charging or discharging again, an initial temperature is reduced, and a surface temperature is also relatively low after charging or discharging is finished. Therefore, in a same temperature protection threshold, a quantity of cycles of the battery pack may be increased, and a working duration of the battery pack is increased. Therefore, for a garden team, two first type battery packs may support one power tool to continuously work for half a day when working at charge and discharge rates of 3 C, and after half a day's work is finished, the two battery packs may be cooled at lunchtime, so that initial temperatures of the battery packs are restored to room temperature during working in the afternoon. Therefore, the two battery packs may continue to work alternately for at least four hours. Therefore, one power tool may maintain a day's work by using two first type battery packs with a charge rate of 3 C and a discharge rate of 3 C.

Similarly, when a first type battery pack continuously works at a charge rate of 4 C and a discharge rate of 4 C, each charging duration of the battery pack is 15 minutes, a discharging duration is 15 minutes, and a single charging and discharging duration is 30 minutes. One first type battery pack may maintain continuous charging and discharging for at least 180 minutes (three hours). Two first type battery packs may be used alternately to implement three hours of continuous power supply to a power tool. Similarly, the battery packs may be cooled at a lunchtime and a transferring time. Therefore, the two first type battery packs supply power for at least three hours in the morning, and after being cooled at the lunchtime, the battery packs may also supply power for at least three hours in the afternoon.

When the first type battery pack continuously works at a charge rate of 6 C and a discharge rate of 4 C, each charging duration of the battery pack is 10 minutes, a discharging duration is 15 minutes, and a single charging and discharging duration is 25 minutes. When two first type battery packs are used alternately, after a working battery pack is empty, a charged backup battery pack is mounted on a power tool. Therefore, although it takes only 10 minutes for the backup battery pack to be fully charged, it is necessary to wait for the working battery pack to be empty (the battery pack may continue to be cooled within a waiting time), so that a total charging duration of the battery pack is a sum of a charging duration and a waiting duration, that is, 15 minutes. Therefore, a sum of a single total charging duration and discharging duration of the battery pack is 30 minutes. Both of the two battery packs may maintain six times of continuous charge and discharge cycles when working at the charge rate of 6 C and the discharge rate of 4 C, that is, the battery packs may maintain continuous power supply for 180 minutes (three hours). Similarly, the battery packs may be cooled at a lunchtime and a transferring time. Therefore, the two first type battery packs supply power for at least three hours in the morning, and after being cooled at the lunchtime, the battery packs may also supply power for at least three hours in the afternoon.

Described herein, a temperature rise characteristic of the battery pack is determined by the following factors. According to a first aspect, an internal resistance of a single cell itself in the battery pack is relatively small (e.g., up to about 2 mΩ). The internal resistance is one of the important factors affecting the temperature rise characteristic of the battery pack. An internal resistance of the single cell is less than 2 mΩ, and a quantity of single cells in the battery pack is not greater than 15. Therefore, an internal resistance of all the cells in the battery pack is not greater than 30 mΩ. An internal resistance of a conventional 18650-type cell is usually 15 mΩ, and an internal resistance of a battery pack is larger after packing. Due to the relatively small internal resistance of the single cell, a temperature rise of the single cell is relatively small, and a temperature rise of the entire battery pack is also relatively small after packing.

A charging and discharging temperature rise test is performed on the single cell in the battery pack provided and the single cell in the conventional lithium battery system 18650-type battery pack that has a same capacity at room temperature. During the test, a temperature rise of a surface temperature of the single cell in the battery pack provided is compared with that of a surface temperature of the single cell in the conventional 18650-type battery pack under a same charge rate and a same discharge rate, and a result of the comparison is shown in Table 1 below:

oxidation decomposition potential, an electrolyte is oxidized and decomposed on the surface of the positive electrode, and a large amount of gas and heat are released. This series of irreversible reactions not only cause the capacity and the service life of the battery to be reduced, but also cause an internal pressure and a temperature of the battery to rise sharply in severe cases, resulting in swelling and rupture of the battery causing fire and explosion. However, the single cell in the battery pack provided may support a charge rate of greater than 3 C, and when the single cell is charged at the charge rate of greater than 3 C at normal temperature, the temperature rise is also relatively low. When the single cell is charged at a charge rate of 12 C at normal temperature, a temperature rise is only 17° C. In addition, a charging protection temperature of the single cell in the battery pack is 60° C. Therefore, even if the single cell is charged at the charge rate of 12 C, a surface temperature of the single cell is still within a normal working temperature range. Therefore, the battery pack of this present disclosure is applicable to an application scenario of charging at a large rate.

In addition, under a same discharge rate, a surface temperature rise of the conventional lithium battery system 18650-type single cell is greater than a surface temperature rise of the single cell in the battery pack provided. Although the lithium battery system 18650-type single cell can also support a discharge rate of greater than 10 C, when the discharge rate reaches 10 C, a temperature rise of the cell reaches 45° C. That is, at normal temperature (25° C.), a surface temperature of the single cell may reach 70° C. after the single cell is discharged at the rate of 10 C. When the single cell is discharged at a discharge rate of 12 C, the temperature rise reaches 53° C. That is, the surface temperature of the single cell may reach 78° C. after discharging is finished. A highest normal working temperature of the 18650-type single cell is 60° C. during charging. Therefore, when the single cell is discharged at a rate of greater than 10 C, the surface temperature of the single cell has exceeded a maximum working temperature of the single cell during normal charging. As a result, after the single cell is discharged, due to a relatively large temperature rise, it is necessary to wait for the temperature of the single cell to be

| | Charging temperature rise (° C.) of a single cell | Discharging temperature rise (° C.) of the single cell | Charging temperature rise (° C.) of an 18650-type single cell | Discharging temperature rise (° C.) of the 18650-type single cell |
|---|---|---|---|---|
| 3C | 7° C. | 7° C. | 13° C. | 14° C. |
| 4C | 8° C. | 9° C. | No support | 16° C. |
| 5C | 11° C. | 12° C. | No support | 17° C. |
| 6C | 12° C. | 13° C. | No support | 22° C. |
| 10C | 14° C. | 28° C. | No support | 45° C. |
| 12C | 17° C. | 35° C. | No support | 53° C. |

Table 1 shows that the conventional lithium battery system 18650-type single cell can be charged at a maximum charge rate of 3 C and cannot support a higher charge rate. If the lithium battery system 18650-type single cell is charged at a charge rate of greater than 3 C, it not only causes a capacity and a service life of the single cell to be rapidly reduced, but also causes potential safety hazards in severe cases. This is because when charging is performed at a charge rate beyond a range that the single cell can bear, positive electrode material of the battery is charged to a high voltage, excess lithium ions are released, and the positive material in a lithium-deficient state is decomposed to release heat. When positive electrode potential rises to an electrolyte reduced to a normal working temperature range before charging is started, otherwise, the service life of the single cell is reduced. When the single cell in the battery pack provided is discharged at the rate of 10 C at normal temperature (25° C.), a temperature rise is 28° C. That is, a temperature of the single cell is 53° C. after discharging is finished. When the single cell is discharged at 12 C at normal temperature, a temperature rise is 35° C. That is, the temperature of the single cell is 60° C. after discharging is finished. In addition, a highest normal working temperature of the single cell is 70° C. during discharging, temperatures of the single cell are all within the normal working temperature range at the discharge rates of 10 C to 12 C. So a temperature of a battery pack including this type cell is also within the normal working temperature range at the discharge rates of 10 C to 12 C.

According to a second aspect, a structure of the single cell is designed into a sheet-like rectangular cell. The sheet design can increase a heat dissipation area of the single cell, and can prevent an internal temperature of the single cell from rising during charging and discharging. In addition, as shown in FIG. 5B and FIG. 5D, adjacent single cells in the battery pack are stacked, and a distance Ah between adjacent single cells 231 is greater than or equal to $\frac{1}{12}$ of a thickness H of the single cell. An air gap may be reserved between adjacent single cells to assist heat dissipation. Distances between adjacent single cells 231 (331) in the first type battery pack and the second type battery pack and the thickness of the cell all meet the foregoing relationship. In addition, since the charging apparatus is provided with the cooling fan during charging, the cooling fan of the charging apparatus is started to drive an air flow to flow in the air gap between the single cells, so as to dissipate heat for the surface of the single cell.

According to a third aspect, a thermal management apparatus is further arranged in the battery pack. The thermal management apparatus may adjust the temperature of the battery pack, so that the battery pack can also work normally at a relatively high or low ambient temperature. For example, the thermal management apparatus may include a heating apparatus and/or a heat dissipation apparatus. The heating apparatus may heat the battery pack at the relatively low ambient temperature to prevent the battery pack from being unable to start charging and discharging due to the excessively low temperature, so that the battery pack can immediately start charging or discharging in cold weather. The heat dissipation apparatus may prevent the battery pack from overheating to a certain extent, so that the battery pack can also start charging and discharging in a high temperature environment.

Figure 16:
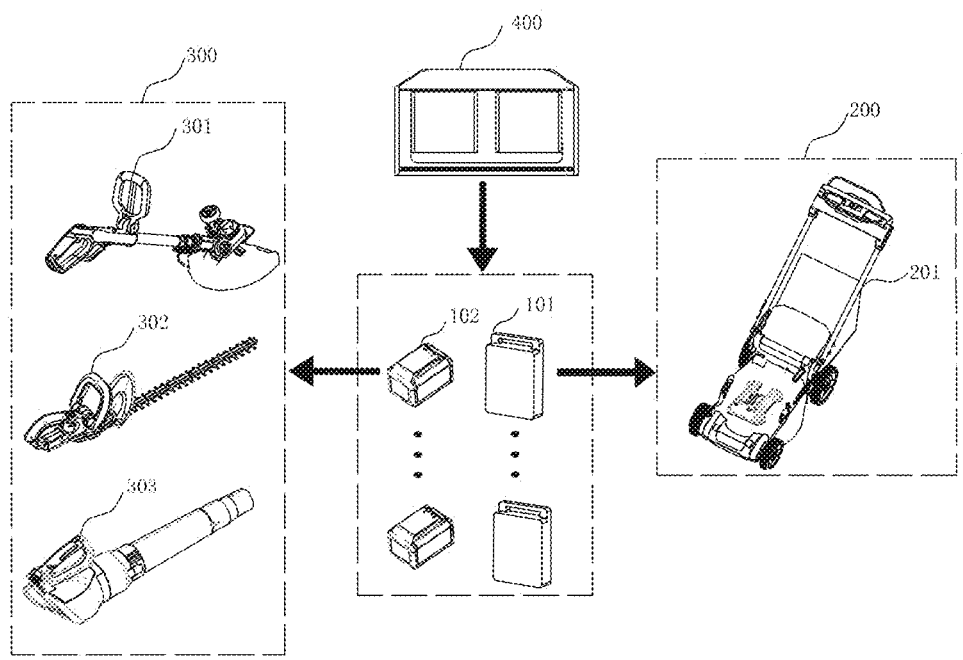
FIG. 16 is a schematic diagram of a power tool system according to an embodiment of this present disclosure.

In at least one embodiment, the present disclosure also provides a power supply system, as shown in FIG. 16, the power supply system includes battery packs 101, 102, power tools 200, 300, and a charging apparatus 400, and the battery packs 101, 102 are detachably connected to the power tools 200, 300 or the charging apparatus 400.

Figure 41:
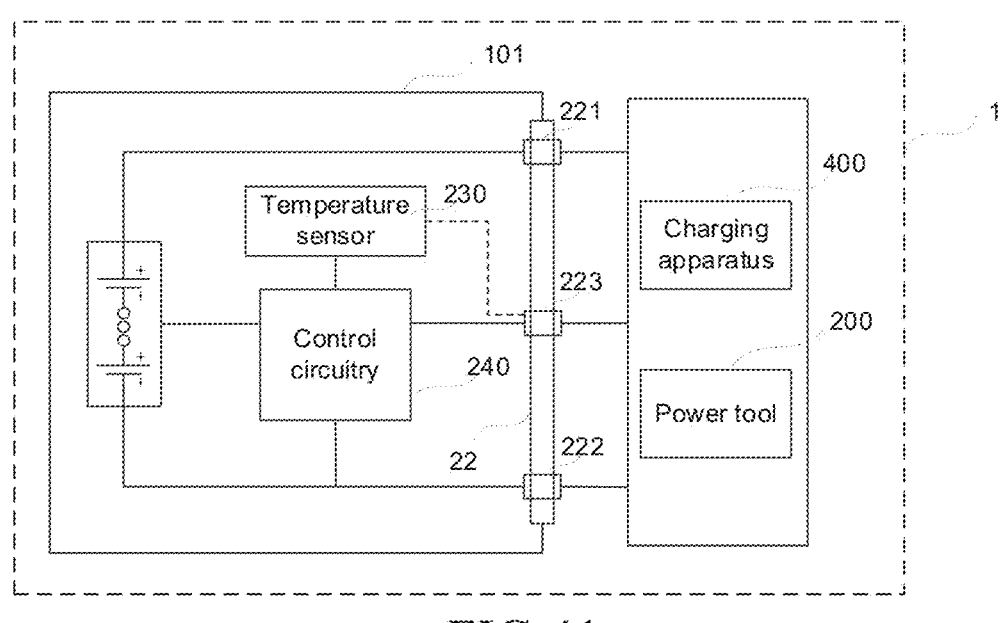
FIG. 41 is a schematic diagram of a power supply system according to an embodiment of the present disclosure.

In some embodiments, as shown in FIG. 41, a power supply system 1 includes a battery pack 101, a power tool 200, and a charging apparatus 400. The battery pack 101 comprises a housing; at least one battery cell is located within the housing. The battery pack 101 further includes a charging and discharging port 22, provided on the housing, and connection terminals are provided at the charging and discharging port 22, and the connection terminals are connected to the battery cells.

The power tool includes a tool port, and the tool port is configured to be connected to the battery cell through the charging and discharging port to obtain electrical energy from the battery cell. The charging apparatus includes a charging port configured to be connected to the battery cell through the charging and discharging port to charge the battery cell.

It should be noted that the battery pack, the power tool, and the charging apparatus described in the present embodiment may be the battery pack, the power tool, and the charging apparatus described in any of the embodiments of the present disclosure, and the specific features thereof will not be described in detail here.

For example, as shown in FIG. 41, the battery pack port 22, includes a positive terminal 221, a negative terminal 222, and at least one communication terminal 223 for matching connection with a corresponding terminal of the power tool or the charging apparatus. The positive terminal 221 and the negative terminal 222 are configured to transmit electrical energy, and at least one communication terminal 223 is configured to transmit communication information.

A temperature sensor 230 for detecting the temperature of the battery pack is also provided in the battery pack. The battery pack temperature includes at least a battery cell temperature, a circuit board temperature, a battery pack terminal temperature, and the like. For example, the specific value of the battery pack temperature is the absolute temperature of the battery pack.

In at least one embodiment, when the battery pack 101 is connected to the power tool 200 or the charging apparatus 400, the temperature sensor 230 in the battery pack 101 detects the battery pack temperature in real time, and transmits the battery pack temperature or a signal characterizing the battery pack temperature to the control circuit 240 of the battery pack. For example, the temperature sensor 230 in the battery pack may also be connected to the communication terminal 223, and the detected battery pack temperature is directly transmitted to the power tool 200 or the charging apparatus 400 to which the battery pack 101 is connected through the communication terminal 223.

The power supply system stores a charging protection temperature and a discharging protection temperature. For example, the battery pack 101 may be provided with a control circuit 240 and/or a memory to store at least the charging protection temperature and the discharging protection temperature.

For example, the charging protection temperature is the maximum allowable charging temperature of the battery pack, and the discharging protection temperature is the maximum allowable discharge temperature of the battery pack.

When the absolute temperature of the battery pack is less than the charging protection temperature, the power supply system allows the charging apparatus to charge the battery pack; and when the absolute temperature of the battery pack is greater than the charging protection temperature, the power supply system prohibits the charging apparatus to charge the battery pack; when the absolute temperature of the battery pack is less than the discharging protection temperature, the power supply system allows the battery pack to discharge the power tool, and when the absolute temperature of the battery pack is greater than the discharging protection temperature, the power supply system prohibits the battery pack to discharge the power tool; when the battery pack is connected to the power tool, and the power tool allows the battery pack to discharge it at a continuous discharge rate of 4 C at normal temperature, the absolute temperature of the battery pack is less than the charging protection temperature when the discharge process is completed, the power supply system allows the charging apparatus to charge the battery pack.

For example, in the power supply system, the charging apparatus controls to allow or prohibit to charge the battery pack, and the power tool controls to allow or prohibit to discharge the battery pack.

In at least one embodiment, a charging protection temperature and a discharging protection temperature are stored within the battery pack. Specifically, when the battery pack 101 is connected to the charging apparatus 400, the control circuit 240 of the battery pack 101 obtains the battery pack temperature from the temperature sensor 230, and determines that the absolute temperature of the battery pack 101 is less than the charging protection temperature, outputs at least a communication signal characterizing that the battery pack is allowed to be charged through the communication terminal 223 of the battery pack, and the charging apparatus 400 receives the communication signal from the communication terminal 223 to control the battery pack 101 to be allowed to be charged; when the control circuit 240 of the battery pack 101 determines that the absolute temperature of the battery pack 101 is greater than the discharging protection temperature, the control circuit 240 of the battery pack 101 outputs a communication signal characterizing that the battery pack is prohibited from charging through the communication terminal 223 of the battery pack 101, and the charging apparatus 400 receives the communication signal from the communication terminal 223 to control the battery pack 101 to be prohibited from charging.

When the battery pack 101 is connected to the power tool 200, the control circuit 240 of the battery pack 101 obtains the battery pack temperature from the temperature sensor 230, determines that the absolute temperature of the battery pack 101 is lower than the discharging protection temperature, outputs at least a communication signal characterizing that the battery pack 101 are allowed to discharge through the communication terminal 223 of the battery pack, and the power tool 200 receives the communication signal from the communication terminal 223 to allow the battery pack 101 to discharge. When the control circuit 240 of the battery pack 101 determines that the absolute temperature of the battery pack is greater than the discharging protection temperature, the control circuit 240 of the battery pack 101 outputs a communication signal characterizing that the battery pack 101 is prohibited from discharging through the communication terminal 223 of the battery pack 101, and the power tool 200 receives the communication signal from the communication terminal 223 to prohibit the battery pack 101 from discharging.

Further, when the battery pack 101 is connected to the power tool 200, and the power tool 200 is discharged by the battery pack 101 at a continuous rate of 4 C at normal temperature, and when the discharge process is completed, the absolute temperature of the battery pack 101 is lower than the charging protection temperature, the power supply system 1 allows the charging apparatus 400 to charge the battery pack 101.

It can be understood that when the battery pack 101 is connected to the power tool 200, and the battery pack 101 is discharged at a continuous rate of 4 C at normal temperature, when the discharge process is completed, the absolute temperature of the battery pack 101 is lower than the charging protection temperature. When the battery pack 101 needs to be recharged after the discharge process is completed, the battery pack 101 is connected to the charging apparatus 400, and the control circuit 240 of the battery pack 101 compares the battery pack temperature obtained from the temperature sensor 230 with the charging protection temperature. Since the absolute temperature of the battery pack 101 is lower than the charging protection temperature, the control circuit 240 outputs a communication signal characterizing permission of charging to the charging apparatus 400 through the communication terminal, and the charging apparatus 400 receives the communication signal and controls permission of charging of the battery pack 101. Accordingly, after the battery pack 101 is connected to the charging apparatus 400 after being discharged at a continuous rate of 4 C at normal temperature, the charging apparatus 400 immediately starts charging the battery pack 101, thereby realizing the uninterrupted charging and discharging cycle use of the battery pack, so that the user does not need to prepare more spare battery pack, and the use cost is effectively reduced.

In at least one embodiment, when the battery pack is connected to the charging apparatus, and the charging apparatus charges the battery pack at a continuous charging rate greater than 3 C at normal temperature, when the charging process is completed, the absolute temperature of the battery pack is lower than the discharging protection temperature, and the power supply system allows the battery pack to discharge the power tool.

Specifically, continuing to refer to FIG. 41, when the battery pack 101 is connected to the charging apparatus 400, and the charging apparatus 400 charges the battery pack 101 at a continuous charging rate greater than 3 C at normal temperature, the absolute temperature of the battery pack 101 is lower than the discharging protection temperature when the charging process is completed. After the battery pack 101 is charged, the power tool 200 can be discharged, and at this time, the battery pack 101 is connected to the power tool 200. The control circuit 240 of the battery pack 101 compares the battery pack temperature obtained from the temperature sensor 230 with the discharging protection temperature. Since the absolute temperature of the battery pack is lower than the discharging protection temperature, the control circuit 240 outputs a communication signal characterizing that discharge is permitted to the power tool 200 through the communication terminal, and the power tool 200 receives the communication signal and controls the battery pack 101 to be permitted to discharge. Accordingly, after the charging apparatus 400 completes charging the battery pack 101 at a continuous charging rate greater than 3 C at normal temperature, the battery pack 101 immediately starts discharging the power tool 200, thereby realizing the uninterrupted charging and discharging cycle use of the battery pack, and effectively reducing the use cost.

In at least one embodiment, a charging protection temperature and a discharging protection temperature are stored within the charging apparatus and the power tool. For example, a charging protection temperature is stored in the charging apparatus 400, and a discharging protection temperature is stored in the power tool 200.

For example, the communication terminal 223 of the battery pack 101 may also output a battery pack temperature or a signal characterizing the battery pack temperature to the connected power tool 200 or the charging apparatus 400 for charging and discharging control by the power tool 200 or the charging apparatus 400.

Specifically, in at least one embodiment, when the battery packs 101 is connected to the charging apparatus 400, the communication terminal 223 of the battery pack 101 outputs the battery pack temperature or a signal characterizing the battery pack temperature to the charging apparatus 400, and the charging apparatus 400 acquires the battery pack temperature and compares the absolute temperature of the battery pack with the charging protection temperature. When the charging apparatus 400 determines that the absolute temperature of the battery pack is lower than the charging protection temperature, the charging apparatus 400 controls to allow charging of the battery packs 101; when the charging apparatus 400 determines that the absolute temperature of the battery pack is greater than the charging protection temperature, the charging apparatus 400 controls to prohibit charging of the battery pack 101.

When the battery pack 101 is connected to the power tool 200, the communication terminal 233 of the battery pack 101 outputs the battery pack temperature or a signal characterizing the battery pack temperature to the power tool 200, and the power tool 200 obtains the battery pack temperature and compares the absolute temperature of the battery pack with the discharging protection temperature. When the power tool 200 determines that the absolute temperature of the battery pack 101 is lower than the discharging protection temperature, the power tool 200 controls the battery pack 101 to be allowed to discharge; when the power tool 200 determines that the absolute temperature of the battery pack 101 is greater than the discharging protection temperature, the power tool 200 controls the battery pack 101 to be prohibited to discharge.

Further, when the battery pack 101 is connected to the power tool 200, and the power tool 200 allows the battery pack 101 to discharge at a rate of 4 C at normal temperature, and when the discharge process is completed, the absolute temperature of the battery pack 101 is lower than the charging protection temperature, the power supply system 1 allows the charging apparatus 400 to charge the battery pack 101.

It can be understood that when the battery pack 101 is connected to the power tool 200 and the battery pack 101 is discharged at a rate of 4 C at normal temperature, when the discharge process is completed, the absolute temperature of the battery pack 101 is lower than the charging protection temperature. When the battery pack 101 needs to be recharged after the discharge process is completed, the battery pack 101 is connected to the charging apparatus 400, and the charging apparatus 400 obtains the battery pack temperature from the battery pack 101, and compares the absolute temperature of the battery pack 101 with the charging protection temperature. Since the absolute temperature of the battery pack 101 is lower than the charging protection temperature, the charging apparatus 400 controls to allow charging of the battery pack 101 according to the comparison result. Accordingly, after the battery pack 101 is discharged at a continuous rate of 4 C at normal temperature and is connected to the charging apparatus 400, the charging apparatus 400 immediately starts charging the battery pack 101, thereby realizing the uninterrupted charging and discharging cycle use of the battery pack, and effectively reducing the usage cost of the user.

In at least one embodiment, when the battery pack is connected to the charging apparatus, and the charging apparatus charges the battery pack at a continuous charging rate greater than 3 C at normal temperature, when the charging process is completed, the absolute temperature of the battery pack is lower than the discharging protection temperature, and the power supply system allows the battery pack to discharge the power tool.

Specifically, continuing to refer to FIG. 41, when the battery pack 101 is connected to the charging apparatus 400, and the charging apparatus 400 charges the battery pack 101 at a continuous charging rate greater than 3 C at normal temperature, the absolute temperature of the battery pack 101 is lower than the discharging protection temperature when the charging process is completed. After the charging of the battery pack 101 is completed, the power tool can be discharged, and at this time, the battery pack 101 is connected to the power tool 200. The power tool 200 obtains the battery pack temperature from the battery pack 101 and compares the absolute temperature of the battery pack 101 to the discharging protection temperature. Since the absolute temperature of the battery pack 101 is lower than the discharging protection temperature, the power tool 200 controls the battery pack 101 to be allowed to discharge the battery pack 101 according to the comparison result.

Accordingly, after the charging apparatus 400 completes charging the battery pack 101 at a continuous charging rate greater than 3 C at normal temperature, the battery pack 101 immediately starts discharging the power tool, thereby realizing the uninterrupted charging and discharging cycle use of the battery pack, and effectively reducing the use cost.

It should be noted that, in at least one embodiment, in the process of discharging the power tool by the battery pack, when the voltage of the battery pack is lower than the preset discharge voltage value, it is judged that the discharge of the battery pack is completed; For example, the preset discharge voltage value may be a voltage value when the battery pack is over-discharged. In at least one embodiment, in the process of charging the battery pack by the charging apparatus, when the charging current of the battery pack is lower than a preset charging current value, it is determined that the charging of the battery pack is completed; For example, the preset charging current value may be a charging current value when the battery pack is fully charged.

In at least one embodiment, the control circuit of the battery pack is further configured to control to allow or prohibit charging of the battery pack according to a comparison result of the battery pack temperature and the charging protection temperature, and/or control to allow or prohibit discharging of the battery pack according to a comparison result of the battery pack temperature and the discharging protection temperature.

Specifically, taking the battery pack 101 and the power tool 200 as an example, referring to FIG. 41, when the control circuit 240 determines that the battery pack temperature is lower than the discharging protection temperature, the control circuit 240 controls the discharge circuit of the battery pack 101 to be turned on, and when the control circuit 240 determines that the battery pack temperature is greater than the discharging protection temperature, the control circuit 240 controls the discharge circuit of the battery pack 101 to be turned off. Of course, in at least one embodiment, the control circuit 240 may also control the discharge circuit of the battery pack 101 to be turned on or off, and at the same time, output a signal indicating whether discharge is allowed to be permitted to the power tool 200 through the communication terminal 223, so as to realize discharge control synchronously by the power tool 200. It can be understood that similar logic is followed when the battery pack 101 is connected to the charging apparatus 400, and the description thereof will not be repeated here.

In at least one embodiment, the charging time required by the charging apparatus to charge the battery pack from empty power to full power is less than the discharging time required by the power tool to discharge the battery pack from full power to empty power.

In other words, before the power tool 200 discharges one battery pack from full power to empty power, the charging apparatus 400 can fully charge another battery pack of the same specification, thereby realizing a seamless connection between charging and discharging of the battery pack, and the other fully charged battery pack continues to supply power to the power tool 200, thereby realizing uninterrupted power supply to the power tool.

In at least one embodiment, the charging power of the charging apparatus to charge the battery pack is greater than the discharging power of the power tool to discharge the battery pack.

Specifically, for a battery pack of the same specification, the charging power of the charging apparatus 400 is greater than the discharging power of the power tool 200, in other words, the battery pack is fully charged faster than the battery pack is emptied, thereby realizing uninterrupted power supply to the power tool.

It can be learned that in this embodiment of this present disclosure, the battery pack may overcome a defect of a large temperature rise of a battery pack caused by charging and discharging at a relatively large current in the conventional technology. A change range of a temperature of the battery pack is small after large current charging and large current discharging, so that after being fully charged, the battery pack may be directly discharged without waiting for cooling, and after discharging is finished, the battery pack may be directly charged without waiting for cooling. Therefore, the power tool has a short waiting time, and the working efficiency of the power tool can be further improved. In addition, since the battery pack has a short power replenishing time, a limited quantity of battery packs may be used for alternate charging to supply power to the power tool system, thereby reducing the use costs of the power tool system.

The following describes a configuration of the battery pack in each use scenario in combination with typical use scenarios of the commercial garden tools.

There are two typical use scenarios for the commercial garden tools. In a first typical use scenario, one or two workers form a team and work outside for one day to trim gardens of 10 to 20 homes or provide services for municipal or commercial estate gardens. The team moves to another garden to continue to work after completing trimming in one garden. The garden trimming work usually includes lawn mowing, grass trimming, pruning, grass blowing, and the like. Correspondingly, as shown in FIG. 16, power tools required by the power tool system include a wheeled or backpack power tool 200 and a handheld power tool 300. The wheeled or backpack power tool 200 includes a hand push lawn mower 201, and the handheld power tool 300 includes a grass trimmer 301, a pruner 302, and a blower 303. Types of battery packs in the battery pack system 100 for supplying power to the power tools may vary with different types of power tools. For example, the battery pack system 100 is formed by only the first type battery pack 101, or formed by the first type battery pack 101 and the second type battery pack 102, or formed by only the second type battery pack 102. After an amount of energy of a battery pack on the power tool runs out, a mobile charging apparatus 400 or an electric vehicle may be used to charge the battery pack, so that the power tool system has a continuous energy supply.

For the garden trimming work, mowing usually takes the longest time. For a garden of 1000 square meters, an average time consumed by the mowing ranges from 20 minutes to 30 minutes, and a sum of working durations of other work is approximately the same as the duration of the mowing. Therefore, a worker A immediately starts mowing by using a hand push lawn mower each time arriving a garden. During mowing by the worker A, a worker B sequentially completes other types of work. For example, the worker B first performs grass trimming, pruning, and then grass blowing. The worker A and the worker B almost complete all the works simultaneously.

For a common use scenario of a first commercial garden tool, a battery pack may be equipped for power tools required by the use scenario in a plurality of manners, so that the energy of the battery pack can support continuous working of a plurality of power tools. Several typical battery pack configuration manners are listed below.

In a first manner, the battery pack system may be formed by only a first type battery pack. In this example, a capacity of the first type battery pack may be 11 Ah, a continuous charge rate of the first type battery pack may reach 6 C, and a continuous discharge rate may also reach 4 C, so that a charging speed of the first type battery pack is greater than or equal to a discharging speed. Since a hand push lawn mower works for the longest time, in order not to interrupt mowing, a first type battery pack may be separately equipped for the hand push lawn mower to supply power to the hand push lawn mower, and the first type battery pack is mounted on the hand push lawn mower. Since a grass trimmer, a pruner, and a blower sequentially complete work, a shared first type battery pack may be equipped for the grass trimmer, the pruner, and the blower. The first type battery pack may be a backpack battery pack and may support the grass trimmer, the pruner, and the blower to jointly complete pruning, grass trimming, and grass blowing of one garden. Typically, when the worker A performs mowing by using the hand push lawn mower, the worker B performs grass trimming by using the grass trimmer. After the grass trimming is completed, a connection between the grass trimmer and the battery pack is released, and then the pruner is connected to the battery pack and the pruner starts working. After the pruning is completed, the connection between the pruner and the battery pack is released, and then the blower is connected to the battery pack and the blower starts working. If the power tool system needs to work continuously, backup battery packs may be respectively equipped for two power tools that work simultaneously. When amounts of power of working battery packs run out, the backup battery packs are used to supply power to the system and are also used to charge the working battery packs. Since the charging speed of the first type battery pack is greater than the discharging speed, a backup first type battery pack may be equipped for each of the power tools that work simultaneously. Based on the foregoing, for the first typical application scenario, four first type battery packs may be equipped for the power tool system. Two first type battery packs serve as working battery packs, and two first type battery packs serve as backup battery packs.

In a second manner, the battery pack system includes both a first type battery pack and a second type battery pack. A capacity of the second type battery pack is less than a capacity of the first type battery pack. In this example, the capacity of the first type battery pack may be 11 Ah. The capacity of the second type battery pack is 4 Ah. A charge rate of the second type battery pack is 12 C, and a discharge rate is 10 C. Due to the relatively large charge and discharge rates, after one charge and discharge cycle is performed, a surface temperature of the battery pack has exceeded a charging temperature protection threshold of the battery pack. As a result, the battery pack needs to wait for cooling down before being used again. Therefore, when the second type battery pack is used to supply power to the power tool, a quantity of backup battery packs needs to be greater than a quantity of working battery packs. In this example, the first type battery pack may supply power to the hand push lawn mower, and the first type battery pack is mounted on the hand push lawn mower. The second type battery pack may supply power to handheld power tools such as a grass trimmer, a pruner, and a blower, and the second type battery pack is detachably mounted on the grass trimmer, the pruner, or the blower. To improve the working efficiency and enable the power tool system to continuously work, two first type battery packs may be equipped for the hand push lawn mower. One first type battery pack serves as a working battery pack, and one first type battery pack serves as a backup battery pack. After an amount of energy of the working battery pack runs out, the backup battery pack is mounted on the hand push lawn mower and charges the working battery pack. Since a charging speed of the first type battery pack is not less than a discharging speed, before the backup battery pack completes discharging, the working battery pack has been fully charged. A temperature rise of the second type battery pack is relatively high after one charge and discharge cycle is performed, and the second type battery pack needs to wait for the temperature rise to be reduced before continuing to be used. Therefore, N backup second type battery packs need to be equipped for one power tool, so that N*T discharging>T charging. T discharging is a discharging duration of a single second type battery pack, and T charging is a sum of a waiting duration after one time of charging and discharging is finished and a charging time of a single second type battery pack. When a charge rate of the second type battery pack is 12 C, and a discharge rate is 10 C, at least two backup second type battery packs need to be equipped to support working of the power tool, so that after the two battery packs finish discharging, a surface temperature of a first discharging battery pack drops to normal temperature, and the power tool can continuously work. For example, three second type battery packs need to be equipped for a power tool with a power of 2 kW. One second type battery pack serves as a working battery pack, and two second type battery packs serve as backup battery packs. After an amount of energy of the working battery pack runs out, it is necessary to wait for the working battery pack to cool down, and a first backup battery pack is mounted on the power tool. After an amount of energy of the first backup battery pack runs out, the first backup battery pack is charged. In this case, the temperature of the working backup battery pack is reduced. A second backup battery pack is mounted on the power tool to supply power to the tool. When supplying power, the second backup battery pack charges the working battery pack. When an amount of energy of the second backup battery pack runs out, the working battery pack has been fully charged and may be put back into use. The three battery packs are charged and discharged in turn to support continuous working of the power tool. Further, to conform to a use habit of a conventional fuel tool, a second type battery pack may be pre-mounted on each handheld power tool in the power tool system, to prevent the battery pack from being replaced each time the power tool is replaced, and reduce a changing frequency of the battery pack. In this example, a second type battery pack may be pre-mounted on each of the grass trimmer, the pruner, and the blower, and then two backup battery packs are equipped, so that the grass trimmer, the pruner, and the blower can work continuously. As another example, when a second type battery pack is equipped for the handheld power tool, and if a working duration of each handheld power tool is not long in one garden, one second type battery pack may also be equipped for each handheld power tool.

In a third manner, the battery pack system may be formed by only a second type battery pack. That is, a plurality of second type battery packs may be equipped for the hand push lawn mower, the grass trimmer, the pruner, and the blower. The plurality of second type battery packs supply power to the power tool system in turn, so that the power tool system works continuously. Similarly, to conform to the use habit of the conventional fuel tool, a second type battery pack may be pre-mounted on each handheld power tool in the power tool system, to prevent the battery pack from being replaced each time the power tool is replaced, and reduce a changing frequency of the battery pack. In this example, a second type battery pack may be pre-mounted on each of the grass trimmer, the pruner, and the blower. During working of a garden team, since the work team includes two workers and the two workers work simultaneously, two power tools work at the same time. To enable the two power tools to continuously work, in addition to mounting working battery packs on the power tools, two backup second type battery packs may further be equipped for the two power tools that work simultaneously.

Figures 17, 18:
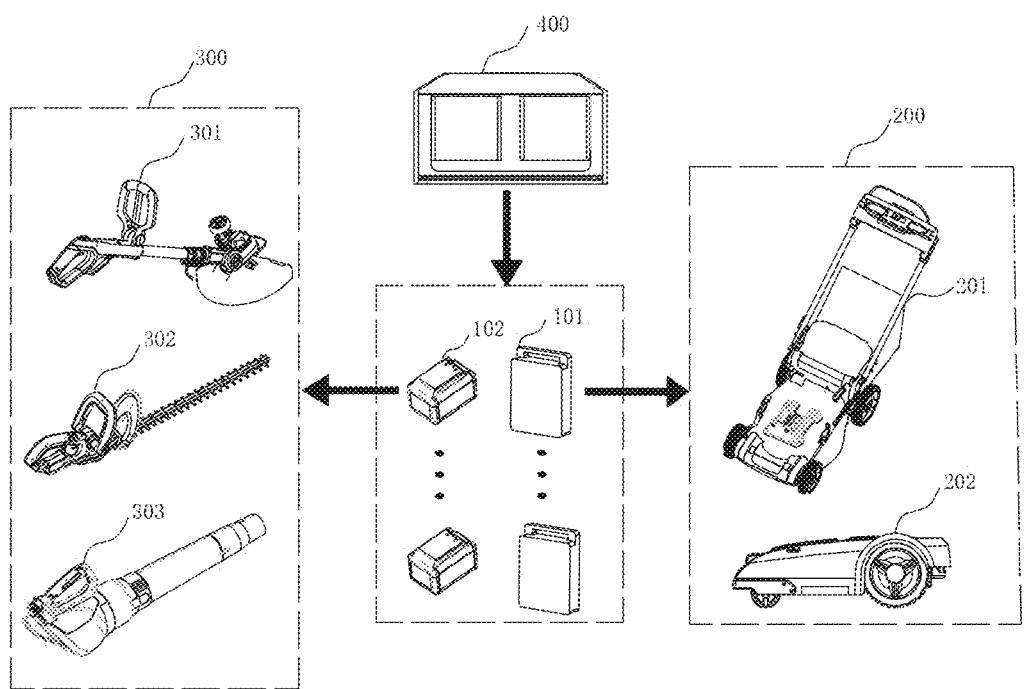
FIG. 17 is a schematic diagram of a power tool system according to another embodiment of this present disclosure.
FIG. 18 is a schematic diagram of a power tool system according to another embodiment of this present disclosure.

In a second typical application scenario of the commercial garden power tool, one or two workers form a work team and work outside for one day, to trim gardens of 10 to 20 homes. A difference between the second typical use scenario and the first typical use scenario is that types of the power tools are not identical. Specifically, as shown in FIG. 17 and FIG. 18, in the second typical use scenario, mowing is performed by the intelligent lawn mower 202 or the riding lawn mower 203, the hand push lawn mower 201 performs trimming, and other work is performed by the grass trimmer 301, the pruner 302, and the blower 303. That is, the power tool system includes the intelligent lawn mower 202, the hand push lawn mower 201, the grass trimmer 301, the pruner 302, and the blower 303, or the power tool system includes the riding lawn mower 203, the hand push lawn mower 201, the grass trimmer 301, the pruner 302, and the blower 303. The work team may include one or two workers.

As shown in FIG. 17, when the power tool system includes the intelligent lawn mower 202, the work team may include one worker. When the intelligent lawn mower 202 performs mowing, a worker A performs trimming by using the hand push lawn mower 201. After trimming is finished, the worker A performs other work by using the grass trimmer 301, the pruner 302, and the blower 303. Alternatively, the work team may include two workers. when the intelligent lawn mower 202 performs mowing, a worker A performs trimming by using the hand push lawn mower 201, and a worker B performs other work by using the grass trimmer 301, the pruner 302, and the blower 303. After completing trimming, the worker A may assist working of the worker B.

As shown in FIG. 18, when the power tool system includes the riding lawn mower 203, the work team may include one worker. In this case, a lawn of a garden has been mowed by another garden company by using the riding lawn mower 203, and a current garden company only needs to perform trimming and other non-mowing work. That is, a worker A performs trimming by using the hand push lawn mower 201, and then performs other work by using the grass trimmer 301, the pruner 302, and the blower 303 after completing trimming. Alternatively, as shown in FIG. 18, when the power tool system includes the riding lawn mower 203, the work team may also include two workers. In this case, a lawn of a garden also needs to be mowed by the current garden company. That is, a worker A performs mowing by using the riding lawn mower 203, and a worker B performs trimming by using the hand push lawn mower 201, and then performs other work by using the grass trimmer 301, the pruner 302, and the blower 303 to after completing trimming. After finishing mowing, the worker A may assist the worker B in performing other work.

For the second typical application scenario, the battery pack may be configured in the following manner.

When the power tool system includes the intelligent lawn mower, and the work team includes one worker, the battery pack system may be formed by only a first type battery pack. Since two power tools work simultaneously at the same moment, that is, the intelligent lawn mower and working of a worker A, a first type battery pack may be equipped for the intelligent lawn mower. The first type battery pack is mounted on the intelligent lawn mower, and another first type battery pack is equipped for working of the worker A. Typically, the worker A mounts the first type battery pack on the hand push lawn mower, releases a connection between the first type battery pack and the hand push lawn mower after completing trimming by using the hand push lawn mower, and then mounts the first type battery pack on a back frame. The worker A carries the first type battery pack on the back and connects the grass trimmer to the first type battery pack, to start grass trimming. After grass trimming is completed, the connection between the grass trimmer and the first type battery pack is released, and then the pruner is connected to the first type battery pack and the pruner starts working. After pruning is completed, the connection between the pruner and the first type battery pack is released, and the blower is connected to the first type battery pack and the blower starts working. To implement a continuous power supply to the power tool system, a backup battery pack needs to be further equipped for the power tool system. Since a charging speed of the first type battery pack is greater than a discharging speed, a backup first type battery pack may be equipped for each of power tools that work simultaneously. When an amount of energy of a working battery pack runs out, the backup battery pack is used to supply power to the power tool system and is also used to charge the working battery pack. Before or when an amount of energy of the backup battery pack runs out, the working battery pack has been fully charged and may be put into use. Therefore, four first type battery packs are equipped for the power tool system in this example, to enable the power tool system to continuously work.

When the power tool system includes the intelligent lawn mower and the work team includes one worker, the battery pack system may alternatively be formed by a first type battery pack and a second type battery pack. The first type battery pack is configured to supply power to the intelligent lawn mower and the hand push lawn mower, and the second type battery pack is configured to supply power to the handheld power tools such as the grass trimmer, the pruner, and the blower. Similarly, to conform to the use habit of the conventional fuel tool, a second type battery pack may be pre-mounted on each of the grass trimmer, the pruner, and the blower. During working in one garden, the intelligent lawn mower works continuously, and the hand push lawn mower may intermittently work as a supplement. Therefore, two first type battery packs may be equipped for the intelligent lawn mower, one first type battery pack serves as a working battery pack, and one first type battery pack serves as a backup battery pack, so that the intelligent lawn mower works continuously. One first type battery pack is equipped for the hand push lawn mower. When an amount of energy of the battery pack on the hand push lawn mower runs out, the battery pack is charged, and other handheld tools are used to perform other work during charging. In addition, one second type battery pack has been pre-mounted on each handheld tool, and the worker uses only one handheld tool at the same time during working. Therefore, two shared backup second type battery packs may be equipped for a plurality of handheld tools. Based on the foregoing, three first type battery packs and five second type battery packs may be equipped for the system. Typically, when the intelligent lawn mower works, the worker A performs trimming by using the hand push lawn mower. After an amount of energy of a battery pack on the hand push lawn mower runs out, the battery pack is charged. During charging, the worker A mounts the second type battery pack on the pruner to perform pruning. After pruning is completed, the second type battery pack is mounted on the grass trimmer, to perform grass trimming. When an amount of energy of the second type battery pack runs out, the second type battery pack is charged, and a backup second type battery pack is mounted on the grass trimmer to continue to work. When an amount of energy of the backup second type battery pack runs out, the worker A may mount the charged first type battery pack on the lawn mower, and continue to perform mowing by using the hand push lawn mower. As another example, when a second type battery pack is equipped for the handheld power tool, and if a working duration of each handheld power tool is not long in one garden, one second type battery pack may also be equipped for each handheld power tool.

When the power tool system includes the intelligent lawn mower, and the work team includes two workers, the battery pack system may be formed by only a first type battery pack. Three power tools work simultaneously at the same time. The intelligent lawn mower automatically performs mowing, a worker A performs trimming by using the hand push lawn mower, and a worker B performs other work by using handheld tools, for example, performing grass trimming by using the grass trimmer, or performing pruning by using the pruner, or performing blowing by using the blower. One first type battery pack may be equipped for each of the intelligent lawn mower, working of the worker A, and working of the worker B. The worker A and the worker B may adopt backpack battery packs. To implement a continuous power supply to the power tool system, three backup battery packs need to be further equipped for the system. When an amount of energy of a working backup battery runs out, the backup battery packs are used to supply power to the system and are also used to charge the working battery pack. Therefore, six first type battery packs may be equipped for the power tool system.

When the power tool system includes the intelligent lawn mower and the work team includes two workers, the battery pack system may alternatively be formed by a first type battery pack and a second type battery pack. The first type battery pack is configured to supply power to the intelligent lawn mower and the hand push lawn mower, and the second type battery pack is configured to supply power to the handheld power tools such as the grass trimmer, the pruner, and the blower. Similarly, to conform to the use habit of the conventional fuel tool, a second type battery pack may be pre-mounted on each of the grass trimmer, the pruner, and the blower. When the intelligent lawn mower automatically performs mowing, a worker A performs trimming by using the hand push lawn mower, and a worker B performs other work by using handheld tools. One group of first type battery packs may be equipped for the intelligent lawn mower, so that the intelligent lawn mower works continuously. Another group of first type battery packs are equipped for the hand push lawn mower, so that the hand push lawn mower works continuously. Two backup second type battery packs are equipped for the pruner, the grass trimmer, and the blower jointly, so that the grass trimmer, the pruner, and the blower work continuously. In this example, the battery pack system may include four first type battery packs and five second type battery packs. Two first type battery packs and one second type battery pack are one group and serve as working battery packs.

As shown in FIG. 18, when the power tool system includes the riding lawn mower, and the work team includes one worker, the battery pack system may be formed by only a second type battery pack. In the working system, lawn mowing work is completed by another garden company by using the riding lawn mower, and the current garden company only needs to perform lawn trimming and arrangement and other non-mowing work. Similarly, to conform to the use habit of the conventional fuel tool, a second type battery pack may be pre-mounted on each of the grass trimmer, the pruner, and the blower. Since there is one worker in the work team, only one power tool works at the same moment. Typically, a worker A first mounts one second type battery pack on the hand push lawn mower and performs trimming by using the hand push lawn mower. After an amount of energy of the battery pack runs out, the battery pack is charged, and a backup second type battery pack is mounted on the hand push lawn mower. Preferably, there may be two backup second type battery packs. The plurality of second type battery packs supply power to the power tool system alternately and cyclically, to complete trimming work of one garden.

When the power tool system includes the riding lawn mower and the work team includes one worker, the battery pack system may be formed by a first type battery pack and a second type battery pack. The first type battery pack is configured to supply power to the riding lawn mower and the hand push lawn mower, and the second type battery pack is configured to supply power to the handheld power tools such as the grass trimmer, the pruner, and the blower. Similarly, a second type battery pack may be pre-mounted on each of the grass trimmer, the pruner, and the blower. Since there is one worker in the work team, only one power tool works at the same moment. Therefore, in this example, there may be one first type battery pack and five second type battery packs. Typically, a worker A may first mount the first type battery pack on the lawn mower, and perform trimming by using the lawn mower. After an amount of energy of the battery pack on the lawn mower runs out, the battery pack is charged. Subsequently, the worker A starts pruning by using the pruner. After an amount of energy of a second type battery pack on the pruner runs out, two backup second type battery packs may be configured to supply power to the pruner in turn to complete pruning. Before or after pruning is finished, the first type battery pack has been fully charged, and the worker A may mount the first type battery pack on the lawn mower again to perform trimming. In this way, the power tool system can continuously work by alternately using the lawn mower and other handheld tools.

When the power tool system includes the riding lawn mower and the work team includes two workers, the battery pack system may be formed by a first type battery pack and a second type battery pack. The first type battery pack is configured to supply power to the riding lawn mower and the hand push lawn mower, and the second type battery pack is configured to supply power to the handheld power tools such as the grass trimmer, the pruner, and the blower. Similarly, a second type battery pack may be pre-mounted on each of the grass trimmer, the pruner, and the blower. A worker A performs mowing by using the riding lawn mower, and a worker B performs trimming by using the hand push lawn mower. After completing work, the worker A may assist working of the worker B. In the working system, one group of first type battery packs may be equipped for the riding lawn mower and the hand push lawn mower, and one group of backup second type battery packs are equipped for the grass trimmer, the pruner, and the blower. When the worker A performs mowing by using the riding lawn mower, the worker B may perform trimming by using the hand push lawn mower and then perform other work by using the grass trimmer, the pruner, and the blower after finishing trimming. To implement continuous working, the system requires three first type battery packs and two second type battery packs. Two first type battery packs are configured to supply power to the riding lawn mower. One first type battery pack serves as a working battery pack, and one first type battery pack serves as a backup battery pack. When the worker A performs mowing by using the riding lawn mower, the worker B performs trimming by using the hand push lawn mower. Therefore, the third first type battery pack is configured to supply power to the hand push lawn mower. After an amount of energy of the battery pack on the hand push lawn mower runs out, the battery pack is charged. During charging, the worker B may perform pruning by using the pruner. After an amount of energy of the second type battery pack on the pruner runs out, two backup second type battery packs are used to supply power to the pruner in turn, to complete pruning. Similarly, after pruning is completed, grass trimming is performed. When an amount of energy of the backup second type battery pack runs out, the worker B may mount the charged first type battery pack on the lawn mower and continue to perform mowing by using the hand push lawn mower. In this way, the power tool system can continuously work by alternately using the lawn mower and other handheld tools.

Figure 19A:
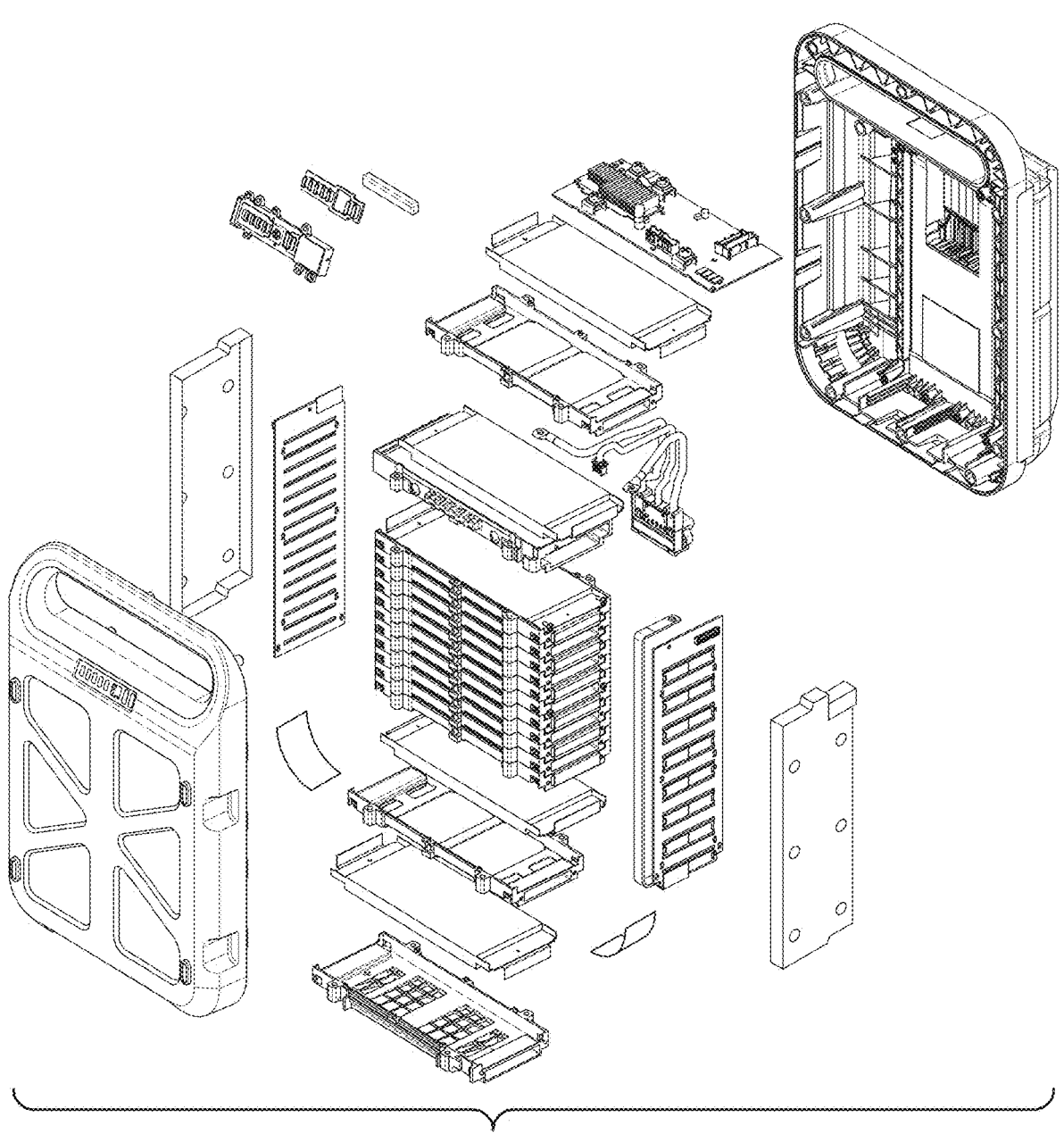
FIG. 19A is an exploded schematic structural diagram of a battery pack according to an embodiment of this present disclosure.
Figure 19B:
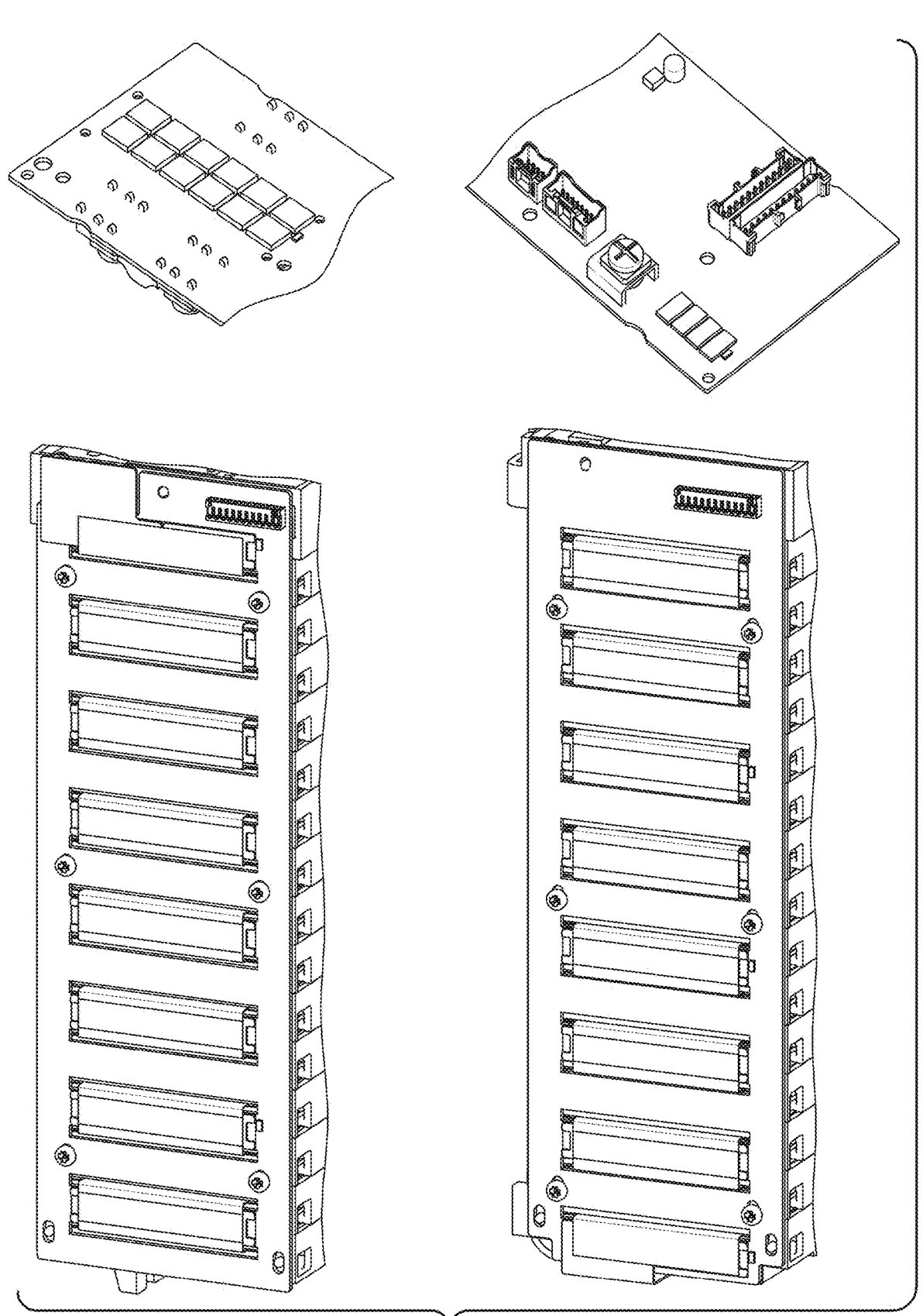
FIG. 19B is a schematic structural diagram of a battery pack interior according to an embodiment of this present disclosure.
Figure 19C:
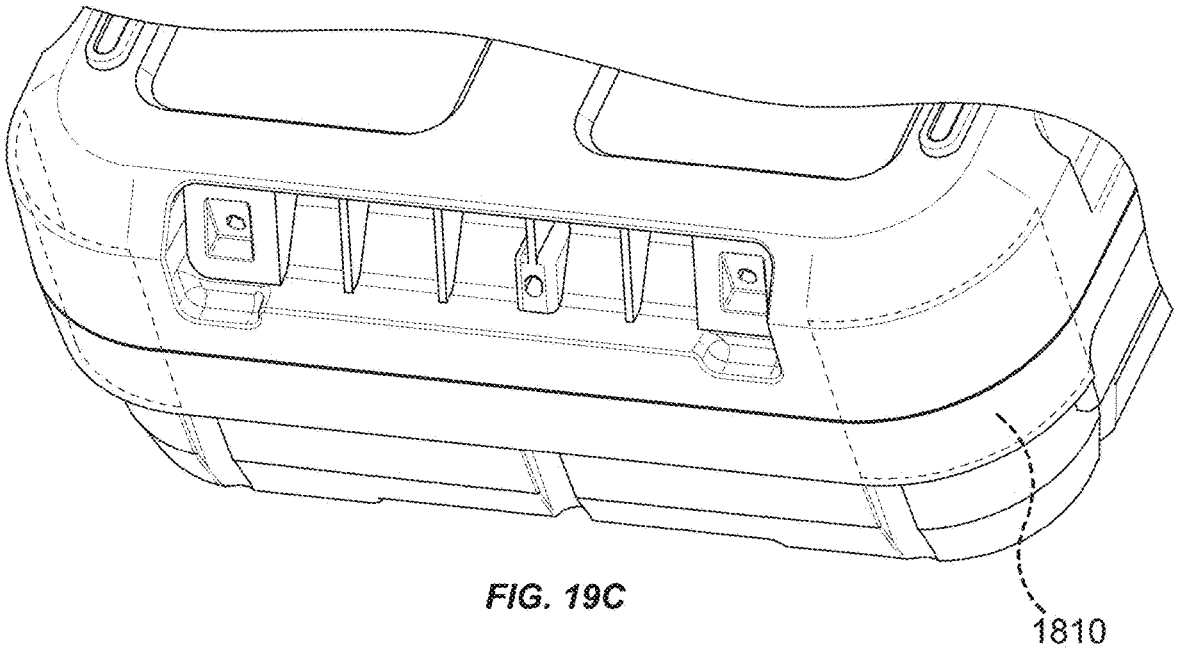
FIG. 19C is a schematic structural diagram of a battery pack interior according to an embodiment of this present disclosure.
Figure 19D:
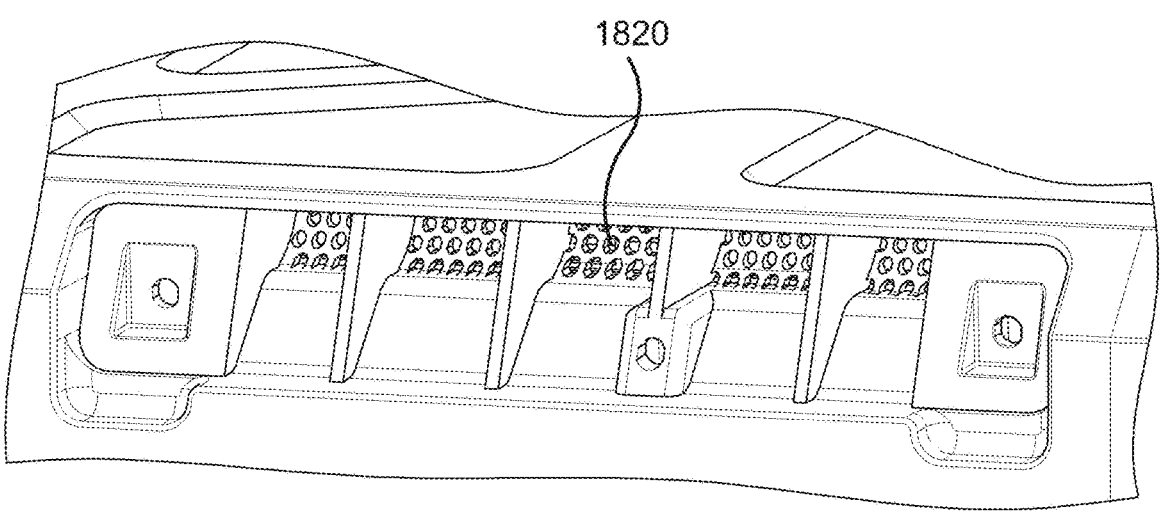
FIG. 19D is a schematic structural diagram of a battery pack interior according to an embodiment of this present disclosure.

FIG. 19A shows an exploded view of a battery pack. Specifically, FIGS. 19A and 19B highlight the temperature control of the battery pack. There are 8 temperature sensors in total. Five sensors are used to detect the temperature of the positive and negative electrodes of the cells, which are installed on the circuit board connected to the positive and negative electrodes of the cells. The detected temperature value is used to adjust the charging current. One sensor is used to detect the temperature of MOS and to protect MOS from overheating. One sensor is used to detect the temperature of the current sensor, and is further used to correct the inaccurate detection of the current sensor as the temperature rises. One sensor is used to detect the temperature of the charging electrode of the battery pack and judge the reliability of the connection between the battery pack and the charger (not shown in the figure). FIG. 19C indicates 65Mn steel plates 1810 added to the corners of the housing to strengthen the housing in case of being dropped. FIG. 19D highlights the honeycomb-shaped air inlet 1820. A filter screen (not shown) is placed adjacent to the honeycomb-shaped air inlet 1820 to prevent contamination from entering the housing.

It should be noted that although the foregoing embodiments are described by using an example of the battery pack with the nominal voltage of 60V, when the nominal voltage of the battery pack is another voltage value, a relationship between the charge rate and the discharge rate of the battery pack can still make the battery pack meet a state of being continuously and cyclically used, to reduce the use costs of the battery pack. For example, when a voltage of a battery pack is 20V, an output current of the battery pack is not less than 60 A, so that the battery pack can meet the high-power requirement of the power tool. If a capacity of the battery pack is 11 Ah, and a discharge current is 60 A, a discharge rate of the battery pack is about 6 C. By configuring an output current of a mobile charging apparatus, a charge rate of the battery pack may be not less than 6 C, and when the charge rate is not less than 6 C, a temperature of the battery pack is less than a temperature protection threshold of the battery pack during charging, so that the battery pack can be immediately discharged after charging is finished, and can be immediately charged after discharging is finished, to implement continuous use of the battery pack.

FIG. 20 illustrates an example scenario of charging battery packs for a work day. A typical working scenario for outdoor commercial garden tools is that a team, equipped with lawn mowers, pruners such as hedge trimmers, blowers, and other tools, works outside for a day to trim the gardens for 10-20 families. At each garden, worker A will cut the grass with a lawn mower. During worker A's mowing, worker B will perform other types of work in turn. For example, worker B will prune, then blow grass. Once the team has finished one garden, they go to another and repeat the process until they have finished all the work for the day. In order to improve the work efficiency to accomplish as many gardens as possible, the power of outdoor commercial garden tools is usually high. For example, a garden blower is usually 2300 W and a lawn mower is usually 2600 W. Additionally, the vehicle can be used to charge the mobile charging apparatus and/or the battery packs. For example, the battery packs can be charged with available AC power. Therefore, there are the following challenges when using battery packs to power outdoor commercial garden tools instead of petrol:

(1) How to provide electricity for a day. If the capacity of the battery pack is large enough, the battery pack may be too heavy, which makes it difficult to use for tools. If the battery pack is light enough, its capacity is not high enough to last a day. Carrying enough small battery packs can be too costly.

(2) How to meet the requirements of electricity which is always available without waiting. Existing power tool battery packs, usually lithium, have a maximum charge rate of 3 C and take 20 minutes to charge fully. The charge time is longer than the discharge time. After charging fully, the temperature rises and cannot be used immediately by tools. As a result, after a tool exhausts one battery pack, it has to wait for another battery pack to be used. As a result, users have to wait longer for the power supply and work shorter, thus reducing work efficiency.

(3) How to meet the requirements of high power. Existing power tool battery packs, usually lithium, have a maximum discharge current is about 20 A. The discharge power it can provide is generally between 400 W and 800 W. To achieve the power of 2000 W, the number of cells needs to be increased, which will not only increase the weight of the battery pack, but also adds to the complexity of the battery management system.

(4) How to meet the requirements of low life cycle cost. Existing power tool battery packs, usually lithium, have a cycle life of 300 to 1000 cycles. Considering that the number of battery packs is not too many equipped for an outdoor team in a day, each battery pack may be recycled for 8 to 10 times a day, and the life of the battery pack will end in 1 to 3 months, resulting in a high use cost of the battery pack.

For challenge 1), the battery pack described herein gives consideration to the weight of the battery pack and the power consumption for one day, using one mobile charging apparatus and multiple battery packs with relatively light weight. Battery packs supply power to power tools to ensure their operability. The mobile charging apparatus stores a day's electricity and can follow the user to each working place to charge the battery pack at any time when there is no electricity in the battery pack.

As shown in FIG. 20, battery packs comprise first type battery packs 308 (for example, backpack battery packs) and second type battery packs 306 (for example, handheld battery packs), which power different types of tools and can be charged by the same mobile charging apparatus 304. For example, the second type battery pack has a less energy and less weight than that of the first type battery pack. So the second type battery pack is more suitable to a handheld power tools, and the first type battery pack is more suitable to a wheeled power tool or a backpack power tool. The battery packs also can be charged by a regular charger when AC power is available. For example, the battery packs can be charged by an electric vehicle (EV). The mobile charging apparatus 304 charges itself with an EV charger or AC power. Commercial power garden tools, and other tools, can be provided having identical tool ports. The first or second type battery pack all have the same charging and discharging port. All the tools can be used with either the first or second type battery pack.

The mobile charging apparatus is made up of a charging component and an energy storage component. The charging component is configured to connect to the battery pack (e.g., the first battery pack and the second battery pack). The energy storage component is configured to store electrical energy sufficient for the plurality of jobs. Each job in the plurality of jobs can be at different geographical locations, and the plurality of jobs is a number of jobs that a crew is expected to complete in a day of work (e.g., from sunrise to sunset, from sunrise to a time determined by local noise ordinance, or any suitable work day).

In an embodiment, the mobile charging apparatus includes a charging component enabling connecting with the first and second battery pack, and an energy storage component configured to store electrical energy sufficient for the plurality of jobs, wherein the charging component and energy storage component are independent and separate within the mobile charging apparatus.

The charging component and energy storage component are independent and separate within the mobile charging apparatus. The charging component and the energy storage component can be connected together (e.g., locked together) within the mobile charging apparatus. In certain examples, the mobile charging apparatus can have an energy of 5 kWh, a maximum charging power of up to 1800 W, a maximum discharging power of up to 6000 W, a full charge time of 3.3 hours, and a discharging rate of 1.2 C. Additionally, the internal resistance of a cell of the mobile charging apparatus can be greater than an internal resistance of a cell contained in the first and/or second battery pack.

For challenge 2), the charging speed of the battery pack is faster than that of the lithium battery pack, to enable the charging speed to be close to the discharging speed of the battery pack. Existing lithium battery packs typically charge at a slower rate than they discharge.

Based on this characteristic, the battery packs described herein are divided into two battery packs A and B. Each part comprises one, two, or three battery packs. When battery pack A supplies power to tools, battery pack B is charged by the mobile charging apparatus. The charging speed of battery pack B in the mobile charging apparatus is basically the same as the discharging speed of battery pack A in the tools. In this way, part B is fully charged once the power in part A is exhausted. Then, part B supplies power to the tool, and battery pack A is charged by the mobile charging apparatus. This cycle ensures that the tools continue to have power without waiting.

Additionally, the battery packs can be charged by the mobile charging apparatus in about 5 minutes. Thus, the battery packs can be charged fully on the way to another garden.

For challenge 3), the battery pack can provide high power by utilizing the large discharge rate of the battery pack. The ability to discharge at a high rate allows the battery pack to discharge high current and thus provide high power.

For challenge 4), the long cycle life of the battery pack is up to 5000 charge-discharge cycles. A longer cycle life can reduce operating costs. In preferred embodiments, the life cycle of the battery pack is greater than 2500 cycles at ambient temperatures ranging from about 0° C. to about 45° C. (e.g., from about 5° C. to about 45° C., from about 0° C. to about 40° C., from about 5° C. to about 40° C., or from about 10° C. to about 35° C.), In some examples, when the battery pack charges at a charging rate of 5 C and discharges at a rate of 5 C, the battery pack capacity retention can be at least 75% after the 2500 cycles.

For typical application scenarios and to implement continuous working of the power tool system, each battery pack needs to be repeatedly charged and discharged a plurality of times. During trimming of one garden, each battery pack requires one or two charge-discharge cycles (e.g., where the battery pack is charged and subsequently discharged by using the power tool), and one work team needs to trim gardens of 10 to 20 homes when working outside for one day. Therefore, charging and discharging times of each battery pack in the battery pack system are up to 10 to 20 times in one day. If the battery pack has a relatively short service life, the battery pack needs to be renewed frequently, resulting in relatively high use costs.

A common ternary lithium battery system 18650-type battery pack on the market currently has a charge rate of less than 3 C, which is usually 0.5 C to 1 C, with a relatively low charging speed. If a charge current is improved forcibly and the charge rate is increased, the service life of the battery pack is shortened. If the 18650-type battery pack is applicable to the typical application scenarios of the commercial garden tools, when the battery pack performs a charge and discharge cycle at a charge rate of 0.5 C, a quantity of charge and discharge cycles of the battery pack may reach 1500 times, and a capacity retention rate is 80% of a rated capacity of the battery pack after the 1500 charge and discharge cycles. The capacity retention rate is a ratio of an actual capacity of the battery pack to the rated capacity of the battery pack after the battery pack is recharged. As a quantity of times of charging of the battery pack is increased, the actual capacity of the battery pack is reduced, and a smaller reduction rate (that is, a larger capacity retention rate of the battery pack) indicates better capacity retention performance of the battery pack. Since the conventional 18650-type battery pack has a small charge rate and a slow charging speed, a charging waiting time of the power tool is relatively long. If the power tool needs to work continuously, it requires preparation of a relatively large quantity of backup battery packs, resulting in high use costs. If charge and discharge rates of the battery pack are improved, when the battery pack is cyclically charged and discharged at charge and discharge rates of 3 C, the service life of the battery pack is shortened to around 300 times, and the battery pack needs to be replaced frequently, also resulting in high use costs.

Another common lithium iron phosphate system 21700-type battery pack has a charge rate of less than 1 C. When the battery pack performs a charge and discharge cycle at a charge rate of 1 C, a quantity of charge and discharge cycles of the battery pack is not greater than 1000 times, and a capacity retention rate is 70% of a rated capacity of the battery pack after the 1000 charge and discharge cycles. Consequently, the common lithium iron phosphate system battery pack also has a relatively low charge rate and a slow charging speed, which cannot meet a fast charging requirement of the commercial garden power tool. If the charge rate of the battery pack is improved, the service life of the battery pack is shortened, and the battery pack needs to be replaced frequently during use, resulting in high use costs of the battery pack.

Therefore, in the foregoing application scenarios, the conventional ternary lithium battery system 18650-type battery pack and lithium iron phosphate system 21700-type battery pack have difficulty meeting the requirements of the commercial garden power tools.

When the battery pack continuously performs charge and discharge cycles at a charge rate of greater than or equal to 3 C and a discharge rate of greater than or equal to 3 C, a maximum quantity of charge and discharge cycles of the battery pack is not less than 2000 times, and a capacity retention rate of the battery pack is not less than 80% of a rated capacity of the battery pack after the 2000 charge and discharge cycles. It should be noted that during a service life test, after charging is finished, the battery pack is discharged after a temperature drops to room temperature, and after discharging is finished, the battery pack is charged after a temperature drops to room temperature.

For example, when the battery pack continuously performs charging and discharging at a charge rate of 3 C and a discharge rate of 10 C, a quantity of charge and discharge cycles of the battery pack may reach 2500 times or more, and a capacity retention rate of the battery pack is not less than 75% of a rated capacity of the battery pack after the 2500 charge and discharge cycles.

For example, when the battery pack continuously performs charging and discharging at a charge rate of 3 C and a discharge rate of 3 C, a quantity of charge and discharge cycles of the battery pack may reach 5000 times or more, and a capacity retention rate of the battery pack is not less than 80% of a rated capacity of the battery pack after the 5000 charge and discharge cycles.

For example, when the battery pack continuously performs charging and discharging at a charge rate of 4 C and a discharge rate of 4 C, a service life of the battery pack may reach 5000 times or more, and a capacity retention rate of the battery pack is not less than 80% of a rated capacity of the battery pack after the 5000 charge and discharge cycles.

For example, when the battery pack continuously performs charging and discharging at a charge rate of 5 C and a discharge rate of 5 C, a service life of the battery pack may reach 5000 times or more, and a capacity retention rate of the battery pack is not less than 80% of a rated capacity of the battery pack after the 5000 charge and discharge cycles.

For example, when the battery pack continuously performs charging and discharging at a charge rate of 5 C and a discharge rate of 10 C, a service life of the battery pack may reach 5000 times or more, and a capacity retention rate of the battery pack is not less than 80% of a rated capacity of the battery pack after the 5000 charge and discharge cycles.

For example, when the battery pack continuously performs charging and discharging at a charge rate of 10 C and a discharge rate of 10 C, a service life of the battery pack may reach 5000 times or more, and a capacity retention rate of the battery pack is not less than 80% of a rated capacity of the battery pack after the 5000 charge and discharge cycles.

For example, when the battery pack continuously performs charging and discharging at a charge rate of 10 C and a discharge rate of 15 C, a service life of the battery pack may reach 5000 times or more, and a capacity retention rate of the battery pack is not less than 80% of a rated capacity of the battery pack after the 5000 charge and discharge cycles.

It should be noted that during a service life test, after finishing charging each time, the battery pack waits for a temperature to drop before discharging, to prevent the temperature of the battery pack from reaching a discharging protection temperature value during discharging. After finishing discharging each time, the battery pack waits for a temperature of the battery pack to drop before charging, to prevent the temperature of the battery pack from reaching a charging temperature protection value during charging.

As an example, when a first type battery pack performs a charge and discharge cycle at a charge rate of not less than 6 C and a discharge rate of not less than 4 C, a quantity of charge and discharge cycles of the battery pack is greater than or equal to 2000 times, and when the quantity of charge and discharge cycles has reached 2000 times, a capacity retention rate of the battery pack is not less than 80% of a rated capacity. Specifically, when a first type battery pack performs a charge and discharge cycle at a charge rate of 6 C and a discharge rate of 4 C, a quantity of times of charging and discharging of the battery pack is not less than 5000 times.

When a second type battery pack continuously performs charge and discharge cycles at a charge rate of not less than 12 C and a discharge rate of not less than 10 C, a quantity of charge and discharge cycles of the battery pack is greater than or equal to 2000 times, and when the quantity of charge and discharge cycles has reached 2000 times, a capacity retention rate of the battery pack is not less than 80% of a rated capacity. Specifically, when the second type battery pack performs a charge and discharge cycle at a charge rate of 12 C and a discharge rate of 10 C, a quantity of times of charging and discharging of the battery pack is not less than 5000 times.

It can be learned that the charge rate of the battery pack provided is far greater than a charge rate of a common battery pack on the market, and at large charge and discharge rates, a service life is far greater than a service life of the common battery pack on the market, so that the battery pack is more applicable to the use scenarios of the commercial garden power tools. When the battery pack provided is used to support continuous working of the power tool system, frequent replacement of a new battery pack can be avoided, thereby reducing the entire working costs of the power tool system.

In addition, the battery pack provided not only has a large charge rate and a long service life, but also has good temperature rise performance of the battery pack under the condition of the large charge rate and the long service life. Specifically, when the battery pack performs a charge and discharge cycle at a charge rate of not less than 3 C and a discharge rate of not less than 3 C, a quantity of cycles of the battery pack is not less than 2000 times. A capacity retention rate of the battery pack is not less than 80% of a rated capacity of the battery pack after the 2000 charge and discharge cycles. A temperature rise of the battery pack is 3° C. when the battery pack is charged at the charge rate of 3 C, and a temperature rise of the battery pack is 10° C. when the battery pack is discharged at the discharge rate of 3 C.

As an example, when a first type battery pack performs a charge and discharge cycle at a charge rate of 6 C and a discharge rate of 4 C, a quantity of charge and discharge cycles of the battery pack is greater than or equal to 2000 times. When the quantity of charge and discharge cycles has reached 2000 times, a capacity retention rate of the battery pack is not less than 80% of a rated capacity, and a charging temperature rise of the battery pack is 12° C. during charging and a discharging temperature rise of the battery pack is 15° C. during discharging.

As another example, when a second type battery pack performs a charge and discharge cycle at a charge rate of 12 C and a discharge rate of 10 C, a quantity of charge and discharge cycles of the battery pack is greater than or equal to 2000 times. When the quantity of charge and discharge cycles has reached 2000 times, a capacity retention rate of the battery pack is not less than 80% of a rated capacity, and a charging temperature rise of the battery pack is 33° C. during charging and a discharging temperature rise is not greater than 35° C.

Due to the relatively high charge rate of the battery pack provided, by setting the charge rate and the discharge rate of the battery pack, a charging speed of the battery pack is equivalent to a discharging speed, and even the charging speed is greater than the discharging speed. Therefore, when the battery pack is applicable to the commercial garden power tools, a garden team may implement continuous working of the power tools by configuring a few battery packs.

Based on the foregoing, according to a quantity of power tools when the power tool system works simultaneously, types of battery packs and a quantity of battery packs are configured appropriately, so that the garden team can go out with a small quantity of battery packs to continuously supply power to the power tool system, to improve the working efficiency of the power tool system. In addition, due to a relatively long service life of the battery pack, the use costs of the battery pack can be reduced, and the power tool can replace the conventional fuel tool.

In addition, a maximum output power of the battery pack of the present disclosure is not less than 2000 W, and an amount of energy of the battery pack is not greater than 1 kWh. Therefore, the battery pack may output a high power in a case of a relatively low amount of energy, to support working of a high-power power tool.

Further, a quantity of single cells in the battery pack does not exceed 15. Specifically, there may be 15 single cells in the battery pack, and the single cells are connected in series to supply power to a power tool. Therefore, according to the battery pack provided in this embodiment, an output power is not less than 2000 W, an amount of energy of the battery pack is not greater than 1 kWh, and the quantity of single cells in the battery pack does not exceed 15. By designing the output power of the battery pack, the amount of energy of the battery pack, and the quantity of cells, the output energy of the battery pack can meet the power requirement of the power tool, the amount of energy of the battery pack and the quantity of cells are designed to make an endurance time of the battery pack meet the requirement of the power tool, and the weight of the battery pack does not affect the use comfort.

According to the battery pack provided, energy density is greater than or equal to 100 Wh/Kg. Specifically, the energy density of the battery pack may be greater than 120 Wh/kg (e.g., 125 Wh/kg, 130 Wh/kg, 135 Wh/kg). An amount of energy of the first type battery pack is greater than or equal to 600 Wh, and an amount of energy of the second type battery pack is greater than or equal to 216 Wh.

Usually, to enable garden workers to reduce a quantity of battery packs when going out to work with power tools and ensure an endurance time of the power tool, a general research direction in the industry is to improve energy density of a battery pack, so that a single battery pack can store as much power as possible without changing a weight, so that a work team can carry a small amount of battery packs when going out to work to implement continuous working of the power tools. For example, energy density of a conventional ternary lithium battery system 18650-type battery pack ranges from 180 Wh/Kg to 240 Wh/Kg. Energy density of a conventional lithium iron phosphate battery system 21700-type battery pack is greater than or equal to 150 Wh/Kg. To improve the energy density, various battery manufacturers usually start with a cell structure, and increase a size of a cell by finely adjusting the cell structure to achieve an effect of amount of power expansion. However, as the size of the cell increases, the weight of the cell also increases. Therefore, adjustment of the cell structure is only palliative. The key is to find cathode and anode materials with high energy density. The research on the cathode and anode materials has reached a bottleneck stage. Therefore, an improvement range of the energy density of the cell is limited.

For an endurance problem of a garden power tool system, the present disclosure provides another research direction, that is, a charge rate of a battery pack is improved, to improve a charging speed of the battery pack, so that the charging speed of the battery pack is close to a discharging speed. A few battery packs are used to supply power to a power tool, to implement continuous working of the power tool. For example, two first type battery packs or three second type battery packs may be used to continuously supply power to a power tool that is currently working, so that a work team can carry a few battery packs when going out to work, to implement continuous working of the power tool, thereby improving the portability of the battery pack system and reducing the use costs of the battery pack system.

Another embodiment of the present disclosure provides a battery pack system, including a plurality of groups of battery packs, configured to alternately supply power to a power tool system. The power tool system may include one or more commercial garden power tools. For example, if the power tool system needs to perform single work, the single work can be completed by one type of power tool. In this case, only one power tool may be equipped for a user. In another example, if the power tool system needs to perform various types of work, it requires a plurality of power tools to cooperate with each other to complete, and the power tool system includes a plurality of power tools.

Another embodiment of the present disclosure provides a power tool system, including at least one garden power tool. The configuration of the power tool in the power tool system is described above. The garden power tool includes a body, a motor, a motor output shaft, and a working portion. The motor is arranged in the body and is configured to provide power. The motor output shaft is connected to the motor and is configured to rotate under the drive of the motor. The working portion is coupled to the motor output shaft and is configured to work under the drive of the motor output shaft. The power tool system further includes a battery pack system. The battery pack system includes a plurality of battery packs described above. The battery packs are detachably connected to the power tool and are configured to alternately supply power to the power tool system, so that the power tool system can continuously work.

Further, the power tool system includes at least two of garden power tools such as a blower, a grass trimmer, a lawn mower, a pruner, and a bush cutter. An output power of the garden power tool is greater than or equal to 1200 W. Preferably, the output power of the garden power tool is greater than or equal to 1600 W. More preferably, the output power of the garden power tool is greater than or equal to 2000 W.

A quantity of battery packs in the battery pack system may be configured according to a quantity of power tools that work simultaneously in the garden power tool system. Preferably, the quantity of battery packs may be not less than a quantity of battery packs required when the power tool system works. More preferably, the quantity of battery packs may be not less than twice the quantity of battery packs required when the power tool system works. The quantity of battery packs required when the power tool system works may be understood as a maximum quantity of battery packs used at the same time when the power tool system works.

The battery packs are used to supply power to the power tool system, so that the power tool system can continuously work when there are a relatively small quantity of battery packs, to reduce the use costs of the battery pack and improve the working efficiency of the power tool. In addition, the garden team conveniently carries the battery packs when going out to work.

In at least one embodiment, the battery pack includes a housing, and at least one battery cell provided within the housing. Wherein the housing is provided with a charging and discharging port such that the battery pack can be electrically as well as mechanically connected to a power tool to provide electrical power. The battery pack can be provided in a specific way with reference to the preceding embodiments, of course it can also be provided in other ways. Each of the at least one battery cell has a capacity of at least 3.6 Ah, a maximum allowable charge rate of at least 5 C and an internal resistance of at least 3 m$\Omega$.

In one example, the battery pack includes a plurality of cells, the internal resistance of the plurality of battery cells is not greater than 45 m$\Omega$ and the capacity of the plurality of battery cells is not less than 4 Ah. In another example, the battery pack includes a plurality of cells, the internal resistance of the plurality of battery cells is not greater than 13.5 m$\Omega$ and the capacity of all of the plurality of battery cells is not less than 11 Ah.

Multiple battery cells in a battery pack can be connected in series, in parallel, or both in series and in parallel. The multiple battery cells are connected to each other in at least one of these ways to form the plurality of battery cells. The internal resistance of the plurality of battery cells is less than or equal to the internal resistance of the battery pack. This is because the internal resistance of the battery pack includes not only the internal resistance of the plurality of battery cells, but also the internal resistance of the circuitry that connects the plurality of battery cells to the positive and negative terminals of the battery pack, as well as the internal resistance of the positive and negative terminals of the battery pack. The capacity of the plurality of battery cells is equal to the capacity of the battery pack.

In one example, the battery pack includes 15 battery cells connected in series with each other, each having a capacity of not less than 4 Ah, an internal resistance of not greater than 3 m$\Omega$ and a rated voltage of not less than 4 V. The rated voltage of the battery pack is not less than 60 V and the capacity of the battery pack is not less than 4 Ah. In another example, the battery pack includes 15 battery cells connected in series with each other, each having a capacity of not less 10 Ah, an internal resistance of not greater than 0.9 mΩ and a rated voltage of not less than 4 V. The rated voltage of the battery pack is not less than 60 V and the capacity of the battery pack is not less than 10 Ah.

In one example, the battery pack includes 15 battery cells connected in series with each other, each having a capacity of 4 Ah, a maximum allowable charge rate of 10 C, and an internal resistance of less than 3 mΩ. For example, the internal resistance of each battery cell ranges from 1.8 mΩ to 3 mΩ, such as 1.9 mΩ, 2 mΩ, 2.2 mΩ, 2.6 mΩ. Then the capacity of the battery pack is 4 Ah, the maximum allowable charge rate of the battery pack is 10 C, and the internal resistance of the plurality of the battery cells range from 27 mΩ to 45 mΩ. For example, the rated voltage of each battery cell is 4V and the rated voltage of the battery pack is 60V. In another example, the battery pack includes 15 battery cells connected in series with each other, each having a capacity of 11 Ah, a maximum allowable charge rate of 10 C, and an internal resistance ranges from 0.75 mΩ to 0.85 mΩ. Then the capacity of the battery pack is 11 Ah, the maximum allowable charge rate of the battery pack is 10 C, and the internal resistance of the plurality of battery cells is not greater than 13 mΩ. For example, a rated voltage of each battery cell is 4V and the rated voltage of the battery pack is 60V.

In one example, the battery pack includes 5 battery cells connected in series with each other, each having a capacity of 4 Ah, a maximum allowable charge rate of 10 C, and an internal resistance in a range of 1.8 mΩ to 3 mΩ. Then the capacity of the battery pack is 4 Ah, the maximum allowable charge rate of battery pack is 10 C, and the internal resistance of plurality of battery cells ranges from 9 mΩ to 15 mΩ. For example, the rated voltage of each battery cell is 4 V and the rated voltage of the battery pack is 20 V. In another example, the battery pack includes 5 battery cells connected in series with each other, each having a capacity of 11 Ah, a maximum allowable charge rate of 10 C and an internal resistance in a range of 0.75 mΩ to 0.85 mΩ. The capacity of the battery pack is 11 Ah, the maximum allowable charge rate of the battery pack is 10 C and the internal resistance of plurality of battery cells ranges from 3.75 mΩ to 4.25 mΩ. For example, the rated voltage of each battery cell is 4V and the rated voltage of the battery pack is 20V.

In at least one example, the maximum allowable charge rate of the battery cell can be 5 C, 8 C, 1° C., or 12 C. When the maximum allowable charge rate is in the range of 10 C to 12 C, the battery pack containing the battery cell can be fully charged in 5 to 6 minutes. The charging speed is so fast that a charge is as quick as a fill-up, so that after replacing a petrol tool with a power tool containing this battery pack, the user's habits of using a power tool are the same as those of a petrol tool, with no additional waiting time added.

In at least one example, the battery pack includes a number of battery cells of 6, 8, 10, 12, 16, 20 or 30, etc. The battery cells may be connected to each other in series only or in both series and parallel. As the number of battery cells in series increases, the voltage of the battery pack increases, and as the number of battery cells in parallel increases, the capacity of the battery pack increases. In at least one embodiment, each battery cell may have a capacity of 3.6 Ah, 5 Ah, 6 Ah, 8 Ah, 10 Ah, 12 Ah, or 14 Ah.

In at least one example, the internal resistance of each battery cell has a predetermined correspondence with the capacity. For example, the predetermined correspondence is such that the internal resistance decreases as the capacity of each battery cell increases. For example, the capacity of each battery cell is inversely proportional to the internal resistance. For example, the product of the capacity of each battery cell (Ah) and the internal resistance (mΩ) ranges from 6 and 12. In one example, the capacity of the battery cell is 4 Ah and an internal resistance of the battery cell ranges from 1.8 mΩ to 2.8 mΩ. In another example, the capacity of the battery cell is 2 Ah and an internal resistance of the battery cell ranges from 3 mΩ to 4 mΩ. In another example, the capacity of the battery cell is 6 Ah and an internal resistance of the battery cell ranges from 1.4 mΩ to 1.7 mΩ. In another example, the capacity of the battery cell is 11 Ah and an internal resistance of the battery cell ranges from 0.75 mΩ-0.85 mΩ.

In at least one embodiment, the battery pack includes at least one battery cell. The battery pack has a low temperature rise when charging and discharging at a large rate, such that the battery pack does not trigger over-temperature protection due to a high temperature rise after completing a large rate charge or discharge. This allows the battery pack to be used continuously without having to wait for the temperature to drop. Over-temperature protection means that the charger or battery pack monitors that the temperature of the battery pack is too high during the charging of the battery pack and to prevent the high temperature from having an impact on the performance or life of the battery pack, the charger stops further charging the battery pack, or that during the discharging of the battery pack, the battery pack or power tool monitors that the temperature of the battery pack is too high and to prevent the high temperature from having an impact on the performance or life of the battery pack, the battery pack stops further discharging to the tool. The higher the allowable discharge rate, the higher the power output of the battery pack and the higher the power available to the power tool with which the battery pack is used, and accordingly the higher the power output of the power tool and the higher the efficiency. Likewise, the higher the charge rate allowed by the battery pack, the shorter the time it takes for the battery pack to be fully charged, saving the user a great deal of waiting time. With a high power output, a short waiting time for charging and the ability to work continuously, such battery packs solve the long-standing problem of power anxiety in the power tool sector and are easily and widely appreciated by users.

The temperature characteristics of the battery pack at different charge rate and discharge rate are described below in conjunction with FIGS. 21 to 30. In at least one embodiment, the battery pack is temperature tested according to the following test conditions and the temperature variation profile during the test is recorded and displayed in FIGS. 21-30. In these figures, the horizontal coordinates indicate time and the vertical coordinates indicate temperature. Where the solid line is the temperature of the first test point and the dashed line is the temperature of the second test point.

The test conditions include a test ambient temperature of approximately 25° C., e.g. 25° C.±3° C., or 20° C.±3° C., or 30° C.±3° C. In each of the following tests, the temperature of the test starting point can be used to determine which of the above temperature ranges the test environment temperature falls into. No fan to cool the battery pack while it is being charged. Two test points are arranged inside the battery pack and the battery pack is subsequently charged or discharged at a fixed rate. During the charging process, the charging current, voltage and temperature of the battery pack are monitored. When the charging current is less than or equal to the preset current value, the charging process is stopped. The temperature rise of the battery pack during charging is obtained by comparing the temperature at the start of charging with the temperature at the end of charging. The preset current value is greater than or equal to the current value corresponding to the 1 C charge rate. During the discharge process, the voltage and temperature of the battery pack are monitored. When the voltage of the battery pack is less than or equal to the preset voltage value, the discharge process is stopped. The preset voltage value is greater than or equal to 2.5V per battery cell. The temperature rise of the pack during discharge is obtained by comparing the temperature at the start of discharge with the temperature at the end of discharge.

Figure 21:
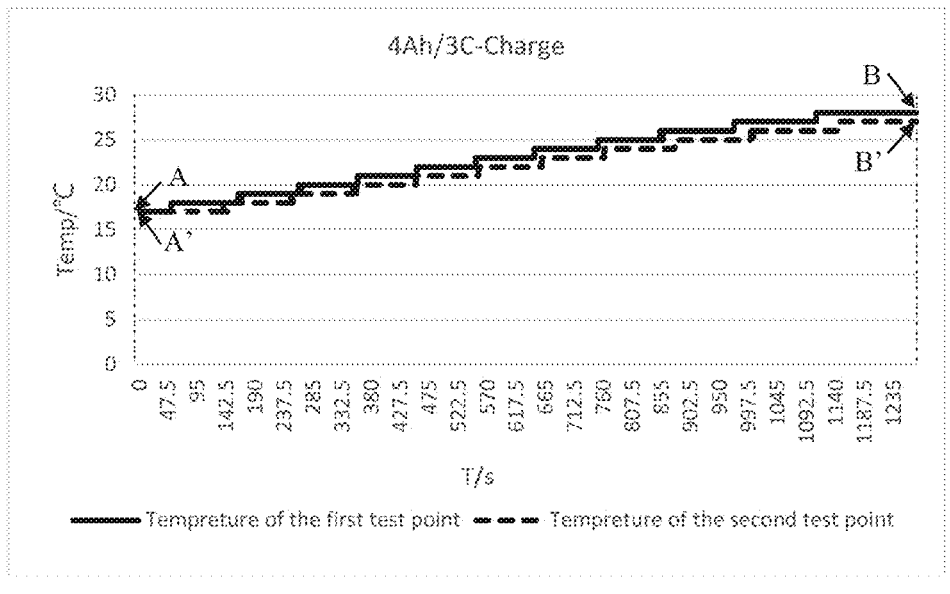
FIG. 21 is a chart illustrating how a temperature of a 4 Ah battery pack changes with charging time when the battery pack performs a single charge cycle at a charge rate of 3 C according to an embodiment of this present disclosure.

In at least one embodiment, the battery pack includes 15 battery cells connected in series with each other, each with a capacity of 4 Ah. The battery pack is charged at a 3 C charge rate according to the aforementioned test conditions, and the data curve of the temperature variation with time is obtained as shown in FIG. 21. According to this test curve, it can be seen that the temperature of the battery pack increases with time throughout the charging process. The temperature change reflected by the solid line shows that the temperature at point A at the start of the test is 17° C. and the temperature at point B at the end of the test is 28° C. The temperature rise at the first test point of the battery pack is 11° C. during the process of charging at 3 C charge rate. The temperature change reflected by the dashed line shows that the temperature at point A' at the start of the test is 17° C. and the temperature at point B' at the end of the test is 27° C. The temperature rise at the second test point of the battery pack is 10° C. during the charging process at 3 C charge rate.

Figure 22:
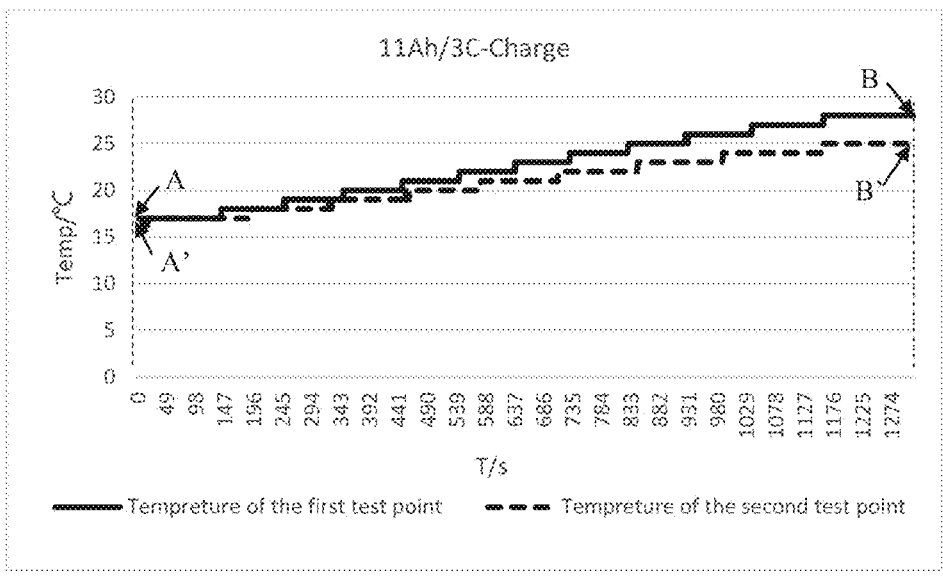
FIG. 22 is a chart illustrating how a temperature of a 11 Ah battery pack changes with charging time when the battery pack performs a single charge cycle at a charge rate of 3 C according to an embodiment of this present disclosure.

In at least one embodiment, the battery pack includes 15 cells connected in series with each other, each with a capacity of 11 Ah. The battery pack is charged at a 3 C charge rate according to the aforementioned test conditions, and the data curve of temperature variation with time is shown in FIG. 22. According to this test curve, it can be seen that the temperature of the battery pack increases with time throughout the charging process. The temperature change reflected by the solid line shows that the temperature at point A at the start of the test is 17° C. and the temperature at point B at the end of the test is 28° C. The temperature rise at the first test point of the battery pack is 11° C. during the process of charging at 3 C charge rate. The temperature change reflected by the dashed line shows that the temperature at point A' at the start of the test is 17° C. and the temperature at point B' at the end of the test is 25° C. The temperature rise at the second test point of the battery pack is 8° C. during the charging process at 3 C charge rate.

According to the aforementioned temperature test results of the battery pack at 3 C charge rate, the temperature rise of the battery pack at the four test points are 11° C., 10° C., 11° C. and 8° C. The minimum temperature rise is 8° C. and the maximum temperature rise is 11° C. Therefore, the temperature rise of the battery pack at 3 C charge rate ranges from 8° C. to 11° C. Considering that there is a ±3° C. error in the test, the temperature rise of the battery pack ranges from 5° C. to 14° C. In other words, the temperature rise of the battery pack does not exceed 14° C. when charged at 3 C charge rate.

According to the aforementioned temperature test results of the battery pack at the 3 C charge rate, the temperature rise at the two test points of the battery pack is 11° C. and 10° C. respectively when the capacity of the battery cells in the battery pack is 4 Ah. The temperature rise at the two test points is 11° C. and 8° C. respectively when the capacity of the battery cells in the battery pack is 11 Ah. It can be seen that the there is a difference in the temperature rise of the battery packs depending on the capacity of the battery cells, with the difference ranging from 0° C. to 2° C. at 3 C charge rate, which is negligible as the difference is small. The temperature rise of a battery pack with a small capacity battery cell is slightly higher than that of a battery pack with a large capacity battery cell.

Figure 23:
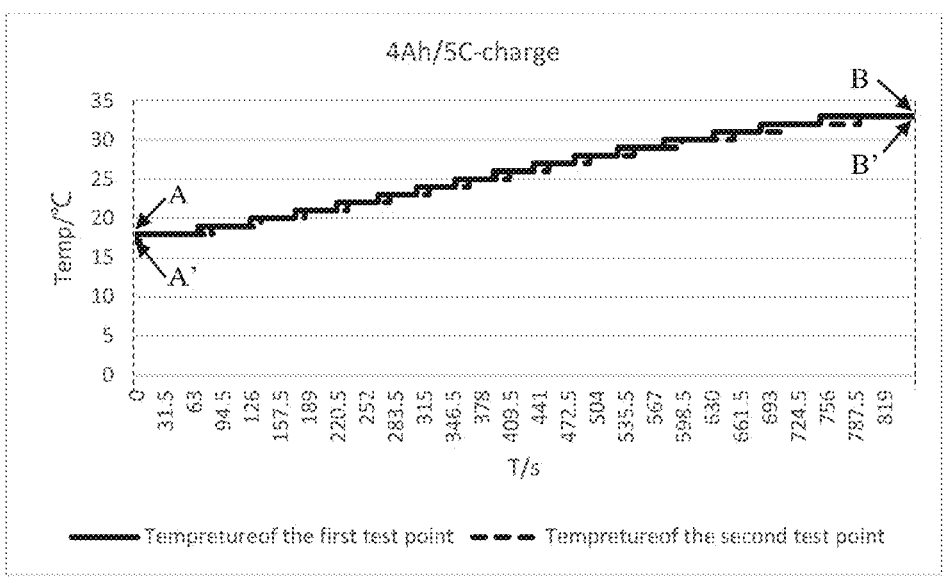
FIG. 23 is a chart illustrating how a temperature of a 4 Ah battery pack changes with charging time when the battery pack performs a single charge cycle at a charge rate of 5 C according to an embodiment of this present disclosure.

In at least one embodiment, the battery pack includes 15 battery cells connected in series with each other, each with a capacity of 4 Ah. The battery pack is charged at a 5 C charge rate according to the aforementioned test conditions, and the data curve of the temperature variation with time is obtained as shown in FIG. 23. According to this test curve, it can be seen that the temperature of the battery pack increases with time throughout the charging process. The temperature change reflected by the solid line shows that the temperature at point A at the start of the test is 18° C. and the temperature at point B at the end of the test is 33° C. The temperature rise at the first test point of the battery pack is 15° C. during the process of charging at 5 C charge rate. The temperature change reflected by the dashed line shows that the temperature at point A' at the start of the test is 17° C. and the temperature at point B' at the end of the test is 33° C. The temperature rise at the second test point of the battery pack is 16° C. during the charging process at 5 C charge rate.

Figure 24:
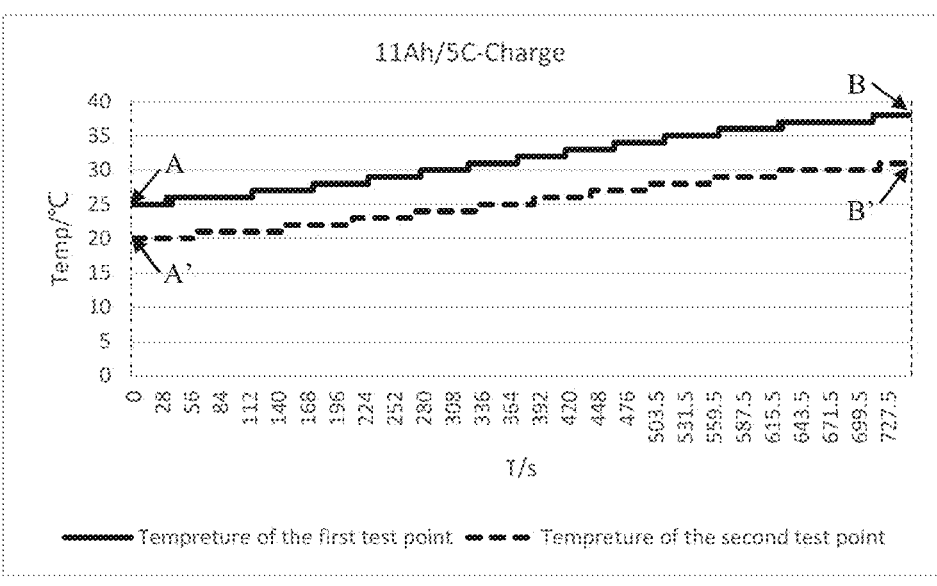
FIG. 24 is a chart illustrating how a temperature of a 11 Ah battery pack changes with charging time when the battery pack performs a single charge cycle at a charge rate of 5 C according to an embodiment of this present disclosure.

In at least one embodiment, the battery pack includes 15 battery cells connected in series with each other, each with a capacity of 11 Ah. The battery pack is charged at a 5 C charge rate according to the aforementioned test conditions, and the data curve of the temperature variation with time is obtained as shown in FIG. 24. According to this test curve, it can be seen that the temperature of the battery pack increases with time throughout the charging process. The temperature change reflected by the solid line shows that the temperature at point A at the start of the test is 25° C. and the temperature at point B at the end of the test is 38° C. The temperature rise at the first test point of the battery pack is 13° C. during the process of charging at 5 C charge rate. The temperature change reflected by the dashed line shows that the temperature at point A' at the start of the test is 20° C. and the temperature at point B' at the end of the test is 31° C. The temperature rise at the second test point of the battery pack is 11° C. during the charging process at 5 C charge rate.

According to the aforementioned temperature test results of the battery pack at 5 C charge rate, the temperature rise of the battery pack at the four test points are 15° C., 16° C., 13° C. and 11° C. The minimum temperature rise is 11° C. and the maximum temperature rise is 16° C. Therefore, the temperature rise of the battery pack at 5 C charge rate ranges from 11° C. to 16° C. Considering that there is a ±3° C. error in the test, the temperature rise of the battery pack ranges from 8° C. to 19° C. In other words, the temperature rise of the battery pack does not exceed 19° C. when charged at 5 C charge rate.

According to the aforementioned temperature test results of the battery pack at the 5 C charge rate, the temperature rise at the two test points of the battery pack is 15° C. and 16° C. respectively when the capacity of the battery cells in the battery pack is 4 Ah. The temperature rise at the two test points of the battery pack is 13° C. and 11° C. respectively when the capacity of the battery cells in the battery pack is 11 Ah. It can be seen that there is a difference in the temperature rise of the battery packs depending on the capacity of the battery cells, with the difference ranging from 2° C. to 5° C. at 5 C charge rate. The temperature rise of a battery pack with a small capacity battery cell is higher than that of a battery pack with a large capacity battery cell.

Figure 25:
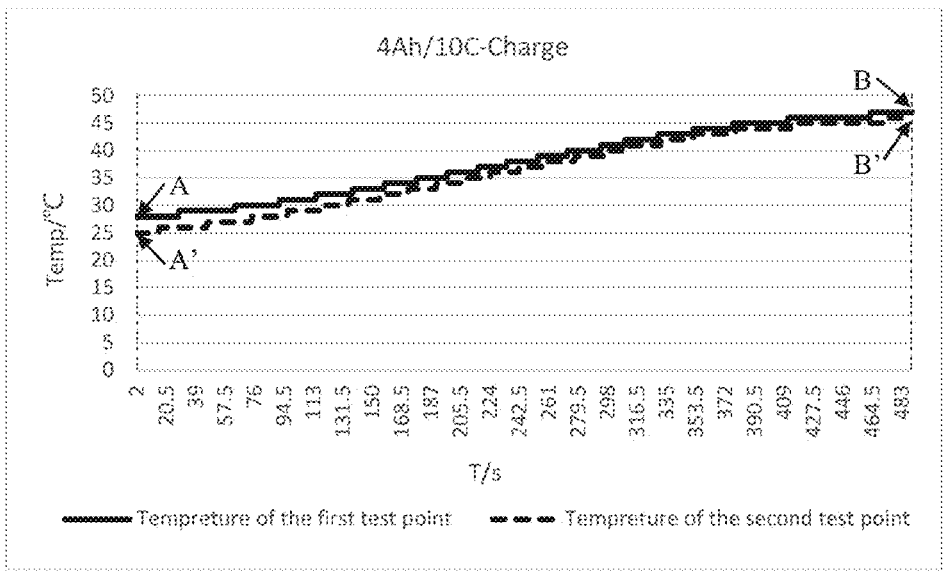
FIG. 25 is a chart illustrating how a temperature of a 4 Ah battery pack changes with charging time when the battery pack performs a single charge cycle at a charge rate of 10 C according to an embodiment of this present disclosure.

In at least one embodiment, the battery pack includes 15 battery cells connected in series with each other, each with a capacity of 4 Ah. The battery pack is charged at a 10 C charge rate according to the aforementioned test conditions, and the data curve of the temperature variation with time is obtained as shown in FIG. 25. According to this test curve, it can be seen that the temperature of the battery pack increases with time throughout the charging process. The temperature change reflected by the solid line shows that the temperature at point A at the start of the test is 28° C. and the temperature at point B at the end of the test is 47° C. The temperature rise at the first test point of the battery pack is 19° C. during the process of charging at 1° C. charge rate. The temperature change reflected by the dashed line shows that the temperature at point A' at the start of the test is 25° C. and the temperature at point B' at the end of the test is 46° C. The temperature rise at the second test point of the battery pack is 21° C. during the charging process at 1° C. charge rate.

Figure 26:
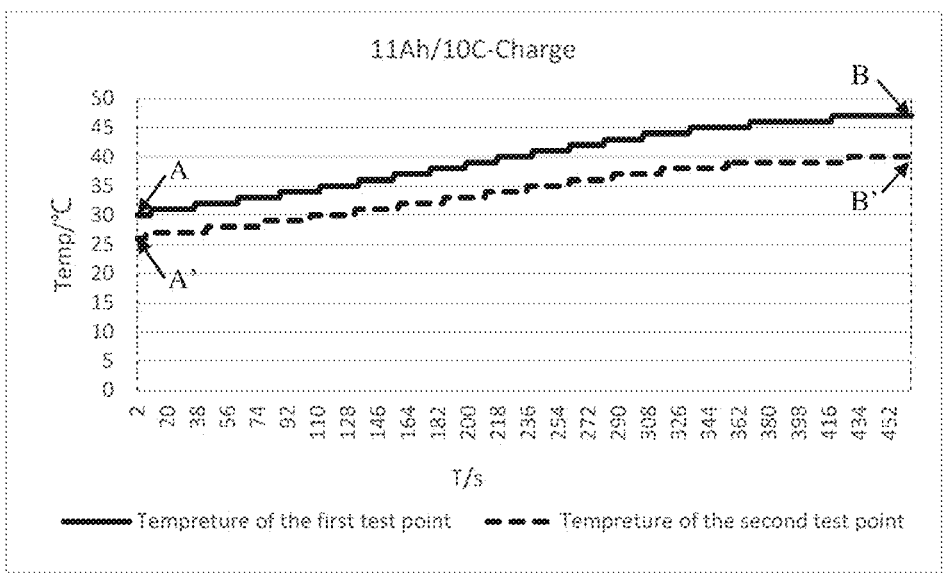
FIG. 26 is a chart illustrating how a temperature of a 11 Ah battery pack changes with charging time when the battery pack performs a single charge cycle at a charge rate of 10 C according to an embodiment of this present disclosure.

In at least one embodiment, the battery pack includes 15 battery cells connected in series with each other, each with a capacity of 11 Ah. The battery pack is charged at a 10 C charge rate according to the aforementioned test conditions, and the data curve of the temperature variation with time is obtained as shown in FIG. 26. According to this test curve, it can be seen that the temperature of the battery pack increases with time throughout the charging process. The temperature change reflected by the solid line shows that the temperature at point A at the start of the test is 36° C. and the temperature at point B at the end of the test is 47° C. The temperature rise at the first test point of the battery pack is 11° C. during the process of charging at 1° C. charge rate. The temperature change reflected by the dashed line shows that the temperature at point A' at the start of the test is 26° C. and he temperature at point B' at the end of the test is 40° C. The temperature rise at the second test point of the battery pack is 14° C. during the charging process at 1° C. charge rate.

According to the aforementioned temperature test results of the battery pack at 1° C. charge rate, the temperature rise of the battery pack at the four test points are 19° C., 21° C., 11° C. and 14° C. The minimum temperature rise is 11° C. and the maximum temperature rise is 21° C. Therefore, the temperature rise of the battery pack at 1° C. charge rate ranges from 11° C. to 21° C. Considering that there is a ±3° C. error in the test, the temperature rise of the battery pack ranges from 8° C. to 24° C. In other words, the temperature rise of the battery pack does not exceed 24° C. when charged at 1° C. charge rate.

According to the aforementioned temperature test results of the battery pack at the 10 C charge rate, the temperature rise at the two test points of the battery pack is 19° C. and 21° C. respectively when the capacity of the battery cells in the battery pack is 4 Ah. The temperature rise at the two test points of the battery pack is 11° C. and 14° C. respectively when the capacity of the battery cells in the battery pack is 11 Ah. It can be seen that there is a difference in the temperature rise of the battery packs depending on the capacity of the battery cells, with the difference ranging from 7° C. to 8° C. at 1° C. charge rate. The temperature rise of a battery pack with a small capacity battery cell is higher than that of a battery pack with a large capacity battery cell.

According to the aforementioned test results in FIGS. 21 to 26, the temperature rise of the battery pack made up of battery cells with large-capacity differs from that of the battery pack made up of battery cells with small-capacity at the same charge rate. The temperature rise of the battery pack made up of battery cells with large-capacity is lower than that of the battery pack made up of battery cells with small-capacity. In addition, the difference in temperature rise between the two battery packs increases as the charge rate increases.

Figure 27:
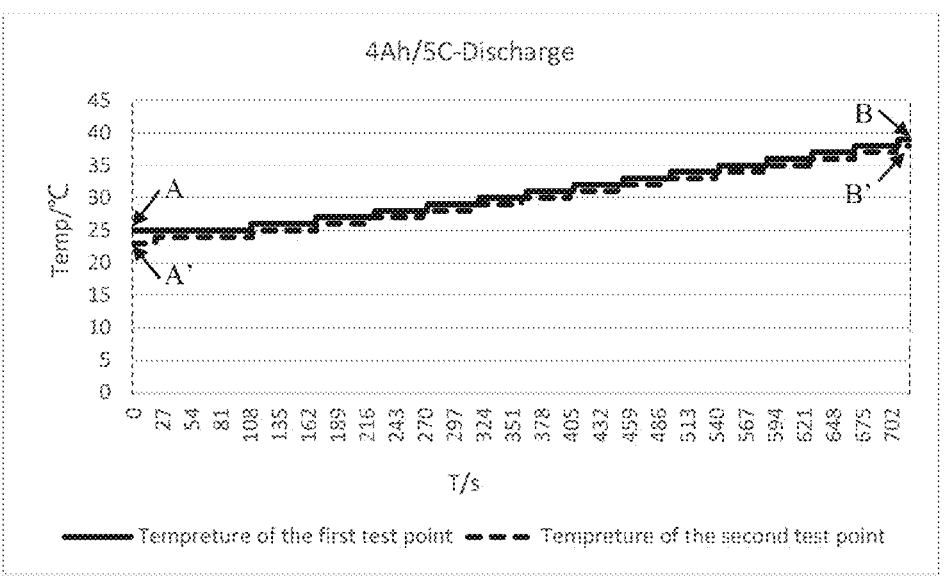
FIG. 27 is a chart illustrating how a temperature of a 4 Ah battery pack changes with discharging time when the battery pack performs a single discharge cycle at a discharge rate of 5 C according to an embodiment of this present disclosure.

In at least one embodiment, the battery pack includes 15 battery cells connected in series with each other, each with a capacity of 4 Ah. The battery pack is discharged at a 5 C discharge rate according to the aforementioned test conditions, and the data curve of the temperature variation with time is obtained as shown in FIG. 27. According to this test curve, it can be seen that the temperature of the battery pack increases with time throughout the discharging process. The temperature change reflected by the solid line shows that the temperature at point A at the start of the test is 25° C. and the temperature at point B at the end of the test is 39° C. The temperature rise at the first test point of the battery pack is 14° C. during the process of discharging at 5 C discharge rate. The temperature change reflected by the dashed line shows that the temperature at point A' at the start of the test is 23° C. and the temperature at point B' at the end of the test is 38° C. The temperature rise at the second test point of the battery pack is 15° C. during the discharging process at 5 C discharge rate.

Figure 28:
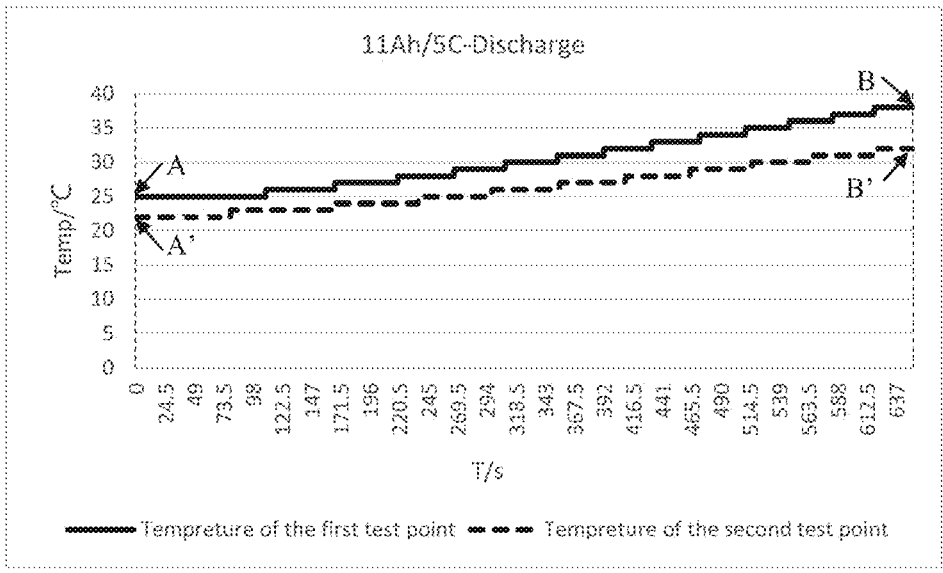
FIG. 28 is a chart illustrating how a temperature of a 11 Ah battery pack changes with discharging time when the battery pack performs a single discharge cycle at a discharge rate of 5 C according to an embodiment of this present disclosure.

In at least one embodiment, the battery pack includes 15 battery cells connected in series with each other, each with a capacity of 11 Ah. The battery pack is discharged at a 5 C discharge rate according to the aforementioned test conditions, and the data curve of the temperature variation with time is obtained as shown in FIG. 28. According to this test curve, it can be seen that the temperature of the battery pack increases with time throughout the discharging process. The temperature change reflected by the solid line shows that the temperature at point A at the start of the test is 25° C. and the temperature at point B at the end of the test is 38° C. The temperature rise at the first test point of the battery pack is 13° C. during the process of discharging at 5 C discharge rate. The temperature change reflected by the dashed line shows that the temperature at point A' at the start of the test is 22° C. and the temperature at point B' at the end of the test is 32° C. The temperature rise at the second test point of the battery pack is 10° C. during the discharging process at 5 C discharge rate.

According to the aforementioned temperature test results of the battery pack at 5 C discharge rate, the temperature rise of the battery pack at the four test points are 14° C., 15° C., 13° C. and 10° C. The minimum temperature rise is 10° C. and the maximum temperature rise is 15° C. Therefore, the temperature rise of the battery pack at 5 C discharge rate ranges from 10° C. to 15° C. Considering that there is a ±3° C. error in the test, the temperature rise of the battery pack ranges from 7° C. to 18° C. In other words, the temperature rise of the battery pack does not exceed 18° C. when discharged at 5 C discharge rate.

According to the aforementioned temperature test results of the battery pack at the 5 C discharge rate, the temperature rise at the two test points of the battery pack is 14° C. and 15° C. respectively when the capacity of the battery cells in the battery pack is 4 Ah. The temperature rise at the two test points of the battery pack is 13° C. and 10° C. respectively when the capacity of the battery cells in the battery pack is 11 Ah. It can be seen that there is a difference in the temperature rise of the battery packs depending on the capacity of the battery cells, with the difference ranging from 1° C. to 5° C. at 5 C discharge rate. The temperature rise of a battery pack with a large capacity battery cell is lower than that of a battery pack with a small capacity battery cell.

Figure 29:
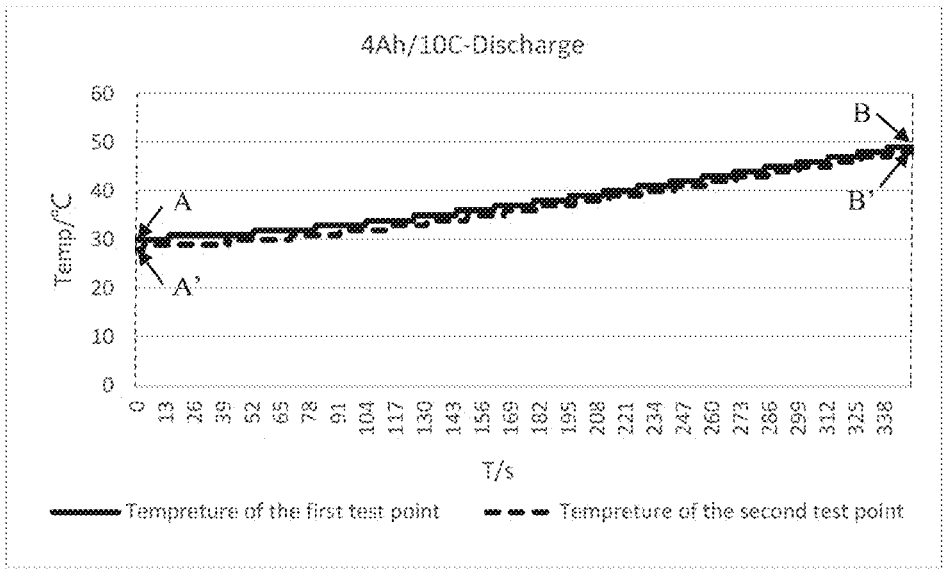
FIG. 29 is a chart illustrating how a temperature of a 4 Ah battery pack changes with discharging time when the battery pack performs a single discharge cycle at a discharge rate of 10 C according to an embodiment of this present disclosure.

In at least one embodiment, the battery pack includes 15 battery cells connected in series with each other, each with a capacity of 4 Ah. The battery pack is discharged at a 10 C discharge rate according to the aforementioned test conditions, and the data curve of the temperature variation with time is obtained as shown in FIG. 29. According to this test curve, it can be seen that the temperature of the battery pack increases with time throughout the discharging process. The temperature change reflected by the solid line shows that the temperature at point A at the start of the test is 30° C. and the temperature at point B at the end of the test is 49° C. The temperature rise at the first test point of the battery pack is 19° C. during the process of discharging at 5 C discharge rate. The temperature change reflected by the dashed line shows that the temperature at point A' at the start of the test is 28° C. and the temperature at point B' at the end of the test is 48° C. The temperature rise at the second test point of the battery pack is 20° C. during the discharging process at 5 C discharge rate.

Figure 30:
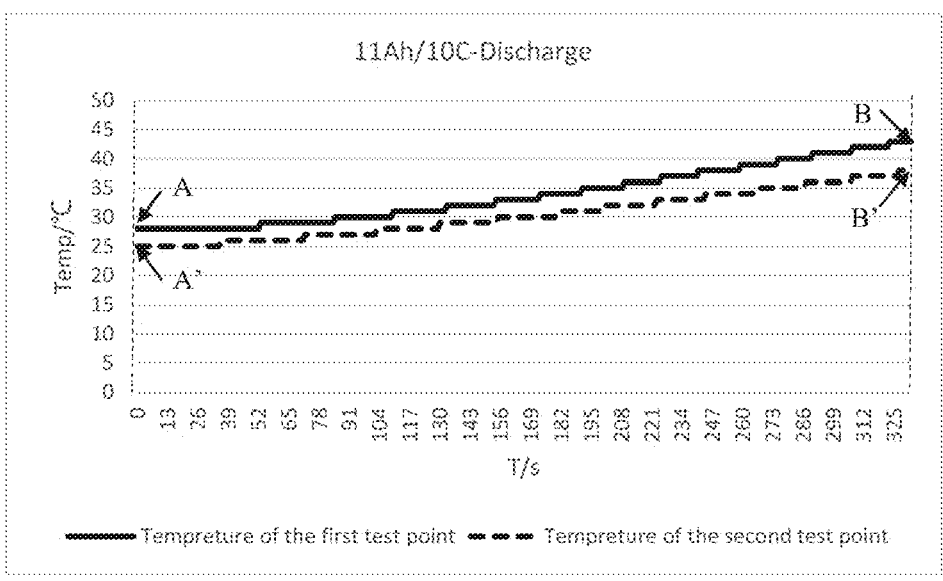
FIG. 30 is a chart illustrating how a temperature of a 11 Ah battery pack changes with discharging time when the battery pack performs a single discharge cycle at a discharge rate of 10 C according to an embodiment of this present disclosure.

In at least one embodiment, the battery pack includes 15 battery cells connected in series with each other, each with a capacity of 11 Ah. The battery pack is discharged at a 10 C discharge rate according to the aforementioned test conditions, and the data curve of the temperature variation with time is obtained as shown in FIG. 30. According to this test curve, it can be seen that the temperature of the battery pack increases with time throughout the discharging process. The temperature change reflected by the solid line shows that the temperature at point A at the start of the test is 28° C. and the temperature at point B at the end of the test is 43° C. The temperature rise at the first test point of the battery pack is 15° C. during the process of discharging at 1° C. discharge rate. The temperature change reflected by the dashed line shows that the temperature at point A' at the start of the test is 25° C. and the temperature at point B' at the end of the test is 38° C. The temperature rise at the second test point of the battery pack is 13° C. during the discharging process at 1° C. discharge rate.

According to the aforementioned temperature test results of the battery pack at 1° C. discharge rate, the temperature rise of the battery pack at the four test points are 19° C., 20° C., 15° C. and 13° C. The minimum temperature rise is 13° C. and the maximum temperature rise is 20° C. Therefore, the temperature rise of the battery pack at 1° C. discharge rate ranges from 13° C. to 20° C. Considering that there is a ±3° C. error in the test, the temperature rise of the battery pack ranges from 10° C. to 23° C. In other words, the temperature rise of the battery pack does not exceed 23° C. when discharged at 1° C. discharge rate.

According to the aforementioned temperature test results of the battery pack at the 10 C discharge rate, the temperature rise at the two test points of the battery pack is 19° C. and 20° C. respectively when the capacity of the battery cells in the battery pack is 4 Ah. The temperature rise at the two test points of the battery pack is 15° C. and 13° C. respectively when the capacity of the battery cells in the battery pack is 11 Ah. It can be seen that there is a difference in the temperature rise of the battery packs depending on the capacity of the battery cells, with the difference ranging from 4° C. to 7° C. at 1° C. discharge rate. The temperature rise of a battery pack with a large capacity battery cell is lower than that of a battery pack with a small capacity battery cell.

According to the aforementioned test results in FIGS. 27 to 30, the temperature rise of the battery pack made up of battery cells with large-capacity differs from that of the battery pack made up of battery cells with small-capacity at the same discharge rate. The temperature rise of the battery pack made up of battery cells with large-capacity is lower than that of the battery pack made up of battery cells with small-capacity. In addition, the difference in temperature rise between the two battery packs increases as the discharge rate increases.

In at least one embodiment, the battery pack includes at least one battery cell. The battery pack is charged at a 3 C rate and discharged at a 10 C rate, and the temperature of the battery pack is obtained during charging and discharging for a temperature test. The test conditions include a test ambient temperature of approximately 25° C., e.g. 25° C.±3° C., or 20° C.±3° C., or 30° C.±3° C. In each of the following tests, the temperature of the test starting point can be used to determine which of the above temperature ranges the test environment temperature falls into. No fan to cool the battery pack while it is being charged. Two test points are arranged inside the battery pack. The battery pack is first charged at a 3 C rate, then discharged at a 10 C rate, then charged at a 3 C rate, and discharged at a 10 C rate and so on until the temperature of the battery pack reaches the charging protection temperature or discharging protection temperature. The single charge process ends when the charge current is less than the preset current value. The single discharge process ends when the voltage of a single battery cell or the voltage of the entire battery pack is less than a preset voltage value. The preset current value is greater than or equal to the current value corresponding to the 1 C charge rate and the preset voltage value is greater than or equal to 2.5V per battery Cell. The charging protection temperature is 60° C. and the discharging protection temperature is 70° C. During the charging and discharging cycles, the temperatures of the two test points of the battery pack are monitored, resulting in a graph with time as the horizontal axis and temperature as the vertical axis. Where the solid line indicates the temperature at the first test point and the dashed line indicates the temperature at the second test point.

Figure 31:
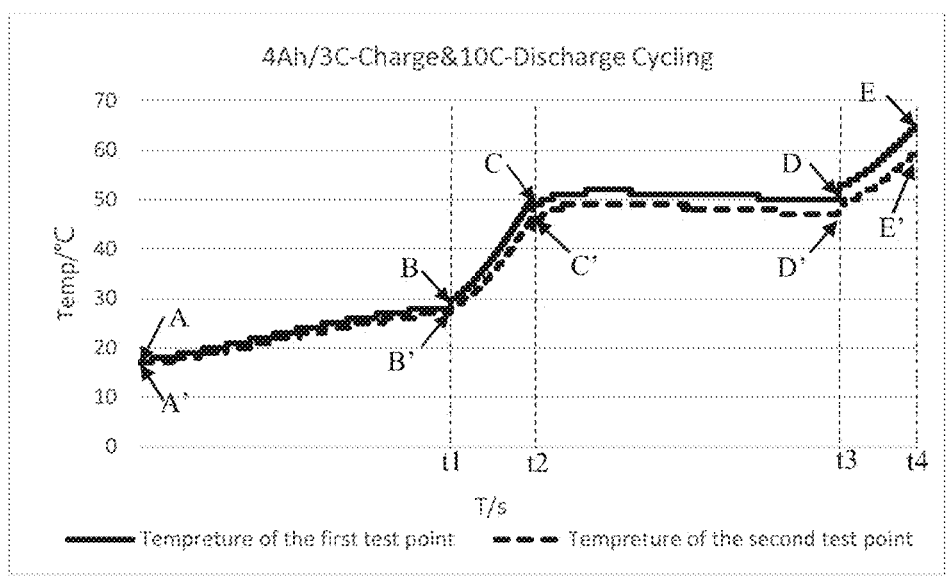
FIG. 31 is a chart illustrating how a temperature of a 4 Ah battery pack changes with charging and discharging time when the battery pack performs charge and discharge cycles at a charge rate of 3 C and a discharge rate of 10 C according to an embodiment of this present disclosure.

In at least one embodiment, the battery pack includes 15 battery cells connected in series, each with a capacity of 4 Ah. The battery pack is tested according to the test conditions described previously. The curve of temperature variation with time obtained is shown in FIG. 31. In FIG. 31, the temperature variation from 0 to t1 phase is for 3 C rate charging, t1 to t2 phase is for 10 C rate discharging, t2 to t3 phase is for 3 C rate charging and t3 to t4 phase is for 10 C rate discharging.

During the 0 to t1 phase, the temperature of point A at start of the solid line is 17° C. and the temperature of point B at end of the solid line is 28° C.; the temperature of point A' at start of the dashed line is 17° C. and the temperature of point B' at end of the dashed line is 27° C. It can be seen that the temperature at both test points did not exceed the discharging protection temperature at the end of the 3 C rate charge process. Therefore, there is no need to wait for the temperature to drop after the end of the charge process and the next discharge process can be performed immediately.

During the t1 to t2 phase, the temperature of point B at start of the solid line is 28° C. and the temperature of point C at end of the solid line is 50° C.; the temperature of point B' at start of the dashed line is 27° C. and the temperature of point C' at end of the dashed line is 46° C. It can be seen that the temperature at both test points did not exceed the charging protection temperature at the end of the 10 C rate discharge process. Therefore, there is no need to wait for the temperature to drop after the end of the discharge process and the next charge process can be performed immediately.

During the t2 to t3 phase, the temperature of point C, at start of the solid line is 50° C. and the temperature of point D at end of the solid line is 50° C.; the temperature of point C' at start of the dashed line is 46° C. and the temperature of point D' at end of the dashed line is 47° C. It can be seen that the temperature at both test points did not exceed the discharging protection temperature at the end of the 3 C rate charge process. Therefore, there is no need to wait for the temperature to drop after the end of the charge process and the next discharge process can be performed immediately.

During the t3 to t4 phase, the temperature of point D at start of the solid line is 50° C. and the temperature of point E at end of the solid line is 65° C.; the temperature of point D' at start of the dashed line is 47° C. and the temperature of point E' at end of the dashed line is 59° C. It can be seen that the temperature at both test points did not exceed the charging protection temperature at the end of the 10 C rate discharge process. However, as the temperature is close to the charging protection temperature, performing the next charge process immediately will cause the battery pack to stop charging due to the overheating and triggering the charge temperature protection. Therefore, it is necessary to wait for the temperature to drop before the next charging process can be carried out.

Figure 32:
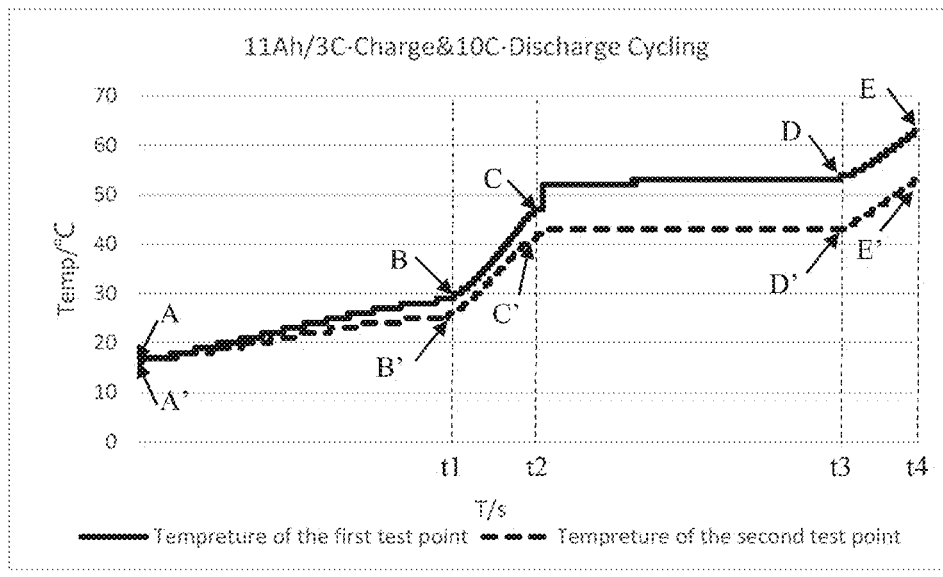
FIG. 32 is a chart illustrating how a temperature of a 11 Ah battery pack changes with charging and discharging time when the battery pack performs charge and discharge cycles at a charge rate of 3 C and a discharge rate of 10 C according to an embodiment of this present disclosure.

In at least one embodiment, the battery pack includes 15 battery cells connected in series, each with a capacity of 11 Ah. The battery pack is tested according to the test conditions described previously. The curve of temperature variation with time obtained is shown in FIG. 32. In FIG. 32, the temperature variation from 0 to t1 phase is for 3 C rate charging, t1 to t2 phase is for 10 C rate discharging, t2 to t3 phase is for 3 C rate charging and t3 to t4 phase is for 10 C rate discharging.

During the 0 to t1 phase, the temperature of point A at start of the solid line is 17° C. and the temperature of point B at end of the solid line is 28° C.; the temperature of point A' at start of the dashed line is 17° C. and the temperature of point B' at end of the dashed line is 25° C. It can be seen that the temperature at both test points did not exceed the discharging protection temperature at the end of the 3 C rate charge process. Therefore, there is no need to wait for the temperature to drop after the end of the charge process and the next discharge process can be performed immediately.

During the t1 to t2 phase, the temperature of point B at start of the solid line is 28° C. and the temperature of point C at end of the solid line is 47° C.; the temperature of point B' at start of the dashed line is 25° C. and the temperature of point C' at end of the dashed line is 42° C. It can be seen that the temperature at both test points did not exceed the charging protection temperature at the end of the 10 C rate discharge process. Therefore, there is no need to wait for the temperature to drop after the end of the discharge process and the next charge process can be performed immediately.

During the t2 to t3 phase, the temperature of point C, at start of the solid line is 47° C. and the temperature of point D at end of the solid line is 53° C.; the temperature of point C' at start of the dashed line is 42° C. and the temperature of point D' at end of the dashed line is 43° C. It can be seen that the temperature at both test points did not exceed the discharging protection temperature at the end of the 3 C rate charge process. Therefore, there is no need to wait for the temperature to drop after the end of the charge process and the next discharge process can be performed immediately.

During the t3 to t4 phase, the temperature of point D at start of the solid line is 53° C. and the temperature of point E at end of the solid line is 63° C.; the temperature of point D' at start of the dashed line is 43° C. and the temperature of point E' at end of the dashed line is 53° C. It can be seen that the temperature at both test points did not exceed the charging protection temperature at the end of the 10 C rate discharge process. However, as the temperature is close to the charging protection temperature, performing the next charge process immediately will cause the battery pack to stop charging due to the overheating and triggering the charge temperature protection. Therefore, it is necessary to wait for the temperature to drop before the next charging process can be carried out.

According to the test results in FIG. 31 and FIG. 32, it can be seen that regardless of the capacity of the cells in the battery pack, the temperature of the battery pack at the end of the first charge process does not exceed the discharging protection temperature; at the end of the first discharge process, the temperature of the battery pack does not exceed the charging protection temperature; at the end of the second charge process, the temperature of the battery pack does not exceed the discharging protection temperature; at the end of the second discharge process, the temperature of the battery pack does not exceed the charging protection temperature, but the temperature is close to the charging protection temperature and it is necessary to wait for the temperature to drop before the next charge process can be performed. The difference in capacity of the battery cells in the battery packs only leads to a slight difference in the value of the temperature rise, where the temperature rise of a battery pack with large capacity battery cells is lower than that of a battery pack with small capacity battery cells.

When operating at the above charge rate and discharge rate, the battery pack can perform two consecutive charging-discharging cycles, where one charging-discharging cycle includes a charging process and a discharging process. This feature allows the battery pack to be charged as soon as the discharging process is completed when discharging at large rates, i.e. when the battery pack is providing a high power output to the power tool, without having to wait for the temperature to drop, shortening the waiting time and enhancing the user experience.

The battery pack in the foregoing embodiments has large charge rates, large discharge rates and low temperature rises, allowing the battery pack to be charged and discharged continuously at large rates and without waiting between charging and discharging, thus allowing the entire charging-discharging cycle of the battery pack to be shortened. In some embodiments, the battery pack has a charge rate and discharge rate of 5 C to 1° C. and a total charge and discharge cycle time of 12 minutes to 30 minutes.

In at least one embodiment, the battery pack includes at least one battery cell. When the battery pack is charged at a 5 C charge rate, the charge rate may remain at 5 C when the current capacity of the battery pack reaches more than 80% of the rated capacity. For example, the charge rate may be maintained at 5 C when the current capacity of the battery pack reaches between 80% and 90% of the rated capacity.

Figure 33:
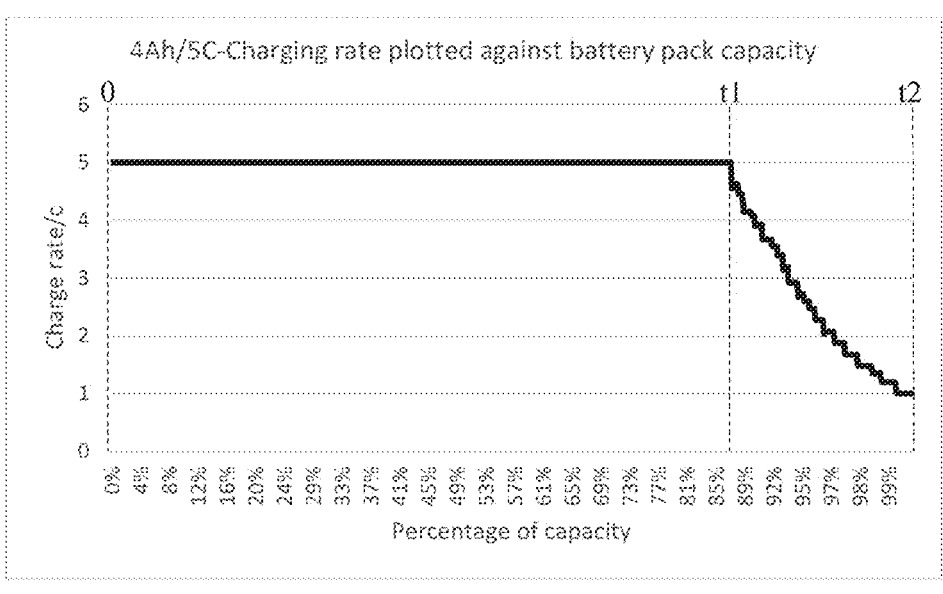
FIG. 33 is a chart illustrating how a charge rate changes with SOC of a 4 Ah battery pack when the battery pack performs a single charge cycle at a charge rate of 5 C according to an embodiment of the present disclosure.

In at least one embodiment, the battery pack includes 15 battery cells connected in series, each with a capacity of 4 Ah. The battery pack is charged at a 5 C charge rate and the charging current and capacity of the battery pack are monitored during charging to form the curve in FIG. 33. In FIG. 33, the horizontal coordinate is the current capacity of the battery pack as a percentage of the rated capacity (SOC) and the vertical coordinate is the charging current of the battery pack. During the 0 to t1 phase, the charging current is 20 A±0.5 A, which corresponds to a charge rate of 5 C. During the t1 to t2 phase, the charging current is gradually reduced until it is less than 4 A, which corresponds to a charge rate of 1 C, at which point charging stops. Charging ends at the moment t2, when the current capacity of the battery pack is 100% of the rated capacity. The charge current drops from the moment t1, at which point the battery pack's current capacity is 87% of the rated capacity. This means that the charge rate of the battery pack can still be maintained at 5 C when the battery pack's current capacity is 87% of its rated capacity.

Figure 34:
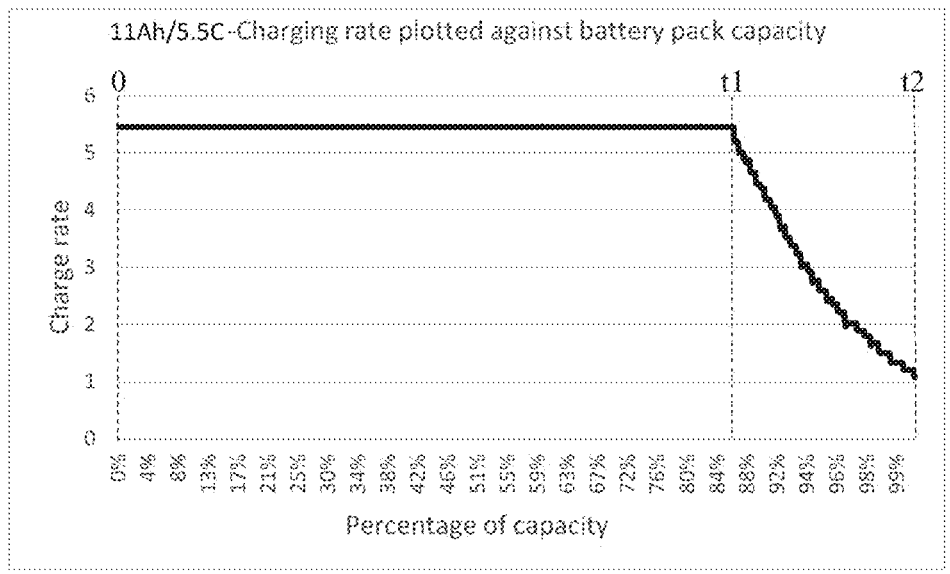
FIG. 34 is a chart illustrating how a charge rate changes with SOC of a 11 Ah battery pack when the battery pack performs a single charge cycle at a charge rate of 5.5 C according to an embodiment of the present disclosure.

In at least one embodiment, the battery pack includes 15 battery cells connected in series, each with a capacity of 11 Ah. The battery pack is charged at a 5.5 C charge rate and the charging current and capacity of the battery pack are monitored during charging to form the curve in FIG. 34. In FIG. 34, the horizontal coordinate is the current capacity of the battery pack as a percentage of the rated capacity (SOC) and the vertical coordinate is the charging current of the battery pack. During the 0 to t1 phase, the charging current is 60 A±0.5 A, which corresponds to a charge rate of 5.5 C. During the t1 to t2 phase, the charging current is gradually reduced until it is less than 11 A, which corresponds to a charge rate of 1 C, at which point charging stops. Charging ends at the moment t2, when the current capacity of the battery pack is 100% of the rated capacity. The charge current drops from the moment t1, at which point the battery pack's current capacity is 87% of the rated capacity. This means that the charge rate of the battery pack can still be maintained at 5.5 C when the battery pack's current capacity is 87% of its rated capacity.

Figure 35:
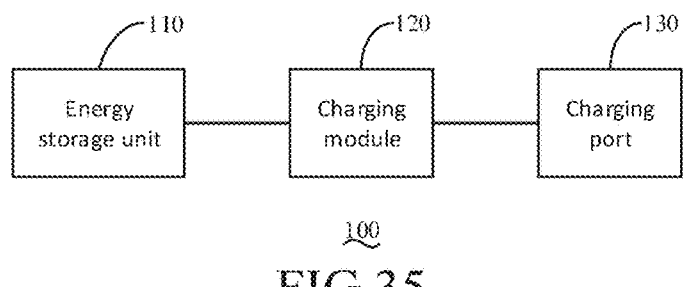
FIG. 35 is a circuit block diagram of a mobile charging apparatus according to an embodiment of the present disclosure.

In at least one embodiment, the mobile charging apparatus includes an energy storage unit 110, a charging module 120, and charging port 130, as shown in FIG. 35. The energy storage unit 110 is used to store direct current electricity. The battery pack is removably connected to the charging port 130. The charging module 120 electrically connects the energy storage unit 110 and the charging ports 130, converting the energy of the energy storage unit 110 into energy suitable for charging the battery pack and outputting it to the charging ports 130. The mobile charging apparatus includes the energy storage unit 110, making it possible to follow the user to any place to charge the battery pack. In one use scenario, the mobile charging apparatus may be provided with wheels that the user can carry by pushing the wheels when carrying the mobile charging apparatus. In another use scenario, the mobile charging apparatus can be mounted on a car, which drives the mobile charging apparatus to different workplaces.

Figure 36:
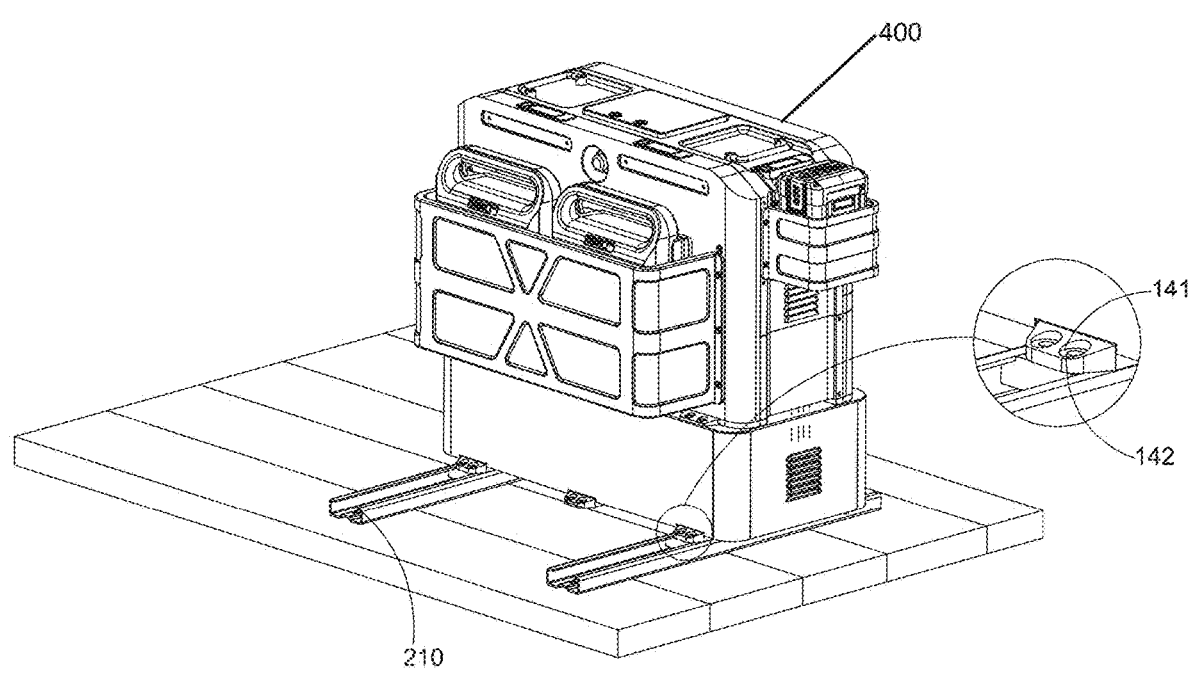
FIG. 36 is an installation diagram of a mobile charging apparatus in a Vehicle according to an embodiment of the present disclosure.

In at least one embodiment, as shown in FIG. 36, the mobile charging apparatus 400 is provided with mounting holes 141 in the housing and mounting rails 210 in the car to secure the mobile charging apparatus 400 to the car by means of bolts 142 so that the mobile charging apparatus 400 can be moved with the car. The mobile charging apparatus 400 also includes an anti-theft lock, by which it is secured to the car to avoid being theft.

The number of charging ports can be one, two, or more. Each charging port has a maximum output power of 3 Kw or more. Accordingly, each charging port can provide a charge rate of 5 C or more for the battery pack, enabling the battery pack to be fully charged in a short period of time. For example, the maximum output power of each charging port is 3.6 kw or more. For example, the maximum output power of each charging port is 6 kw or more. For example, the maximum output power of each charging port is 7.2 kw or more. The maximum output power refers to the maximum power output of the charging port in the course of charging the battery pack. In one example, the mobile charging apparatus has only one charging mode and the maximum output power output to one charging port is P1. At this situation, the maximum output power of that charging port is P1. In another example, the mobile charging apparatus has multiple charging modes, in the first charging mode the maximum output power output to a charging port is P1, in the second charging mode the maximum output power output to that charging port is P2 and in the third charging mode the maximum output power output to that charging port is P3. In the condition that the largest value among P1, P2 and P3 is P3, the maximum output power output to that charging port is P3.

In at least one embodiment, an energy system comprising a mobile charging apparatus and a battery pack is provided. The basic composition of the mobile charging apparatus is as described in the previous embodiment. The mobile charging apparatus stores enough energy for a day's work outdoors for a user of a garden power tool. For example, the mobile charging apparatus stores more than 500 Wh of energy. For example, the number of battery packs is one, two, or more. In one example the number of battery packs is an even number, e.g. two, four, six . . . . Divide the even numbered battery packs into two groups A and B. While group A battery packs are discharged for the power tool, group B battery packs are charged by the mobile charging apparatus. Divide the even numbered battery packs into two groups A and B. While battery packs for group A are discharged for the power tool, battery packs for group B are charged by the mobile charging apparatus. The two groups are then rotated so that when group B is discharging the power tool, group A is charged by the mobile charging apparatus, thus providing uninterrupted power to the power tool.

In at least one embodiment, the mobile charging apparatus has a maximum output power of 3.6 Kw from a single charging port. For example, the battery pack has a capacity of 4 Ah and a rated voltage of 60V and the charging port provides a charge rate of 10 C or more for the battery pack. For example, the battery pack has a capacity of 11 Ah and a rated voltage of 60V, and the charging port provides a charging rate of 5 C or more for the battery pack.

In at least one embodiment, the mobile charging apparatus has a maximum output power of 7.2 Kw for a single charging port. For example, the battery pack has a capacity of 4 Ah and a rated voltage of 60V, and the charging port provides a charge rate of 10 C or more for the battery pack. For example, the battery pack has a capacity of 11 Ah and a rated voltage of 60V and the charging port provides a charging rate of 10 C or more for the battery pack.

In at least one embodiment, the mobile charging apparatus includes a first charging mode and a second charging mode. In the first charging mode, the maximum output power of the single charging ports is the first charging power, and in the second charging mode, the maximum output power of the single charging ports is the second charging power. Wherein the first charging power is less than the second charging power. For example, the ratio of the second charging power to the first charging power is greater than 1.5. For example, the ratio of the second charging power to the first charging power is 2. In this embodiment, the maximum output power of the charging interface is the maximum output power corresponding to the mobile charging apparatus in the second charging mode.

There are a number of solutions to achieve different charging power output to the charging port when the mobile charging apparatus is in different charging modes. In at least one embodiment, the mobile charging apparatus is configured with a first charging module and a second charging module. In the first charging mode, the first charging module operates and outputs charging energy to the charging port, and in the second charging mode, the second charging module operates and outputs charging energy to the charging port. In another embodiment, the mobile charging apparatus is provided with only one charging module. In the first charging mode, the charging module operates in a low power state, outputting a low charging power to the charging port; in the second charging mode, the charging module operates in a high power state, outputting a high charging power to the charging port.

Figure 37:
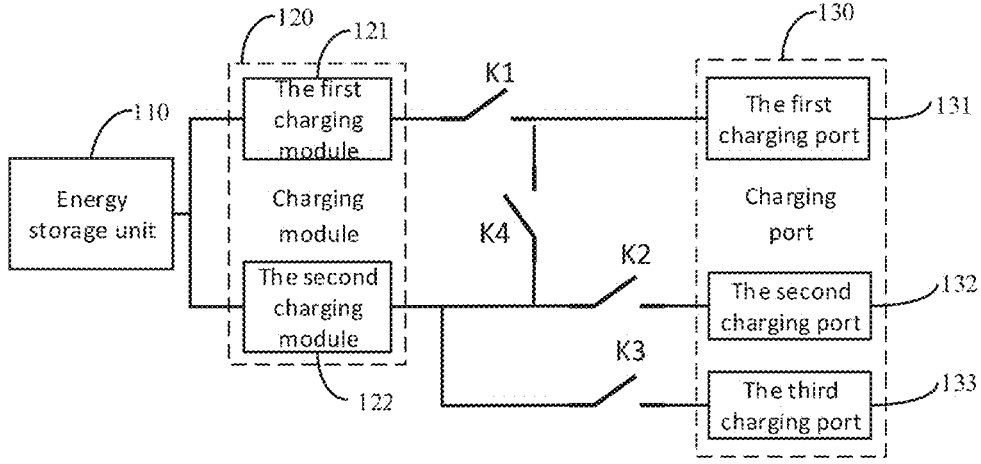
FIG. 37 is a circuit block diagram illustrating how a mobile charging apparatus switches between a first charging mode and a second charging mode according to an embodiment of the present disclosure.

In other embodiments, as shown in FIG. 37, the mobile charging apparatus includes an energy storage unit 110, a charging module 120, and charging ports 130. The charging module 120 includes a first charging module 121 and a second charging module 122. The charging ports 130 include a first charging port 131, a second charging port 132 and a third charging port 133. The mobile charging apparatus has a first charging mode and a second charging mode. The mobile charging apparatus includes four switches, namely switch K1, switch K2, switch K3 and switch K4. When switch K1 and switch K2 are on and switch K3 and switch K4 are off, the first charging module 121 and the second charging module 122 work independently of each other and the mobile charging apparatus is in the first charging mode. Wherein, the first charging module 121 is connected to the first charging port 131 and provides charging energy for the first charging port 131; the second charging module 122 is connected to the second charging port 132 and provides charging energy for the second charging port 132. When switch K1, switch K3 and switch K4 are on and switch K2 is off, the first charging module 121 and the second charging module 122 are connected in parallel to jointly provide charging energy for the third charging port 133 and the mobile charging apparatus is in the second charging mode. When the first charging module 121 and the second charging module 122 are connected in parallel, their output power is the sum of the output power of the two charging modules. Furthermore, when switch K1, switch K2 and switch K4 are on and switch K3 is off, the first charging module 121 and the second charging module 122 are connected in parallel and jointly provide charging energy to the second charging port 132, which also makes the mobile charging apparatus in the second charging mode. For example, the first charging module 121 and the second charging module 122 have the same maximum output power, both P1, then the maximum output power of both the first charging port 131 and the second charging port 132 in the first charging mode is P1. In the second charging mode, the maximum output power of the third charging port 133 is 2*P1. The ratio of the maximum output power of the charging port in the second charging mode and in the first charging mode is 2. For example, no third charging interface is provided on the mobile charging apparatus and the first charging module 121 and the second charging module 122 are connected in parallel to jointly provide charging energy for the second charging port 132 or the first charging port 131. For example, only one charging port is provided on the mobile charging apparatus. In the first charging mode, either the first charging module 121 or the second charging module 122 provides the charging energy for the charging port. In the second charging mode, the first charging module 121 and the second charging module 122 are connected in parallel to provide the charging energy for the charging port. In at least one embodiment, the maximum output power of the first charging module 121 and the second charging module 122 is 3.6 kw. In the first charging mode, the maximum output power of both the first charging port 131 and the second charging port 132 is 3.6 kw. In the second charging mode, the maximum output power of the charging port is 7.2 kw, which, as previously mentioned, can be one of the first charging port 131, the second charging port 132, or the third charging port 133.

There are many ways to trigger the switch between the first charging mode and the second charging mode. In at least one embodiment, the mobile charging apparatus is provided with an operating component, such as a button, and the user manually triggers the operating component to switch the charging modes. Specifically, the mobile charging apparatus is equipped with a control module, which detects the state of the operating component and controls the operating state of the charging module according to the state of the operating component to achieve switching of the charging mode of the mobile charging apparatus. In some embodiments, the mobile charging apparatus recognizes the information transmitted by the battery pack, such as the identity information of the battery pack, or the charging request of the battery pack, through the charging interface, and controls the operating state of the charging module based on the information transmitted by the battery pack to realize the switching of the charging mode of the mobile charging apparatus.

In at least one embodiment, the energy storage unit of the mobile charging apparatus includes a plurality of battery cells. The battery pack to be charged by the mobile charging apparatus includes a plurality of battery cells. The battery cells of the mobile charging apparatus have a first energy density and the battery cells of the battery pack have a second energy density, the first energy density being higher than the second energy density. The energy density of the battery cell refers to the ratio of the product of the rated voltage and the rated capacity of the battery cell to the weight of the battery cell. The energy density of the battery cell refers to the ratio of the product of the rated voltage and the rated capacity of the battery cell to the weight of the battery cell. The ratio of the total weight of the battery cells of the mobile charging apparatus to the total weight of the battery cells of the battery pack is less than the ratio of the energy of the mobile charging apparatus to the energy of the battery pack. The total weight of the battery cells of the mobile charging apparatus refers to the sum of the weight of all the battery cells. The energy of the mobile charging apparatus refers to the product of the rated voltage and the rated capacity of the energy storage unit which formed by the electrical connection of the battery cells. The total weight of the battery cells of a battery pack is the sum of the weights of all the battery cells. The energy of a battery pack is the product of the rated voltage and the rated capacity of the energy storage unit which formed by the electrical connection of the battery cells.

For example, the mobile charging apparatus stores more energy than the battery pack stores. In at least one embodiment, the energy stored in the battery pack is 60 Wh and the energy stored in the mobile charging apparatus is 500 wh. In at least one embodiment, the energy stored in the battery pack is 24 Wh and the energy stored in the mobile charging apparatus is 500 wh. For example, the energy ratio of the mobile charging apparatus to the battery pack is greater than 3. For example, the energy ratio of the mobile charging apparatus to the battery pack ranges from 3 to 22. For example, the energy ratio of the mobile charging apparatus to the battery pack ranges from 8 to 22. Such a setup allows gardeners to store the energy needed for a day's work by carrying a mobile charging apparatus, while configuring a smaller energy battery pack, and transferring the energy from the mobile charging apparatus to the battery pack by charging the battery pack whenever and wherever the mobile charging apparatus is used, which in turn supplies power to the power tool. Due to the small energy of the battery pack, its light weight and better portability make it easier to provide power directly to the power tool. The mobile charging apparatus in turn complements the small energy of the battery pack which is not enough for a day's use outdoors. Another effect of such a setup is that when the mobile charging apparatus is charging a battery pack at power P1, the battery cells of the mobile charging apparatus are discharging at a small discharge rate, but can provide a large charge rate for charging the battery cells of the battery pack, enabling fast charging of the battery pack. This means that battery cells with a smaller discharge rate can be used to charge battery cells with a larger charge rate, thereby reducing the cost of the battery cells of the mobile charging apparatus. Specifically, the energy of the mobile charging apparatus is set to W1 and the energy of the battery pack is set to W2. When the mobile charging apparatus charges a battery pack at power P1, the discharge rate $C1=P1/W1$ for the mobile charging apparatus or its battery cells and the charge rate $C2=P1/W2$ for the battery pack or its battery cells. Since $W1>W2$, $C1<C2$. From the above equation, $C2:C1=W1:W2$, i.e. the ratio of the discharge rate of the mobile charging apparatus to the charge rate of the battery pack is inversely proportional to the ratio of the energy of the mobile charging apparatus to the energy of the battery pack. In the case of $W1:W2>3$, $C2:C1>3$. In at least one embodiment, $C2:C1>4$. In at least one embodiment, $C2:C1$ is in the range 4 to 12 and, For example, $C2:C1$ is in the range 8 to 10.

In addition, the battery cells of the mobile charging apparatus have a higher energy density compared to the battery cells of the battery pack, allowing the mobile charging apparatus to store a large amount of energy, but the overall weight of the mobile charging apparatus will be reduced due to the high energy density of its battery cells.

For example, the capacity of the mobile charging apparatus is greater than the capacity of the battery pack. In at least one embodiment, the capacity of the battery pack is 11 Ah and the capacity of the mobile charging apparatus is 105 Ah. In at least one embodiment, the capacity of the battery pack is 4 Ah and the capacity of the mobile charging apparatus is 105 Ah. For example, the capacity ratio of the mobile charging apparatus to the battery pack is greater than 3. For example, the capacity ratio of the mobile charging apparatus to the battery pack is between 3 and 26. For example, the capacity ratio of the mobile charging apparatus to the battery pack is between 8 and 26.

For example, the ratio of the cycle life of the battery cells of the battery pack to the battery cells of the mobile charging apparatus is greater than 3. During a day of outdoor operation, a battery pack is charged and discharged for 7 to 8 cycles, while the mobile charging apparatus is charged and discharged for 1 to 2 cycles a day. For example, under the same test conditions, the ratio of the cycle life of the battery cells of the battery pack to that of the mobile charging apparatus is 4 to 17. For example, under the same test conditions, the ratio of the cycle life of the battery cells of the battery pack to that of the mobile charging apparatus is 8 to 12. Accordingly, the ratio of the cycle life of the battery pack to the mobile charging apparatus can also have the above relationship. Thus, the life requirement of the mobile charging apparatus is lower than that of the battery pack. As a result, the cost of the battery cells, electronic components, and charging ports of the mobile charging apparatus can be reduced.

For example, the maximum allowable charging rate of the battery cells of the mobile charging apparatus is less than the maximum allowable charging rate of the battery cells of the battery pack. The charging scenario of the mobile charging apparatus is the non-working time of the user, such as at night, or the lunch time of the user. The charging urgency requirement is not high. The charging scenario for battery packs is during the user's working hours, e.g. in the customer's garden, or on the way to the customer's garden. The urgency of charging is high. If the maximum allowable charging rate of the battery packs is small and charging is slow, it will increase the user's waiting time for charging and thus reduce the user's productivity. The maximum allowable charge rate of the battery cells of the mobile charging apparatus is smaller than the maximum allowable charge rate of the battery cells of the battery pack, making it possible to improve the user's productivity while reducing the cost of the battery cells of the mobile charging apparatus.

For example, the internal resistance of each battery cell of the mobile charging apparatus is greater than the internal resistance of each battery cell of the battery pack. The charging and discharging rate of the battery cells of the mobile charging apparatus are smaller, and accordingly, the charging current and discharging current is smaller, so that even if the internal resistance of the battery cells of the mobile charging apparatus is slightly larger, it will not cause serious heating. On the contrary, the charging and discharging rate of the battery cells of the battery pack are both larger, and accordingly, the charging current and discharging current is larger, so only the internal resistance of the battery cell of the battery pack is small enough not to cause serious heating. There is no need to choose a small internal resistance for the battery cell of the mobile charging apparatus, which can reduce the cost of the battery cell of the mobile charging apparatus.

In at least one embodiment, a rated capacity of the battery pack is 2 Ah~5 Ah, For example, the capacity is 4 Ah. The weight of the battery pack is 2.5 kg~3.5 Kg, for example, the weight is 3 Kg. the maximum allowable charge rate is 10 C~12 C. The battery pack includes 15 cells with a voltage of 62.7V when fully charged.

In some other embodiments, the rated capacity of the battery pack is 10 Ah~12 Ah, for example, the capacity is 11 Ah. The weight of the battery pack is 7.3 kg~8.3 Kg, for example, the weight is 7.8 Kg. The maximum allowable charge rate is 10 C~12 C. The battery pack includes 15 cells with a voltage of 62.7V when fully charged.

In at least one embodiment, the mobile charging apparatus has a rated capacity of 80 Ah to 120 Ah, for example, a capacity of 105 Ah. The mobile charging apparatus has a weight of 100 kg to 120 kg, for example, a weight of 110 Kg. The voltage of the mobile charging apparatus is about 48V.

In at least one embodiment, the mobile charging apparatus includes an energy storage component and a charging component. The energy storage component includes a first housing, and an energy storage unit provided in the first housing. For example, the energy storage unit is an electric cell. The charging component includes a second housing, and a charging module provided in the second housing. The first housing and the second housing are provided independently of each other, for example separated, or the two housings are locked together by a locking device. The energy storage component and the charging component are electrically connected detachably via a cable. The charging component converts the DC power stored in the energy storage component into appropriate charging energy for charging the battery pack. The battery pack receives the charging energy through a charging interface provided on the second housing.

In at least one embodiment, any one of the battery cells of the battery pack has a rated capacity of 4 Ah and a rated voltage of 4V, an energy of 16 wh/cell. In at least one embodiment, any one of the battery cells of the battery pack has a rated capacity of 11 Ah and a rated voltage of 4V, an energy of 44 wh/cell.

Figure 38:
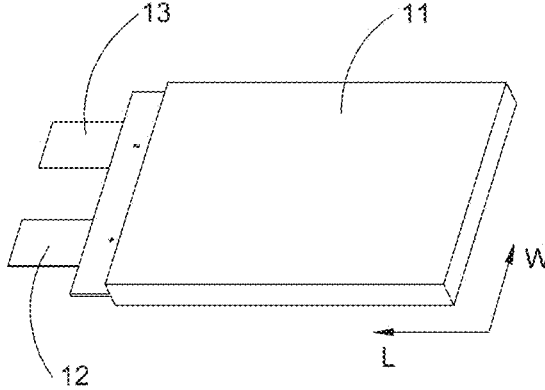
FIG. 38 is a schematic diagram of a 4 Ah battery cell according to an embodiment of the present disclosure.

In at least one embodiment, each battery cell located within the battery pack has a capacity of 4 Ah and a maximum allowable charge rate of 10 C~12 C, a maximum charge current of up to 40 A. As shown in FIG. 38, the battery cell is non-cylindrical and, for example, the battery cell is a sheet-like rectangular shape. In the FIG. 38, W indicates the width direction and L indicates the length direction. The batter cell includes a body 11, a positive ear 12, and a negative ear 13. The ratio of the length of the body to the height is greater than 10. The positive ear 12 and the negative ear 13 are located on the same side of the body 11. Since the current through the battery is relatively small, the size of the positive and negative ears is relatively small, and there is enough space on the same side of the body 11 for the positive ear 12 and the negative ear 13.

Figure 39:
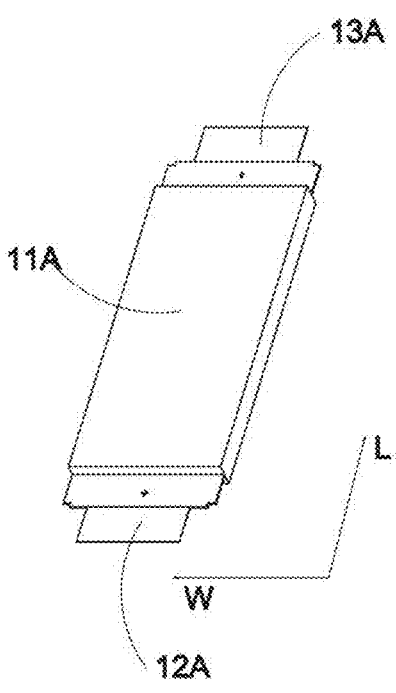
FIG. 39 is a schematic diagram of a 11 Ah battery cell according to an embodiment of the present disclosure.

In at least one embodiment, each battery cell located within the battery pack has a capacity of 11 Ah and a maximum allowable charge rate of 10 C~12 C, a maximum charge current of up to 110 A. As shown in FIG. 39, the battery cell is non-cylindrical and, for example, the battery cell is a sheet-like rectangular shape. In the FIG. 39, W indicates the width direction and L indicates the length direction. The batter cell includes a body 11A, a positive ear 12A, and a negative ear 13A. The ratio of the length of the body to the height is greater than 10. Positive ear 12A and negative ear 13A are located on different sides of the body 11A. Since the current passing through the battery cell is relatively large, the size of positive and negative ears is relatively large, and there is not enough space on the same side of the body 11A to place the positive ear 12A and the negative ear 13A, so the positive ear 12A and the negative ear 13A are placed on different sides of the body 11A. For example, the positive ear 12A and the negative ear 13A are located on the first side and the second side, respectively, which are set opposite to each other, wherein the first side and the second side are perpendicular to the length direction of the body 11A.

In at least one embodiment, a power tool system includes a power tool, a battery pack, and a charging apparatus. The charging apparatus charges the battery pack at a rate no less than the rate at which the power tool discharges the battery pack. In other words, for a battery pack, the time for the charging apparatus to charge it full is no greater than the time for the power tool to discharge it empty. In at least one embodiment, the charging apparatus charges the battery pack at a rate greater than the power tool discharges the battery pack. For example, the difference between the charge rate and the discharge rate is less than 2 C, either the charge rate is greater than or equal to the discharge rate, or the charge rate is less than or equal to the discharge rate. In the case where the charge rate is less than the discharge rate and the difference between the two rate is less than 2 C, considering that the power tool is not always working and there may be a break in between, it is also possible to meet one battery pack discharged empty and another battery pack charged fully, so as to achieve uninterrupted power supply to the power tool. For example, the maximum allowable discharge current of the battery pack is greater than 40 A. In at least one embodiment, the charging apparatus charges the battery pack at a rate of 5 C or more, and the battery pack discharged by the power tool at a rate of 5 C or less. In at least one embodiment, the charging apparatus has a charge rate of 10 C or more for the battery pack and the power tool has a discharge rate of 4 C or more for the battery pack. In at least one embodiment, the charging power of the charging apparatus to the battery pack is greater than the discharging power of the power tool to the battery pack. The charge rate and discharge rate refers to an average charge rate and an average discharge rate, or a maximum charge rate and a maximum discharge rate. The charging power and discharging power refers to an average charging power and an average discharging power, or a maximum charging power and a maximum discharging power.

Figure 40:
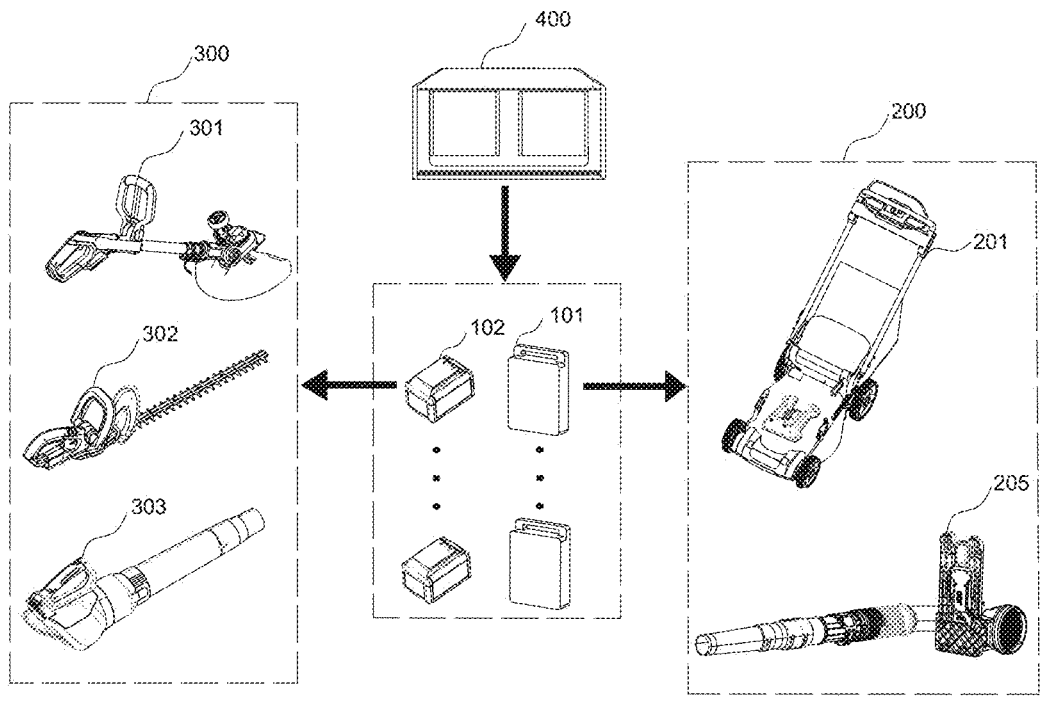
FIG. 40 is a schematic diagram illustrating a scenario in which a commercial garden work team goes out working with a power tool system.

In at least one embodiment, with reference to FIG. 40, the charging apparatus is a mobile charging apparatus 400. The battery pack includes at least one of a first type battery pack 101, or a second type battery pack 102. The power tool includes at least one of a grass trimmer 301, a hedge trimmer 302, a blower 303, and a backpack chain saw 205. According to the inventor's study of the working conditions of these tools, the average output power of the grass trimmer 301 is 0.8 KW to 1.2 KW, the average output power of the hedge trimmer 302 is 0.4 KW to 0.6 KW, the average output power of the blower 303 is 1 KW to 1.2 KW, and the average output power of the backpack chain saw 205 is 1.2 KW to 1.5 KW. In order to achieve that the mobile charging apparatus 400 takes no more time to charge fully the battery pack than the power tool to discharge empty the battery pack, the charging power of the mobile charging apparatus 400 to the battery pack needs to be greater than or equal to 1.5 kw. For example, the charging power of the mobile charging apparatus 400 to the battery pack is greater than or 3 kw. For example, the charging power of the mobile charging apparatus 400 to the battery pack is greater than or equal to 3.6 kw. Wherein, the charging power refers to a maximum charging power.

For example, the first type battery pack 101 has a rated voltage of 60V and a capacity of 11 Ah, and the second type battery pack 102 has a rated voltage of 60V and a capacity of 4 Ah. In this case, the average working time of the second type battery pack 102 for the grass trimmer 301 is 60*4/1000/(0.8 to 1.2)=0.2 to 0.3 hours, and the average working time of the second type battery pack 102 for the hedge trimmer 302 is 60*4/1000/(0.4~0.6)=0.4~0.6 hours, the average working time of the second type battery pack 102 for the blower 303 is 60*4/1000/(1~1.2)=0.2~0.24 hours, the average working time of the second type battery pack 102 for the backpack chain saw 205 is 60*4/1000/(1.2 to 1.5)=0.16~0.2 hours. The average working time of the first type battery pack 101 for the grass trimmer 301 is 60*11/1000/(0.8~1.2)=0.55~0.83 hours, and the average working time of the first type battery pack 101 for the hedge trimmer 302 is 60*11/1000/(0.4~0.6)=1.1~1.65 hours, and the average working time of the first type battery pack 101 for the blower 303 is 60*11/1000/(1~1.2)=0.55~0.66 hours. The average working time of the first type battery pack 101 for the backpack chain saw 205 is 60*11/1000/(1.2~1.5)=0.44~0.55 hours. On the other hand, the battery pack can be charged at a rate of 5 C or more, which means that either the first type battery pack 101 or the second type battery pack 102 can be charged at a rate of 5 C and be fully charged in 0.2 hours. Therefore, in the vast majority of cases, the charging time of the battery pack is much less than the discharging time of the battery pack.

In at least one embodiment, referring to FIG. 40, the battery pack includes a first type battery pack 101 and a second type battery pack 102. The power tool includes a handheld power tool 300 and a wheeled or backpack power tool 200. The first type battery pack 101 powers the wheeled or backpack power tool 200, and the second type battery pack 102 powers the handheld power tool 300. The capacity of the first type battery pack 101 is greater than the capacity of the second type battery pack 102. The rated power of the wheeled or backpack power tool 200 is greater than the rated power of the handheld power tool 300. For example, the first type battery pack 101 has a capacity of 8 Ah~12 Ah and weighs less than 8 Kg. For example, the second type battery pack 102 has a capacity of 3.6 Ah~4 Ah and weighs less than 3.5 kg. For example, the first type battery pack 101 has a first charging and discharging port and the second type battery pack 102 has a second charging and discharging port, the first charging and discharging port and the second charging and discharging port are the same, such that both the first type battery pack 101 and the second type battery pack 102 can power the wheeled or backpack power tool 200 and the handheld power tool 300. In at least one embodiment, referring to FIG. 40, the wheeled or backpack power tool 200 includes a hand push lawn mower 201, a backpack chain saw 205. The handheld power tool 300 includes a grass trimmer 301, a hedge trimmer 302, a blower 303.

In at least one embodiment, referring to FIG. 40, the mobile charging apparatus 400 may charge a first type battery pack 101 and may also charge a second type battery pack 102. For example, the rated capacity of the first type battery pack 101 is different from the rated capacity of the second type battery pack 102. For example, the mobile charging apparatus 400 charges the first type battery pack 101 at a first charging power and charges the second type battery pack 102 at a second charging power. For example, the first charging power and the second charging power are different. At the first charging power, the charging rate of the first type battery pack 101 is C1. At the second charging power, the charging rate of the second type battery pack 102 is C2. For example, C1 and C2 are the same. The rated capacity of the first type battery pack 101 is greater than that of the second type battery pack 102. The first charging power is greater than the second charging power.

The present disclosure may further be understood with clauses as follows in one example.

Clause 1. A power supply system, comprising:
a first battery pack;
a second battery pack;
an electric power garden tool configured to be powered by the first battery pack or the second battery pack;
a mobile charging apparatus configured to alternatively charge battery packs such that energy is continuously supplied to the electric power garden tool,
wherein the mobile charging apparatus comprises at least one charging port configured to accept the first battery pack or the second battery pack, and
wherein the mobile charging apparatus is configured to provide energy sufficient for a plurality of jobs, and wherein at least one charging port of the mobile charging apparatus has a maximum output power of greater than or equal to 3 kW with a charge rate of 5 C to charge the first and second battery packs.

Clause 2. The power supply system of clause 1, wherein the mobile charging apparatus comprises at least one battery cell providing direct current.

Clause 3. The power supply system of clause 2, wherein an energy density of the battery cells of the mobile charging apparatus is greater than that of the battery pack.

Clause 4. The power supply system of clause 1, wherein an energy of the mobile charging apparatus is greater than that of the battery pack.

Clause 5. The power supply system of clause 4, wherein the energy ratio between the mobile charging apparatus and the battery pack is greater than 3.

Clause 6. The power supply system of clause 3, wherein a mass ratio between the battery cells of the mobile charging apparatus and the battery cells of the battery pack is less than the energy ratio.

Clause 7. The power supply system of clause 2, wherein a maximum life cycle of the battery cells of the mobile charging apparatus is less than a maximum life cycle of the battery cells of the battery pack, wherein a ratio of the battery cells of the battery pack to the battery cells of the mobile charging apparatus is greater than 3.

Clause 8. The power supply system of clause 1, wherein the mobile charging apparatus operates in a first charging mode or in a second charging mode, when in the first charging mode, at least one charging port has a maximum output power of a first charging power, when in the second charging mode, at least one charging port has a maximum output power of a second charging power, wherein the first charging power is less than the second charging power.

Clause 9. The power supply system of clause 8, wherein the first charging power is 3.6 kW and the charging rate is up to 1° C. for a 4 Ah battery pack.

Clause 10. The power supply system of clause 8, the first charging power is 3.6 kW and the charging rate greater than 5 C for an 11 Ah battery pack.

Clause 11. The power supply system of clause 8, wherein the second charging power is 7.2 kW and the charging rate is up to 1° C. for an 11 Ah battery pack.

Clause 12. The power supply system of clause 1, wherein the mobile charging apparatus has at least two charging modules, a single charging module has a maximum output power of 3.6 kW, and multiple single modules in parallel has a maximum output power of 7.2 kW.

Clause 13. The power supply system of clause 12, wherein when in a first charging mode the charging modules work independently, and when in a second charging mode multiple single modules work in parallel.

Clause 14. The power supply system of clause 8, wherein the ratio of the second charging power to the first charging power is greater than or equal to 1.5.

Clause 15. The power supply system of clause 1, wherein the mobile charging apparatus is configured to be attached to a vehicle using an anti-theft system.

Clause 16. The power supply system of clause 1, wherein the mobile charging apparatus has a maximum output power of at least 7000 W.

Clause 17. The power supply system of clause 1, wherein a mass of the first battery pack is less than 3.5 kg and a capacity is 4 Ah, the mass of the second battery pack is less than 8 kg and the capacity is 11 Ah, and the mass of the mobile charging apparatus is less than 130 kg and the capacity is at least 100 Ah.

Clause 18. The power supply system of clause 1, wherein each job in the plurality of jobs is at different geographical location.

Clause 19. The power supply system of clause 1, wherein the plurality of jobs is a plurality of jobs that a crew is expected to complete in a day of work.

Clause 20. The power supply system of clause 2, wherein an internal resistance of each of the at least one battery cell of the mobile charging apparatus is greater than an internal resistance of that of the first and second battery pack.

Clause 21. A power supply system, comprising:

a battery pack;

an electric power garden tool configured to be powered by the battery pack; and a mobile charging apparatus comprising at least one charging port configured to charge the battery pack, wherein at least one charging port has a maximum output power of greater than 3000 W with a charge rate of 5 C to charge the battery packs.

Clause 22. The power supply system of clause 21, wherein the mobile charging apparatus includes a plurality of cells of a first type, wherein the first battery pack and the second battery pack include a plurality of cells of a second type, and wherein the cells of the first type charge more quickly than the cells of the second type.

Clause 23. The power supply system of clause 22, wherein a maximum discharge rate of the cells of the first type is lower than the maximum charge rate of the cells of the second type.

Clause 24. The battery pack system of clause 23, wherein a ratio between the maximum charge rate of the cells of the second type and the maximum discharge rate of the cells of the first type is no less than 4.

The present disclosure may also be understood with clauses as follows in another example.

Clause 1. A power tool system, comprising:

a power tool; and a battery pack comprising:

a housing configured to be connectable to the power tool; and a battery cell located within the housing, wherein the battery cell charges more quickly than the battery cell discharges.

Clause 2. The power tool system of clause 1, wherein the battery cell charges at a charge rate of 10 C and discharges at a rate of at least 4 C.

Clause 3. The power tool system of clause 1, wherein the battery cell has a maximum available discharge current of at least 40 A.

Clause 4. The power tool system of clause 1, wherein the power tool system comprises a mobile charging apparatus which has a maximum output power of not less than 3.6 kW, and a rated power of the power tool is not more than 3 kW.

Clause 5. The power tool system of clause 1, wherein a capacity of the battery pack is greater than 4 Ah, a charging rate is no less than 10 C, and a charging time is less than 5 minutes.

Clause 6. The power tool system of clause 1, wherein the battery pack has a continuous discharge power in a range from about 0.4 kW to about 1.5 kW for at least 8 minutes.

Clause 7. The power tool system of clause 1, wherein when charging the battery pack at a charge rate of 3 C, a battery pack temperature on completion of the charging is less than a discharging protection temperature, and wherein when discharging the battery pack at a discharge rate of 10 C, a battery pack temperature on completion of the discharging is less than a charging protection temperature.

Clause 8. The power tool system of clause 1, wherein when cycled two times, charging the battery pack at the charge rate of 3 C in a first cycle, the battery pack temperature at completion of the charging of the first cycle is less than the discharging protection temperature, and wherein when discharging the battery pack at the discharge rate of 10 C in the first cycle, the battery pack temperature at completion of the discharging of the first cycle is less than the charging protection temperature, and charging the battery pack at the charge rate of 3 C in a second cycle, the battery pack temperature at completion of the charging of the second cycle is less than the discharging protection temperature, and wherein when discharging the battery pack at the discharge rate of 10 C in the second cycle, the battery pack temperature at completion of the discharging of the second cycle is less than the charging protection temperature.

Clause 9. The power tool system of clause 1, wherein a capacity of a first battery pack is less than the capacity of a second battery pack.

Clause 10. The power tool system of clause 1, wherein a first battery pack weighs less than 3.5 kg and contains 3.6 to 4 Ah.

Clause 11. The power tool system of clause 1, wherein a second battery pack weighs less than 8 kg and contains 8 to 11 Ah.

Clause 12. The power tool system of clause 1, wherein a port connecting a first battery pack to the power tool is identical to a port connecting a second battery pack to the power tool.

Clause 13. The power tool system of clause 1, wherein the power tool system comprises a charging apparatus that charges a first battery pack and a second battery pack.

Clause 14. The power tool system of clause 13, wherein the first battery pack has a first capacity, and wherein the second battery pack has a second capacity.

Clause 15. The power tool system of clause 14, wherein the first battery pack is charged by a first charging power, and the second battery pack is charged by a second charging power, wherein the first capacity is less than the second capacity, the first charging power is less than the second charging power.

Clause 16. The power tool system of clause 1, wherein the power tool is a handheld power tool; and wherein the battery pack has a capacity of at least 4 Ah.

Clause 17. The power tool system of clause 1, wherein the power tool is a wheeled power tool or a backpack power tool; and the battery pack has a capacity of at least 11 Ah.

Clause 18. A power tool comprising:

a battery pack comprising:

a housing configured to be connectable to the power tool; and at least one battery cell located within the housing, wherein the battery cell charges more quickly than the battery cell discharges.

Clause 19. The power tool of clause 18, wherein an internal resistance of each of at least one battery cell is less than or equal to 3 milliohms.

Clause 20. The power tool of clause 18, wherein the battery pack comprises a plurality of battery cells, wherein the plurality of battery cells are stacked in a longitudinal direction within the housing, and wherein a distance between adjacent battery cells in the longitudinal direction is greater than $\frac{1}{12}$ of a thickness of the battery cell.

Clause 21. The power tool of clause 18, wherein a first group of electric power garden tools are handheld electric power garden tools, and wherein a second group of garden electric power tools are wheeled electric power garden tools or backpack electric garden tools.

Clause 22. A power tool system comprising:

a plurality of battery packs; and a plurality of power tools, wherein each battery pack of the plurality of battery packs comprises:

a housing configured to be connectable to a power tool of the plurality of power tools; and a battery cell located within the housing, wherein a difference between a rate at which the battery cell is able to charge and a rate at which the battery cell is able to discharge is less than 2 C, and wherein the battery cell has a maximum available discharge current of at least 40 A.

Clause 23. A method of operating a battery pack system, comprising charging a battery pack, wherein the battery pack charges at a charge rate of up to 5 C and discharges at a rate of under 5 C.

Clause 24. The method of clause 23, comprising, for each worker of a plurality of workers:

while the respective worker uses a first battery pack at a first job site, charging a second battery pack at the first job site;

when the plurality of workers moves to a second job site, using the second battery pack to power garden electric power tools used by the respective worker at the second job site; and while the respective worker uses the second battery pack at the second job site, charging the first battery pack at the second job site.

Clause 25. The method of clause 23, further comprising:

(i) arriving at a first job site;

(ii) using a first battery pack to power a power tool used at the first job site, wherein the first battery pack is fully charged;

(iii) charging, while at the first job site, a second battery pack;

(iv) finishing work at the first job site and traveling to a second job site;

(v) while at the second job site, placing the second battery pack in the power tool and using the power tool at the second job site; and (vi) while at the second job site, charging the first battery pack.

The battery cell of the battery pack in embodiments and claims of the present disclosure is a new type lithium-based battery cell. In some embodiments, the new type battery cell is called type 2 battery cell. In some different embodiments, the battery cells have different capacity but they have a basic same chemistry.

In embodiments of the present disclosure, energy refers to the product of the rated voltage and rated capacity of a given energy storage unit. Battery cell, or cell, or battery, all three terms refer to the battery cells located in the housing of a battery pack. The full meaning of temperature is the temperature value in the condition that temperature has a relationship with a value. Energy density refers to the weight energy density which has a unit wh/kg. The battery cell with rated voltage of 4V refers to the battery cell with the voltage of 4.2V±0.05 when it is fully charged. The surface temperature of a cell refers to the temperature of the cell's housing. The surface temperature of a battery pack refers to the temperature of the battery pack's housing. Charging or discharging protection temperature, temperature protection threshold, charging or discharging temperature protection value, all the three terms refer to, once the temperature of battery pack reaches this value, it will trigger a protection mechanism to stop charging or discharging the battery pack.

The various embodiments disclosed in the present application can be used as a independent embodiment or can be combined with other embodiments among themselves to form a new embodiment. For example, different embodiments of a battery pack are disclosed in the present disclosure, and different features of the battery pack are described under each embodiment, and the different features of these different embodiments can be combined with each other to form a new battery pack. Different features include energy density, capacity, linear characteristic, different value range, etc.

Identifiers, such as "(a)," "(b)," "(i)," "(ii)," etc., are sometimes used for different elements or steps. These identifiers are used for clarity and do not necessarily designate an order for the elements or steps.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications, such as specific embodiments, without undue experimentation, and without departing from the general concept of the present disclosure. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by a skilled artisan in light of the teachings and guidance.

The breadth and scope of the present disclosure should not be limited by any of the above-described exemplary embodiments, but should be defined only in accordance with the following claims and their equivalents.

What is claimed is:

1. A battery pack comprising:

a housing;

at least one battery cell located within the housing; and a charging and discharging port disposed on the housing, the at least one battery cell outputting electrical energy to an external device or obtaining electrical energy from the external device through the charging and discharging port, wherein:

the battery pack is discharged at a continuous discharge rate of greater than or equal to 4 C at a room temperature, an absolute temperature of the battery pack being less than a charging protection temperature when a discharge process is completed,

the charging protection temperature being a maximum allowable charging temperature of the battery pack;

the battery pack is charged at a continuous charge rate of greater than 3 C at the room temperature, the absolute temperature of the battery pack being less than a discharging protection temperature when a charging process is completed, the discharging protection temperature being a maximum allowable discharge temperature of the battery pack; and under a condition that a charging apparatus for charging the battery pack does not start a cooling fan, and when the battery pack is charged at a continuous charge rate of greater than or equal to 6 C and less than or equal to 8 C at the room temperature, a temperature rise of the battery pack is greater than or equal to 15° C. and less than or equal to 25° C. when a charging process is completed.

2. The battery pack of claim 1, wherein the battery pack is discharged at a continuous discharge rate of 10 C at the room temperature, the temperature rise of the battery pack is less than or equal to 35° C. when the discharge process is completed.

3. The battery pack of claim 1, wherein the battery pack is discharged at a continuous discharge rate of greater than or equal to 3 C and less than or equal to 4 C at the room temperature, the temperature rise of the battery pack is greater than or equal to 10° C. and less than or equal to 15° C. when the discharge process is completed.

4. The battery pack of claim 1, wherein the battery pack is discharged at a continuous discharge rate of greater than or equal to 4 C and less than or equal to 10 C at the room temperature, the temperature rise of the battery pack is greater than or equal to 15° C. and less than or equal to 35° C. when the discharge process is completed.

5. The battery pack of claim 1, wherein the battery pack is charged at a continuous charge rate of 5 C at the room temperature, the temperature rise of the battery pack is less than or equal to 17° C. when the charging process is completed.

6. The battery pack of claim 1, wherein the battery pack is charged at a continuous charge rate of 10 C at the room temperature, the temperature rise of the battery pack is less than or equal to 21° C. when the charging process is completed.

7. The battery pack of claim 1, wherein when a under the condition that the charging apparatus for charging the battery pack does not start the cooling fan, and when the battery pack is charged at a continuous charge rate of greater than or equal to 3 C and less than or equal to 6 C at normal temperature, the temperature rise of the battery pack is greater than or equal to 6° C. and less than or equal to 15° C. when the charging process is completed.

8. The battery pack of claim 1, wherein when a under the condition that the charging apparatus for charging the battery pack does not start the cooling fan, and when the battery pack is charged at a continuous charge rate of greater than or equal to 8 C and less than or equal to 12 C at the room temperature, the temperature rise of the battery pack is greater than or equal to 25° C. and less than or equal to 35° C. when the charging process is completed.

9. The battery pack of claim 1, wherein under a condition that the charging apparatus for charging the battery pack starts the cooling fan, and when the battery pack is charged at a continuous charge rate of greater than or equal to 3 C and less than or equal to 6 C at the room temperature, the temperature rise of the battery pack is greater than or equal to 3° C. and less than or equal to 12° C. when the charging process is completed.

10. The battery pack of claim 1, wherein under a condition that the charging apparatus for charging the battery pack starts the cooling fan, and when the battery pack is charged at a continuous charge rate of greater than or equal to 6 C and less than or equal to 8 C at the room temperature, the temperature rise of the battery pack is greater than or equal to 12° C. and less than or equal to 21° C. when the charging process is completed.

11. The battery pack of claim 1, wherein under a condition that the charging apparatus for charging the battery pack starts the cooling fan, and when the battery pack is charged at a continuous charge rate of greater than or equal to 8 C and less than or equal to 12 C at the room temperature, the temperature rise of the battery pack is greater than or equal to 21° C. and less than or equal to 33° C. when the charging process is completed.

12. The battery pack of claim 1, wherein under a condition that the charging apparatus for charging the battery pack starts the cooling fan, the battery pack maintains at least two times of continuous charge and discharge cycles when being charged and discharged at the continuous charge rate of 3 C and the continuous discharge rate of 4 C at the room temperature.

13. The battery pack of claim 1, wherein under a condition that the charging apparatus for charging the battery pack starts the cooling fan, the battery pack maintains at least six times of continuous charge and discharge cycles when being charged and discharged at a continuous charge rate of not less than 3 C and a continuous discharge rate of not less than 3 C at the room temperature.

14. The battery pack of claim 1, wherein a life cycle of the battery pack is greater than 2500 cycles at ambient temperatures ranging from about 0° C. to about 45° C., the battery pack charges at a continuous charging rate of 5 C and discharges at a continuous discharging rate of 5 C, a battery pack capacity retention is at least 75% after 2500 cycles.

15. A power supply system comprising: a battery pack detachably connected to a power tool or a charging apparatus, the battery pack including: a housing; at least one battery cell located within the housing; and a charging and discharging port disposed on the housing; the power tool including a tool port configured to connect to the at least one battery cell through the charging and discharging port to obtain electrical energy from the at least one battery cell; and the charging apparatus including a charging port configured to connect to the at least one battery cell through the charging and discharging port to charge the at least one battery cell, wherein: a temperature sensor for detecting a temperature of the battery pack is provided in the power supply system; a charging protection temperature and a discharging protection temperature is stored in the power supply system; when an absolute temperature of the battery pack is less than the charging protection temperature, the power supply system allows the charging apparatus to charge the battery pack, and when the absolute temperature of the battery pack is greater than the charging protection temperature, the power supply system prohibits the charging apparatus to charge the battery pack; when the absolute temperature of the battery pack is less than the discharging protection temperature, the power supply system allows the battery pack to discharge the power tool, and when the absolute temperature of the battery pack is greater than the discharging protection temperature, the power supply system prohibits the battery pack to discharge the power tool;

and when the battery pack is connected to the power tool, and when the power tool allows the battery pack to discharge it at a continuous discharge rate of 4° C. at normal temperature, the absolute temperature of the battery pack is less than a charging protection temperature when a discharge process is completed, the power supply system allows the charging apparatus to charge the battery pack.

16. The power supply system of claim 15, wherein when the battery pack is connected to the charging apparatus, and the charging apparatus discharge the battery pack at a continuous discharge rate of 4 C at normal temperature, the absolute temperature of the battery pack is less than the discharging protection temperature when a charging process is completed, the power supply system allows the battery pack to discharge the power tool.

17. The power supply system of claim 15, wherein a charging time required by the charging apparatus to charge the battery pack from empty power to full power is less than a discharging time required by the power tool to discharge the battery pack from full power to empty power.

18. The power supply system of claim 15, wherein a charging power of the charging apparatus to charge the battery pack is greater than a discharging power of the power tool to discharge the battery pack.

* * * * *